United States Patent [19]
Goss et al.

[11] Patent Number: 5,448,699
[45] Date of Patent: Sep. 5, 1995

[54] APPARATUS WITH LEADING EDGE DELAY CIRCUIT FOR SELECTIVELY SENDING A DELAYED SUBSTITUTE VERSION OF A SIGNAL TRANSMITTED BETWEEN AN EXPANSION CARD AND A SYSTEM BUS

[75] Inventors: Douglas A. Goss, Spring; Arnold T. Schnell, Houston, both of Tex.

[73] Assignee: Compaq Computer Corp., Houston, Tex.

[21] Appl. No.: 107,206

[22] Filed: Aug. 16, 1993

Related U.S. Application Data

[63] Continuation of Ser. No. 633,119, Dec. 21, 1990, abandoned.

[51] Int. Cl.⁶ .......................... G06F 3/00; G06F 5/06; G06F 13/00
[52] U.S. Cl. ..................................... 395/282; 395/550; 395/822; 395/820; 364/239.1; 364/271.5; 364/238.3; 364/242; 361/788
[58] Field of Search ................. 395/275, 550; 361/785, 361/788; 340/825.21

[56] References Cited

U.S. PATENT DOCUMENTS

| | | | |
|---|---|---|---|
| 3,812,475 | 5/1974 | Christiansen et al. | 364/200 |
| 4,065,862 | 1/1978 | Meyer | 364/200 |
| 4,079,456 | 3/1978 | Lunsford et al. | 395/550 |
| 4,408,272 | 10/1983 | Walters | 364/200 |
| 4,446,459 | 5/1984 | Bond, Jr. et al. | 364/900 |
| 4,593,378 | 6/1986 | McWhirter et al. | 364/900 |
| 4,628,445 | 12/1986 | Buonomo et al. | 364/200 |
| 4,740,891 | 4/1988 | Kirpatrick | 395/550 |
| 4,845,437 | 7/1989 | Mansur et al. | 328/15 |
| 5,027,315 | 6/1991 | Agrawal et al. | 395/800 |
| 5,043,877 | 8/1991 | Berger et al. | 364/200 |
| 5,056,054 | 10/1991 | Wong et al. | 364/724.01 |
| 5,077,683 | 12/1991 | Aydin | 361/415 |

FOREIGN PATENT DOCUMENTS

| | | |
|---|---|---|
| 0115566 | 8/1984 | European Pat. Off. . |
| 0130610 | 1/1985 | European Pat. Off. . |
| 0401588 | 12/1990 | European Pat. Off. . |
| 0402134 | 12/1990 | European Pat. Off. . |

OTHER PUBLICATIONS

"Programmable Delay Lines In Signature Analysis Testing", L. C. Eggebrecht, IBM Technical Disclosure Bulletin, vol. 25, No. 8, Jan., 1993, pp. 4244–4245.

*Primary Examiner*—Thomas C. Lee
*Assistant Examiner*—Marc Weinstein
*Attorney, Agent, or Firm*—Pravel, Hewitt, Kimball & Krieger

[57] ABSTRACT

An apparatus for conditioning signals output from a computer system expansion card to a computer system board to test system board bus specifications and timing limits. The apparatus comprises two signal conditioning extension cards which are used to condition signals from a slave card and a bus master card. The signal conditioning extension cards according to the present invention are interposed between the bus master or slave expansion card and the system board and selectively advance or delay the signals output from the expansion card to the system board. The slave signal conditioning card also selectively delays the read data valid window of the slave card to test the limits of the system board. The bus master signal conditioning card selectively delays the write data valid window of the bus master card to test the limits of the system board.

10 Claims, 30 Drawing Sheets

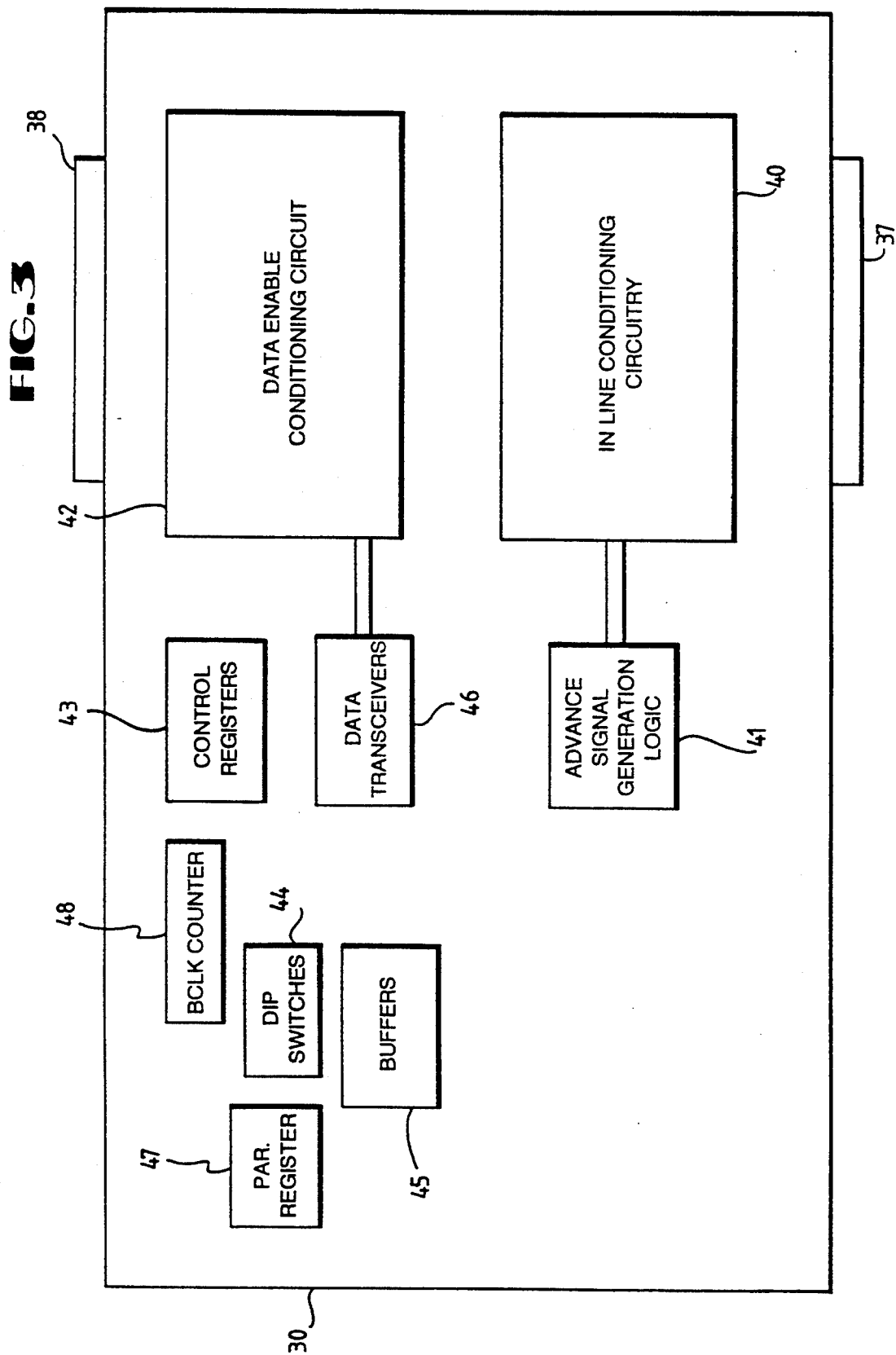

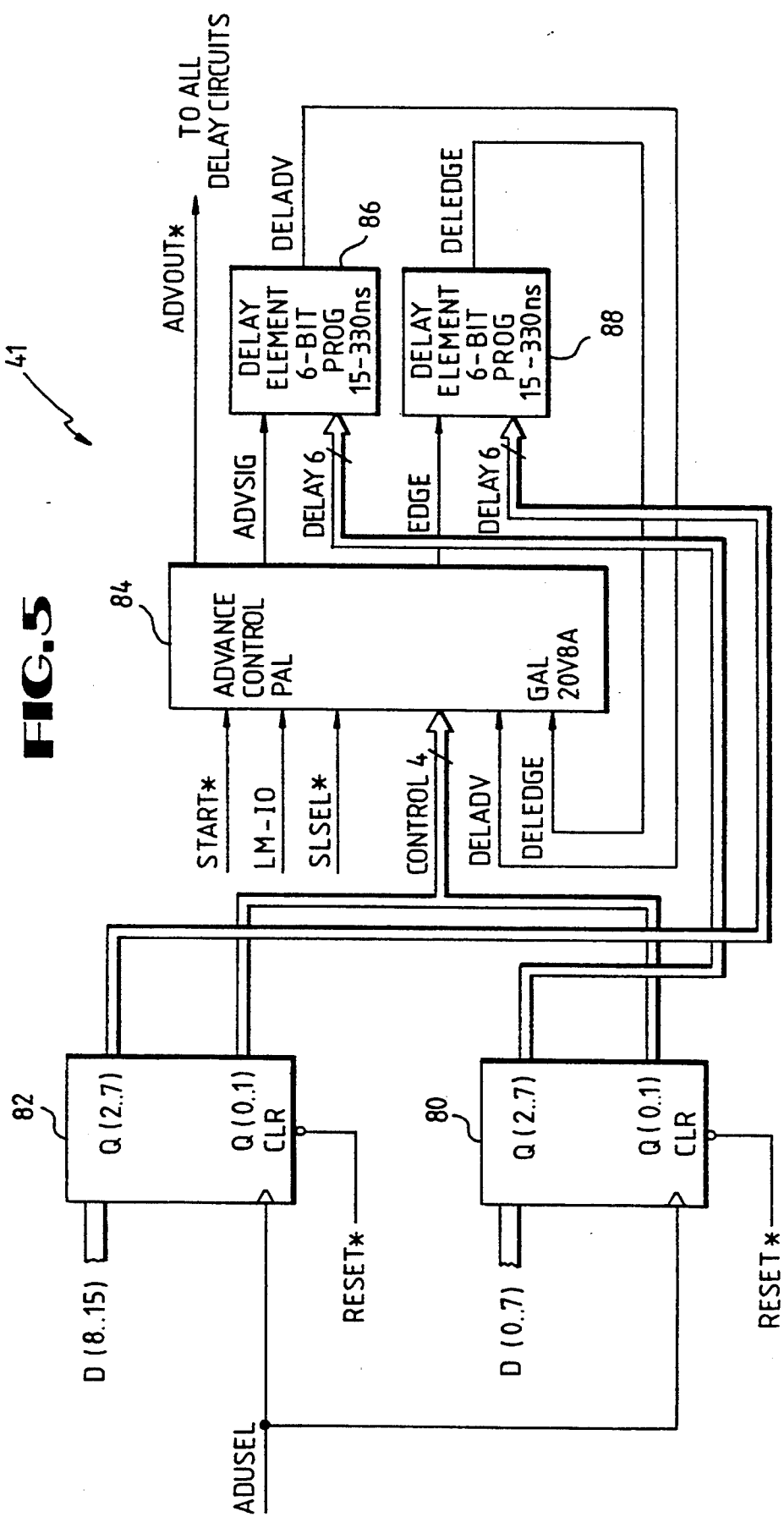

FIG. 2.5

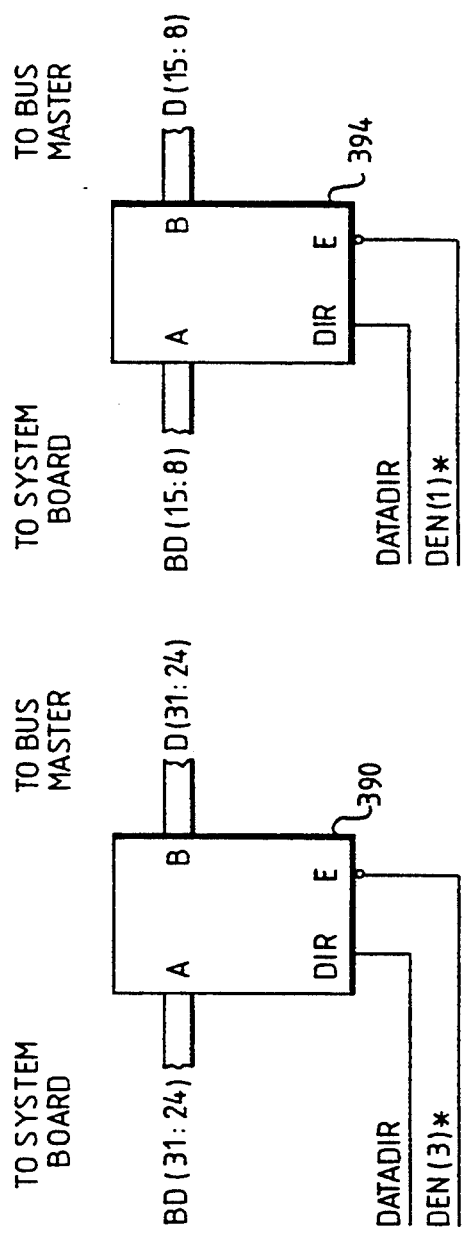
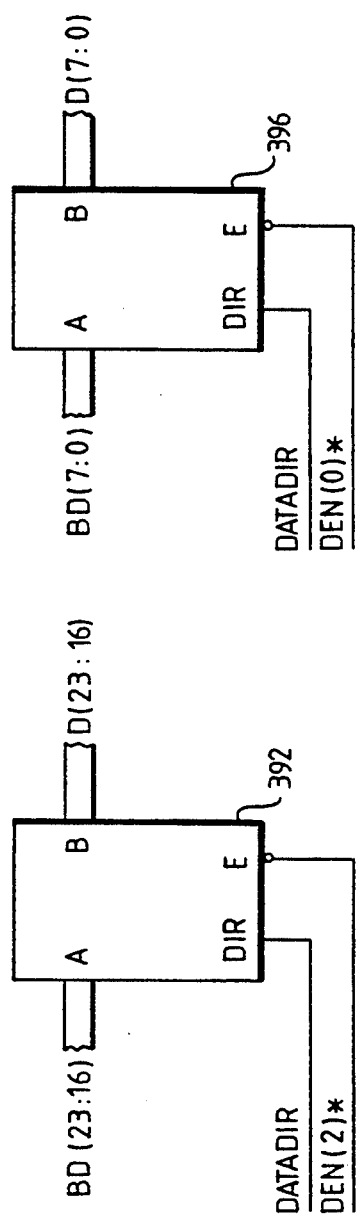
FIG. 26

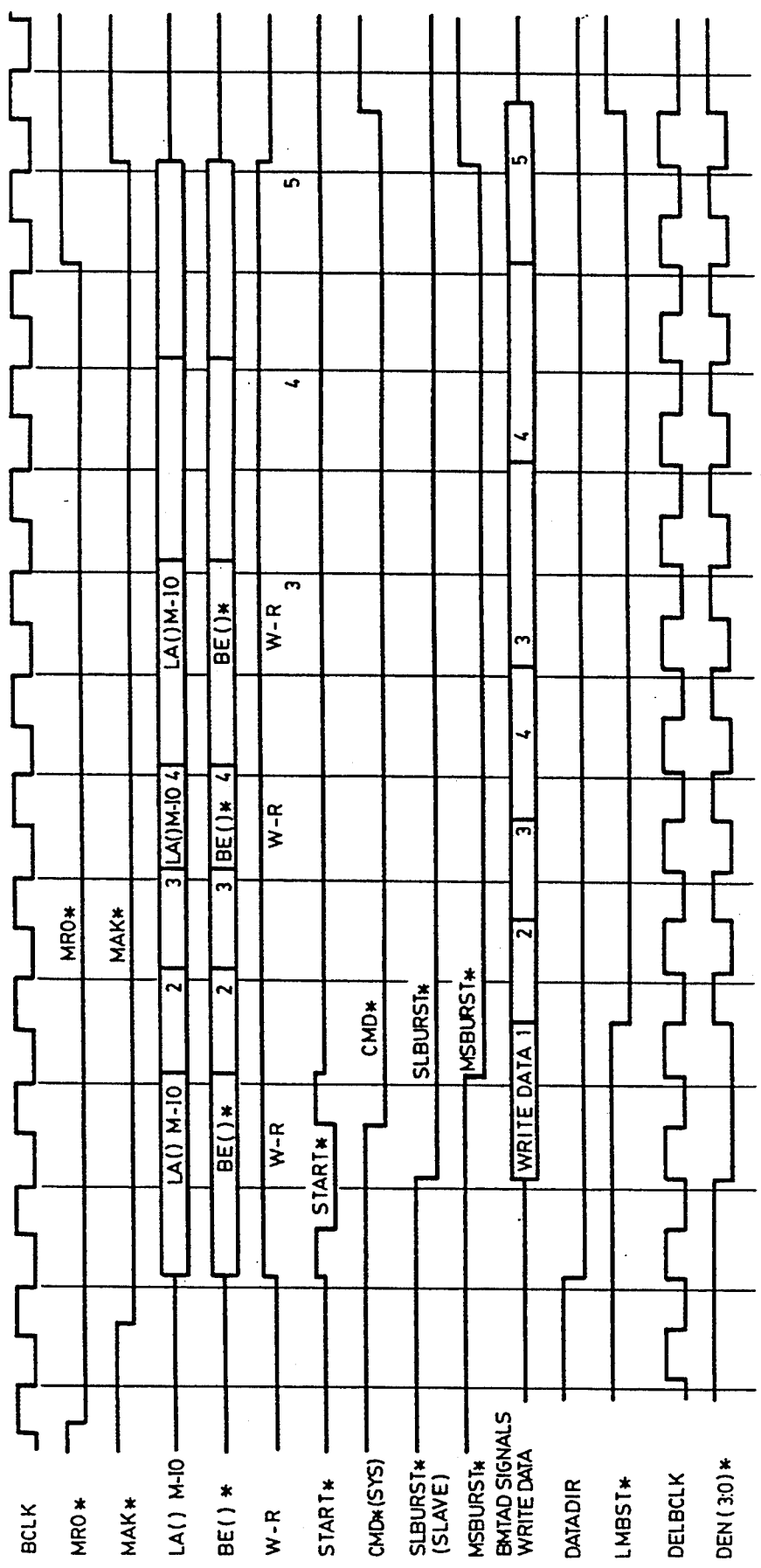

APPARATUS WITH LEADING EDGE DELAY CIRCUIT FOR SELECTIVELY SENDING A DELAYED SUBSTITUTE VERSION OF A SIGNAL TRANSMITTED BETWEEN AN EXPANSION CARD AND A SYSTEM BUS

This is a continuation of application Ser. No. 07/633,119 filed on Dec. 21, 1990, now abandoned.

BACKGROUND OF THE INVENTION

1. Field of the Invention

The present invention relates to an apparatus for conditioning signals in a computer system, and more particularly to an apparatus for conditioning signals input to a computer system board to determine system board compatibility with bus timing specifications.

2. Description of the Related Art

The personal computer industry is a vibrant and growing field that continues to evolve as new innovations occur. A driving force behind the success of the personal computer industry has been the concern on the part of system designers to maintain compatibility between the newer computer systems that are being developed and the older systems that are currently on the market or in use. Many of the compatibility problems that arise in the design of computer systems result from the necessary timing considerations between the various components within the system and the external input/output (I/O) devices that are connected to the system. Communication between the various components and external I/O devices is possible via a system bus, which is essentially an electrical highway connecting the various elements of the computer together. In a computer system, the system bus resides on the computer system board. Timing considerations require that the timing of the operations on this bus must be suitably matched to facilitate the exchange of signals between devices on the bus. The timing between the various elements of the computer system must be synchronized in order for them to be able to communicate with each other and to allow for the proper functioning of the computer system.

In order to maintain backwards compatibility with previous computer systems and software, de facto standard bus architectures have emerged in personal computer systems. One of the standard bus architectures in the personal computer industry is the bus architecture introduced in the International Business Machines Corp. (IBM) PC/AT personal computer, now referred to as the Industry Standard Architecture (ISA). An extended version of this bus architecture has recently been developed, which is referred to as the Extended Industry Standard Architecture (EISA). EISA includes a 32-bit address bus, a 32-bit data bus, and was designed to include full backwards compatibility with all ISA devices and software. In order to provide full testing capabilities to EISA system boards and ensure that these boards actually conform to EISA specifications, an apparatus is needed to verify functional and timing compatibility of EISA system boards.

Background on the ISA and EISA bus architectures is deemed appropriate. IBM's first personal computer, the IBM PC, included an 8 bit data bus and twenty address lines, referred to as the SA<19..0> address lines. However, as the personal computer industry developed, the need for greater amounts of memory became apparent. Therefore, IBM introduced the IBM PC/AT personal computer, which included 24 address lines and 16 data lines. These new address lines were achieved by including seven new latched address lines in the architecture referred to as the LA<23..17> address lines. The latched or LA address lines were developed to take advantage of the faster memory speeds that were available. However, the need for greater amounts of memory, as well as increased data bandwidth, continued to grow, and this need has culminated in EISA. EISA includes a 32 bit data bus, a 32 bit address bus, and retains full backward compatibility with the ISA.

The EISA system bus provides Standard, Compressed, and Burst cycle types for data transfers between the microprocessor and memory or I/O slaves. EISA bus masters may use Standard and Burst cycles, but may not use Compressed cycles. Compressed cycles complete one transfer each 1½ BCLK signal period and are used by the microprocessor to transfer data to or from fast EISA memory or I/O slaves. Burst cycles are zero-wait-state transfers to or from EISA memory which provide a continuous sequence of 1 BCLK read or write cycles. The first data transfer of a Burst Cycle is identical to a normal or Standard EISA cycle. In subsequent Burst Cycles, data is asserted at every falling edge of the BCLK signal because the data is latched on the following rising edge.

The EISA specification requires that a slave card assert one of the following signals, if it is not the default size (8-bit), to indicate the data bus width and general timing it can support: EX32*, EX16*, IO16*, or M16*. An EISA memory or I/O slave asserts EX32* or EX16* to indicate that it supports 32 bit (dword) or 16 bit (word) transfers, respectively. An ISA memory or I/O slave asserts M16* or IO16*, respectively, if the slave has a 16 bit data bus size. An EISA slave card can influence the type of cycle used by asserting the SLBURST* or NOWS* signals. An EISA slave asserts the SLBURST* signal to indicate that it is capable of performing Burst transfers. The NOWS* signal has a different meaning for EISA cycles than for ISA cycles. In EISA transfers, the NOWS* signal indicates that the slave is capable of supporting Compressed cycles. For ISA cycles, the NOWS* signal determines the number of BCLK signal cycles that are required by the slave. The number of wait states which occur during a cycle is controlled exclusively by a slave. An EISA slave negates the EXRDY signal to request wait state timing. An ISA slave negates the CHRDY signal to request wait states and asserts the NOWS* signal to indicate that additional clock cycles are not required.

Computer systems developed around the ISA bus utilize the SA<1> and SA<0> address lines to distinguish between respective 8 bit quantities or bytes being accessed in I/O memory. The ISA bus also includes a signal referred to as SBHE*, which indicates when asserted low that expansion cards which support 16 bit data transfers should drive or receive data on the high half of the D<15..0> or 16 bit data bus. In contrast, the EISA bus includes four byte enable signals referred to as BE<3..0>* which distinguish between respective bytes of data being accessed. The BE<3..0>* signals allow a CPU or EISA bus master to individually access any of the respective bytes residing in the respective dword data structures in memory.

As previously discussed, EISA maintains full backwards compatibility with all ISA devices and software. In order to provide this compatibility, EISA computer systems include logic which allows EISA and ISA devices to talk with each other. This logic is implemented in a chip referred to as the EISA Bus Controller or EBC. The EBC monitors the EISA bus and performs the appropriate bus cycle conversions between ISA and EISA bus cycles. The EBC includes data translation logic to allow EISA expansion cards, which generally include either a 16 bit or 32 bit data size, to operate properly with ISA expansion cards, which include either a 16 bit or 8 bit data size. In performing data translations, the EBC performs signal translations between the BE*<3..0> signals and the SA<1..0> and SBHE* signals, where appropriate. The EBC also performs translations between the EISA cycle control signals CMD*, W-R and M-IO and the ISA command signals MRDC*, MWTC*, IORC*, and IOWC*. Therefore, the EBC performs ISA/EISA bus cycle and data translations to enable ISA and EISA bus masters and slaves with varying data sizes to interface with each other and to the host processor.

During bus master cycles, the EBC tracks the bus cycles being performed and performs the necessary translations between the EISA and the ISA control signals, as described above. It also detects data size mismatch conditions that require it to take control of the bus and run additional cycles. For example, if a 32 bit EISA bus master is attempting to perform 32 bit data transfers to a 16 bit ISA slave, the EBC would automatically translate the EISA signals into ISA signals. It would also break up the 32 bit transfer into two 16 bit transfers to/from the ISA slave. On write transfers, the EBC stores the high order word written by the bus master while the low order word is being transferred to the slave. It would then change the appropriate address lines and copy the high order word written by the bus master to the low order byte lanes and complete the second transfer. On a read transfer, the EBC would, after completing the proper translations, latch the 16 bits from the slave and initiate another transfer. It would change the appropriate address line to point to the next word from the slave and latch the 16 bits of data received. It would then reassemble the data read in the two 16 bit reads into one 32 bit dword, drive the 32 bits of data onto the data bus, and assert the EX32* signal, signalling the bus master to latch the 32 bit dword present on the data bus.

At the trailing edge of the START* signal, 16 and 32 bit EISA bus masters sample the EX32* signal to determine if the accessed slave supports 32 bit EISA transfers. A 16 bit EISA bus master also monitors the EX16* and EX32* signals to determine if the accessed slave supports 16 bit EISA transfers. For 32 bit bus masters, the asserted EX32* signal indicates that the accessed slave supports 32 bit EISA transfers, and the negated EX32* signal indicates that the EBC must perform data size translation. For 16 bit bus masters, the asserted EX16* or EX32* signal indicates that the accessed slave supports 16 bit EISA transfers, and the negated EX16* (and EX32*) signal indicates that the EBC must perform data size translation. When the respective EX32* or EX16* signals are negated, the bus master tri-states its BE<3:0>* signal outputs, the START* signal, and its data lines to allow the EBC to take control of the bus and generate its own BE<3:0>* signals and START* signal and drive the data bus during write operations.

In instances where a 16 bit bus master is performing a write operation to an odd address of a 32 bit slave, the EBC may perform a data copying operation from the low order to high order bytes of the data bus to enable the 32 bit slave to receive its data on the high order bytes of the data bus. In this instance, the EBC receives the first 16 bit data transfer and copies this data to the high bytes of the data bus. Also, when a 32 bit bus master is receiving data from an 8 bit or 16 bit slave, the EBC performs data copying from the low order bytes to the high order bytes to enable the bus master to receive a 32 bit transmission.

32 bit EISA bus masters may optionally "downshift" to a 16 bit size to perform Burst cycles with a 16 bit EISA slave. When a 32 bit EISA bus master is downshifting, it asserts the MASTER16* signal while the START* signal is asserted to disable the automatic 32 to 16 bit data size translation performed by the EBC for 16 bit EISA memory Burst slaves. Upon detecting a downshift, the EBC will not take control of the bus, but will allow the bus master to do its own byte masking.

Another difference between the ISA and EISA architectures is that the ISA bus includes four signals referred to as MRDC*, MWTC*, IOWC*, and IORC* to differentiate between memory or input/output (IO) cycles and read or write cycles. In contrast, EISA includes signals referred to as W-R and M-IO to differentiate between write/read and memory/IO cycles, respectively. The W-R and M-IO signals are unique in that they each have three distinct states: asserted, negated or tri-stated.

For more information on EISA signals and cycle types, please refer to the EISA specification, Version 3.1, which is included in this application as Appendix 1.

SUMMARY OF THE INVENTION

The present invention includes a method and apparatus for providing signal conditioning capabilities to selected signals output from an expansion card to a system board to test the timing parameters of the system board. The present invention comprises two signal conditioning cards, one that is designed to be used in conjunction with bus master expansion cards and one that is designed to be used in conjunction with slave expansion cards. The apparatus is interposed between the computer system board and the expansion card and is capable of conditioning the various signals provided to the system board. System board compatibility with bus specifications can therefore be tested by adjusting the signal timing parameters of the signals provided to the system board in incremental steps until errors occur.

The slave signal conditioning card according to the present invention can operate with ISA and EISA slave cards utilizing any of the respective cycle types. The slave signal conditioning card includes programmable delay elements for some of the alterable signals which are placed "in line" between the signals output from the option card and the system board. Each delay element allows a signal to be delayed without affecting its pulse width and further allows a signal delay to extend beyond the maximum range of the EISA specification, thereby maximizing flexibility and providing a means to force bus errors.

The slave signal conditioning card further includes signal advancing logic circuitry which allows an expansion card's output signal to be replaced by a signal generated on the signal conditioning card. The advancing logic enables an output signal to be advanced in generation from what it otherwise normally would be during normal operation of the computer system, thereby allowing a user to locate the minimum window boundary for respective signals. It also allows the user to control the assertion duration or pulse width of respective output signals. The signal advancing logic is also used when timing considerations for a respective signal are such that the inherent delay that occurs with the in-line delay circuit prevents the circuit from being used with that signal.

The respective signal, the delayed version of the signal, and the advanced signal are provided to the inputs of a multiplexer whose output is coupled to the system board. Each conditioned signal includes a user programmable register which enables a user to select the desired version of the signal provided to the system board as well as the amount of delay provided to the delayed version of the signal input to the multiplexer. The desired version of the signal may be either the unconditioned signal, the delayed signal, the advanced signal, or a tri-state output. Any combination of the signals output from the slave card may be conditioned according to the present invention.

The slave signal conditioning card also allows a user to incrementally control the read data valid window in which data is enabled from the slave card in order to verify the data translation operation or CPU read transfer timing of the system board. The signal conditioning card knows when the respective slave card is active by matching its address decode, and it also monitors direct memory access (DMA) channels to know whether a DMA device on the slave has been accessed. Software which controls the slave signal conditioning card is aware of the type of slave expansion card coupled to the conditioning card and the types of cycles run to ensure that the read data valid window is properly configured. A user can incrementally delay the enabling of data from the slave card until errors occur. The slave signal conditioning card also includes logic which guarantees that only the proper channels of the data bus are enabled to the system board.

The slave signal conditioning card includes a counter which guarantees that previous bus cycles included the proper number of BCLK signal cycles. This enables a user to verify that the system board is executing the proper cycle types and the proper length cycles. The delay elements used to delay the read data valid window according to the preferred embodiment can only provide a maximum of 330 ns delay. In order to allow a delay of the enabling of data for a longer period of time than 330 ns, the conditioning card includes logic which allows the data enable delay to begin a preset number of BCLK signal cycles into the bus cycle. This allows for a longer delay, which may be necessary to force errors in longer cycles such as DMA cycles and long ISA programmed cycles.

The bus master signal conditioning card conditions the signals output from the bus master to the system board that are used to control system memory or that are required for EISA/ISA conversion. The MSBURST* and MASTER16* signals are conditioned by placing a delay element in line with the signal as described above for the slave signal condition card, and a digital multiplexer is used to select between the unconditioned signal output from the system board, a delayed version of that signal, or a tri-state output. No advancing logic is included on the bus master signal conditioning card according to the preferred embodiment. The delay circuit for each signal includes a user programmable register which allows a user to select the desired version of the signal as well as the amount of delay provided to the delayed version of the signal.

The bus master signal conditioning card includes logic which generates the START* signal that is provided to the system board. A special circuit is required to generate the START* signal because this signal must be asserted less than 25 ns after the rising edge of the BCLK signal, and the inherent delay of the in line delay circuit described above would cause the START* signal to be delayed beyond its specified limit. The START* generation logic tracks the state of the bus master to anticipate when the START* signal should be asserted. The START* generation logic allows a user to selectively delay the leading and/or trailing edges (setup and hold timing) of the START* signal.

The bus master signal conditioning card includes special delay logic for the W-R and M-IO signals because these signals have three distinct states and therefore the in line delay method does not work effectively for these signals. The W-R and M-IO signals are preferably conditioned when an EISA bus master is talking to an ISA slave because in this instance the system board must convert these signals into the appropriate ISA command signals MRDC*, MWTC*, IORC*, and IOWC*. The W-R and M-IO signals are conditioned by inverting the appropriate signal output from the bus master during the length of the delay period. Upon the end of the delay period, the signal is returned to its proper state.

The bus master signal conditioning card includes logic which controls the enabling of the BE<3:0>* signals or the SA<1:0> and SBHE* signals generated by the bus master in order to test the operation of the translation logic performed by the EBC on the system board. Special control logic is required for these signals because the setup and hold timing of these signals are important, and therefore simply delaying these signals from the bus master is insufficient. The logic tracks bus master cycles in order to predict when these respective cycles should be asserted and allows a user to control the enabling and disabling of these signals. During data translation cycles, the logic floats the BE<3:0>* signals to allow the EBC on the system board to assert them.

The bus master signal conditioning card includes logic which can delay write data from the bus master to verify the timing of the data translation logic performed by the EBC on the system board or to test host memory. The bus master signal conditioning card includes logic which determines when the bus master is active. Software which controls the bus master signal conditioning card knows what type of bus master is attached to the conditioning card and also the type of cycles that are being run in order to ensure that the write data valid window is properly configured. This logic allows a user to incrementally delay the enabling of data from the bus master card until errors occur. The bus master signal conditioning card also includes logic which determines the appropriate direction of data flow between the bus master and the system board and logic which guarantees that only the proper channels of the data bus are enabled to the system board.

BRIEF DESCRIPTION OF THE DRAWINGS

A better understanding of the present invention can be obtained when the following detailed description of the preferred embodiment is considered in conjunction with the following drawings in which:

FIG. 3 is a block diagram illustrating the various components and signal conditioning logic on the SLTAD of FIG. 2;

FIG. 5 is a block diagram illustrating advance signal generation logic on the SLTAD of FIG. 3 according to the present invention;

FIG. 26 is a schematic diagram of the data bus transceivers on the BMTAD of FIG. 14 according to the present invention; and FIGS. 27, 28 and 29 are timing diagrams illustrating the timing of the various cycle types as controlled by the data & signal conditioning logic of FIG. 18.

DETAILED DESCRIPTION OF THE PREFERRED EMBODIMENT

Figure 1:
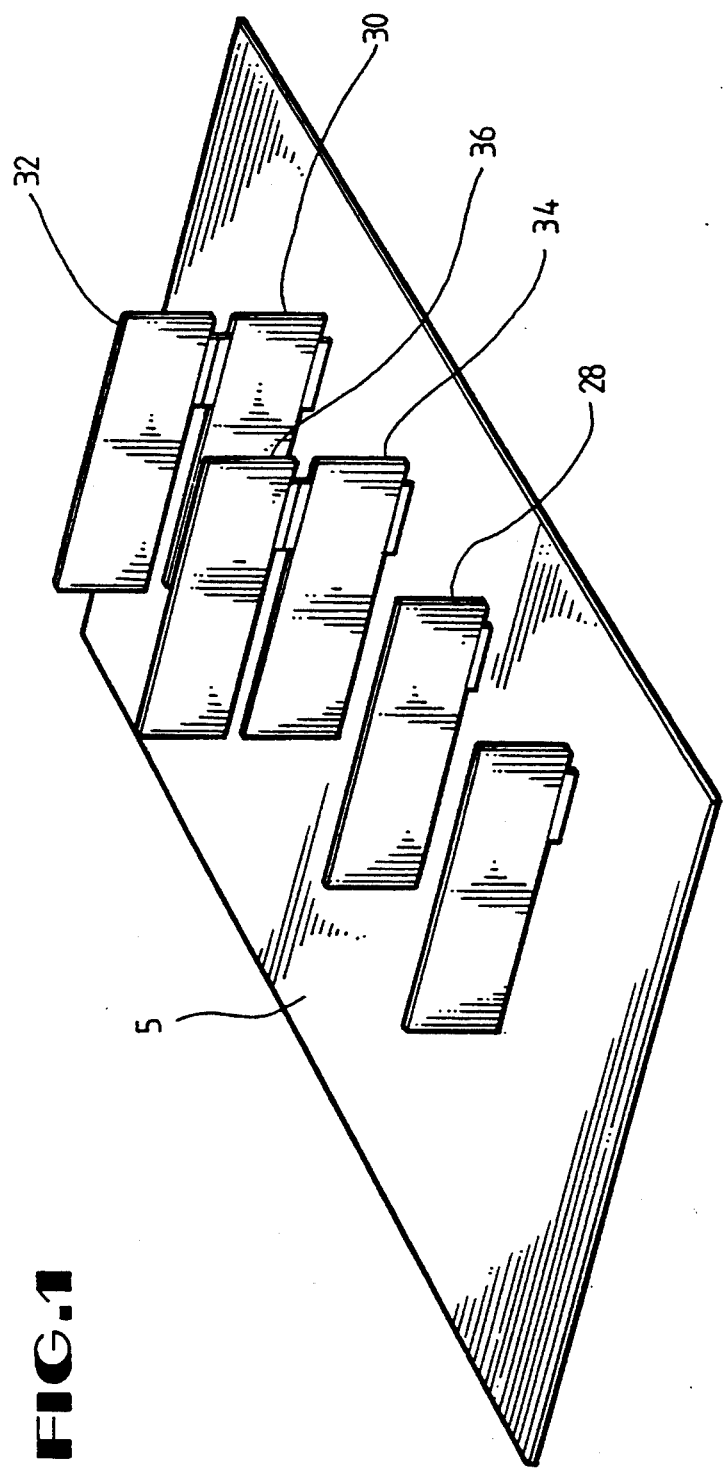
FIG. 1 is a perspective view of a computer system board including signal conditioning cards according to the present invention.

Referring now to FIG. 1, a computer system board S including signal conditioning cards according to the present invention is shown. The system board S includes a bus architecture based on the Extended Industry Standard Architecture (EISA) according to the preferred embodiment, but the use of other bus architectures is also contemplated. The EISA bus includes a 32 bit data bus referred to as $D<31:0>$, a latched address bus referred to as $LA<31:2>$, twenty ISA address lines referred to as $SA<19:0>$, and a number of ISA and EISA control signals. The EISA specification Version 3.1 is included as Appendix 1 to fully explain the requirements of an EISA system. In the following discussion, signal names followed by an asterisk are asserted low and are the inverse of signal names appearing alone.

According to one embodiment, the system board S includes an EISA bus (not shown) which is preferably coupled to a host bus (not shown). A microprocessor and random access memory (not shown) are preferably coupled to the host bus. The system board S also includes an EISA Bus Controller (EBC) chip and an Integrated System Peripheral (ISP) chip (both not shown). The EBC and ISP chips are chips that are designed to work in conjunction with an EISA-based computer system. The EBC chip includes logic which provides the functions necessary to interface to the EISA bus and to provide ISA/EISA bus cycle translations. This enables ISA and EISA bus masters and slaves to interface with each other and to the processor. The ISP integrates many of the EISA required functions into a single device, including a DMA controller and an interrupt controller. In the following discussion, the EBC and ISP are deemed part of the system board S, and functions that are performed by the EBC and ISP are discussed as being performed by the system board S for clarity. For more information on the EBC and ISP, please refer to the Intel Peripherals Handbook, 1990 edition, published by Intel Corporation, which is hereby incorporated by reference.

The system board S includes a number of expansion slots coupled to the EISA bus in which expansion cards may be inserted. In the preferred embodiment, a logic analyzer interface card 28 is preferably installed in one of the expansion slots. The logic analyzer interface card 28 is preferably coupled to a logic analyzer (not shown) to allow a user to analyze the respective signals generated on or provided to the system board S. A slave signal conditioning card according to the present invention referred to as the slave timing advance/delay card or the SLTAD 30 is coupled to an expansion slot on the system board S. An EISA or ISA slave expansion card 32 is preferably coupled to the SLTAD 30 according to the present invention. The SLTAD 30 interfaces between the EISA bus on the system board S and the slave card 32 and provides signal conditioning capabilities for ISA/EISA slaves and DMA devices. A bus master signal conditioning card according to the present invention referred to as the bus master timing advance/delay card or the BMTAD 34 is coupled to a bus master expansion slot on the system board S. An ISA or EISA bus master card 36 is preferable coupled to the BMTAD 34 according to the present invention. The BMTAD 34 interfaces between the EISA bus on the system board S and the bus master card 36 and provides signal conditioning capabilities for EISA and ISA bus masters. The SLTAD 30 and the BMTAD 34 thereby enable a user to determine system board compatibility with EISA specification timing limits by allowing the adjustment of signal timing parameters from the slave card 32 and the bus master card 36 to the system board S in incremental steps.

Figure 2:
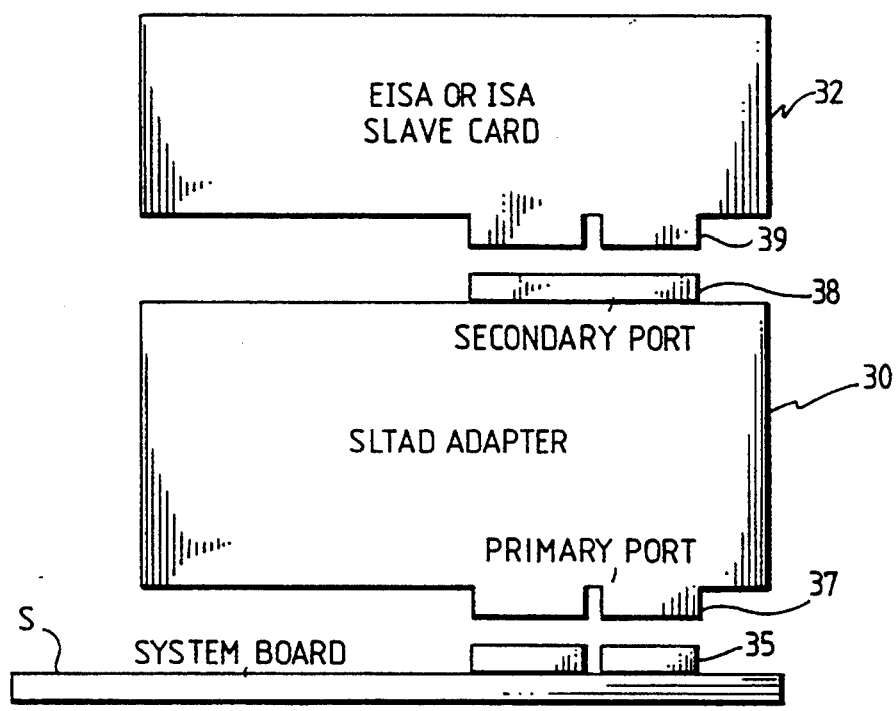
FIG. 2 is a side view of the slave signal conditioning card (SLTAD) interfaced between the system board and the slave expansion card according to the present invention.

Referring now to FIG. 2, the SLTAD 30 is shown coupled between the system board S and the slave card 32. The SLTAD 30 includes a primary port 37 which couples to the EISA slot 35 on the system board S. The SLTAD 30 also includes a secondary port 38 which is adapted to receive the EISA slot connection 46 of the slave card 32. Therefore, the SLTAD 30 according to the present invention comprises two EISA connectors. The edge connector or primary port 37 located on the bottom of the card plugs into the system board S, and the system board equivalent connector, the secondary port 38, located on the top of the SLTAD 30, allows the slave card 32 to plug into it. Both connectors 37 and 38 employ the standard EISA pinout according to the preferred embodiment.

Referring now to FIG. 3, a block diagram illustrating the various components which comprise the SLTAD 30 is shown. The SLTAD 30 includes in line signal conditioning logic circuitry 40 comprising a number of advance/delay circuits which enable selected output signals from the slave card 32 to the system board S to be delayed or advanced. The logic circuitry is user programmable and therefore allows a user to control which of the signals output from the expansion card 30 are to be delayed or advanced and the length of the delay or advance. The SLTAD 30 includes advance signal generation logic 41 which generates an advance signal that is provided to each of the advance/delay conditioning circuits in the in line conditioning circuitry 40. The SLTAD 30 includes data enable conditioning logic 42 which allows a user to selectively delay the read data valid window of data provided from the slave 32 to the system board S. The data enable conditioning logic is coupled to data transceivers which are used to enable data between the slave card 32 and the system board S.

The SLTAD 30 includes a block circuit 43 comprised of various control registers which control the operation of the data enable conditioning circuit 42. The SLTAD 30 includes a block circuit 44 comprising a number of DIP switches which are used to match the I/O address of the slave card 32. The SLTAD 30 includes a counting circuit 48 which counts the number of BCLK signal cycles in respective bus cycles.

All of the output signals from the system board S, except the data bus signals D<31:0>, are passed directly through buffers 45 to the slave card 32. The data signals are buffered through the transceivers 46 controlled by the data enable conditioning circuit 42 to enable a user to control the read data valid period. This enables a user to verify the operation of the system board S. The SLTAD 30 knows when the slave card 30 is addressed and software which controls the SLTAD 30 knows the proper data valid window. This allows a user to incrementally control the window in which the data is enabled. If the functions of the SLTAD 30 are disabled, the SLTAD 30 acts as an extender board with only minimal delays on the outputs from the slave card 32. The exception to this is the data bus, which is only enabled if the expansion card is addressed.

The SLTAD 30 includes an 8 bit user programmable register 47 referred to as the SLTAD parameters register. Because this type of register is well known to those skilled in the art, details of its implementation have been omitted for the purpose of clarity. The SLTAD parameters register 47 generates signals referred to as ESLAVE1, ESLAVE0, WIDTH1, and WIDTH0, respectively. The WIDTH0 and WIDTH1 signals represent the width of the data bus usable by the slave card 32. If the WIDTH0 and WIDTH1 signals both have 0 values, then the slave card 32 is a 16 bit card that may use the low order 16 bits of the data bus. If the WIDTH0 and WIDTH1 signals have values 0 and 1, respectively, then the slave card 32 is an 8 bit card that can only use the lower 8 bits of the data bus. If the WIDTH0 and WIDTH1 signals both have 1 values, then the slave card 32 is a 32 bit card that can use the entire 32 bits of the data bus. The ESLAVE0 signal represents whether the slave card 32 is an EISA or ISA slave. The ESLAVE0 signal is a logic low value to represent that the slave card 32 is an ISA slave and is a logic high value to represent that the slave card 32 is an EISA slave. The ESLAVE1 signal is not used according to the preferred embodiment.

Figure 4:
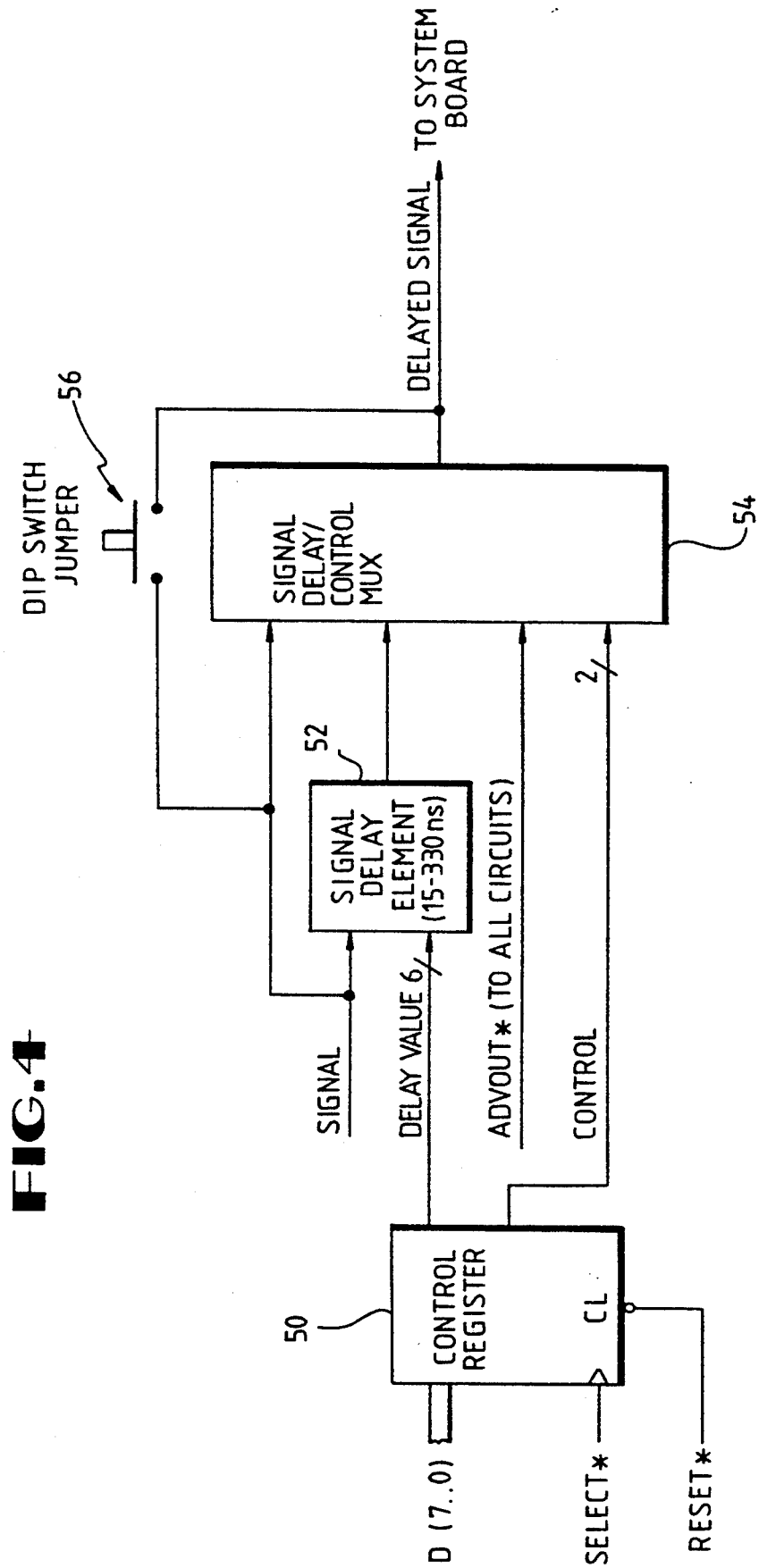
FIG. 4 is a block diagram illustrating an in line signal conditioning circuit and its associated control register on the SLTAD of FIG. 3 according to the present invention.

Referring now to FIG. 4, a block diagram illustrating an in line advance/delay circuit from the in line conditioning circuitry 40 (FIG. 3) used on the SLTAD 30 to condition some of the signals output from the slave card 32 is generally shown. The SLTAD 30 includes one advance/delay circuit for each of the IO16*, M16*, EX16*, EX32*, EXRDY, CHRDY, NOWS*, and SLBURST* signals to control the conditioning of these signals from the slave card 32 to the system board S. Some of these signals may have a slow rise time due to the small pull-up and increased capacitance of the EISA system board S. It should be noted that installing the SLTAD 30 between the slave card 32 and the system board S may exacerbate this problem. Therefore, the use of corrective measures such as additional pull-up resistors may be necessary for some signals.

As previously discussed, one of either the EXRDY, CHRDY, or NOWS* signals is used by the slave card 32 to indicate the speed and cycle type that it is capable of performing. The system board S must allow the proper timing window for the slave 32 to assert these signals before determining the number of wait states required. Therefore, the timing window for these signals is tested by selectively delaying the assertion of these signals until the system board S determines an incorrect number of wait states.

Additionally, the slave 32 must assert one of either of the EX32*, EX16*, IO16*, or M16* signals, if it is not the 8 bit default size, to indicate the data bus width it can support. The system board S determines which data bus lanes have valid data from these slave response signals. Therefore, the SLTAD 30 allows a user to selectively condition these signals in order to test the operation of the system board S. These signals can be delayed to prevent the slave 32 from responding in time. The failure of the slave 32 to respond in time causes the system board S to respond as if it was talking to an 8 bit slave. This may cause the system board S to break the transfer up into multiple transfers, causing too many BCLK signal cycles in the transfer, or may possibly cause data errors.

Each of the advance/delay or in line circuits for the above-mentioned signals includes a signal delay element 52, a signal delay/control multiplexer 54, and a DIP switch jumper 56. Each advance/delay circuit has associated with it a user programmable control register 50, which generates two control signals that are provided to the multiplexer 54. The control register also generates six signals that are provided to delay select inputs of the signal delay element 52. The signal output from the slave card 32 is input to the signal delay element 52 and the signal delay/control multiplexer 54. The output of the signal delay element 52 is connected to the signal multiplexer 54. The signal output from the slave card 30 is also connected through a DIP switch jumper 56 to the output of the signal multiplexer 54. A signal referred to as ADVOUT* is connected to the signal multiplexer 54. The ADVOUT* signal is generated from ADVANCE logic circuitry on the SLTAD 30 and is used to provide an advanced version of the respective slave card output signal. The signal output from the multiplexer 54 is the desired version of the output signal from the slave card 30 that is provided to the system board S. The signal output from the multiplexer 54 may either be an unconditioned version of the signal output from the slave card 32, a delayed version of that signal, the ADVOUT* signal, or the output may be tri-stated.

The control register 50 is a user programmable register which controls the amount of delay added to the slave output signal by the delay element 52 as well as selecting the appropriate version of the slave card output signal that is provided to the system board S. The control register 50 receives as inputs the D<7..0> signals. A signal referred to as SELECT*, which is the decoded I/O address signal of the respective control register 50, is connected to the clock input of the control register 50. The system bus RESET* signal is connected to the inverted clear input of the register 50. Therefore, upon a system reset, the control registers for each of the advance/delay circuits are reset to 0 values.

The control register 50 includes eight bits, referred to as bits 0 through 7, and each of the bits in the register 50 generates a corresponding signal. Bit 0 and bit 1 are used as control bits to select the desired version of the slave card output signal provided to the system board S, and these bits generate the two control signals that are connected to select inputs of the multiplexer 54. When bits 1 and 0 both have value 0, then the multiplexer passes through the unconditioned signal output from the slave board 32 to the system board S. If bit 1 and bit 0 have values 0 and 1, respectively, then the signal provided to the system board S is the ADVOUT* signal. The generation of the ADVOUT* signal is discussed below. If bit 1 and bit 0 have values 1 and 0, respectively, then the delayed signal output from the signal delay element 52 is provided to the system board S. In this instance, the amount of delay provided to the slave card output signal is determined by the value stored in bits 2 through 7 of the control register, as is described below. If bits 1 and 0 both have value 1, then the output of the multiplexer is tri-stated.

With the DIP switch jumper 56 disabled, the minimum delay added to the slave output signal is the propagation delay through the advance/delay circuit with the delay feature programmed OFF (bits 0 and 1 of the control register 50 both having value 0). When so configured, a 12 ns (max) delay exists through this logic in the preferred embodiment. The inherent delay is defined as the propagation delay through the advance/delay circuit with the delay feature programmed ON (bits 0 and 1 having values 1 and 0, respectively) and the delay element 52 programmed to provide zero delay.

The value of the inherent delay varies for each delay circuit and is generally characterized as having a maximum of 27 ns. The inherent delay is therefore comprised of the 12 ns minimum delay through the multiplexer 54 and a 15 ns minimum delay provided by the signal delay element 52. Therefore, the amount of delay added to the respective slave card output signal by the delay element 52 is the amount of programmable delay from the signal delay element 52 plus the inherent delay of the circuit. Bits 2 through 7 of the control register 50 generate corresponding signals that are connected to delay select inputs of the signal delay element 52, and these bits control the amount of programmable delay added to slave card output signal.

The programmable delay adds to the inherent delay in steps of 5 ns, and the value stored in bits 2 through 7 corresponds to the number of 5 ns delays added to the inherent delay of the signal. For example, the value 000001 stored in bits 2 through 7 corresponds to a 5 ns delay, value 000010 corresponds to a 10 ns delay, and so on. The amount of inherent delay is added to the programmable value to arrive at the total delay added. Therefore, if the inherent delay is defined to be 27 ns, the step size is defined to be 5 ns, and the delay register value is seven, then the total delay is 27+35=62 ns. Thus the desired delay may be calculated by the following equation:

$$\text{Delay} = \text{Inherent Delay} + (N \times \text{Step Size})$$

where:
Inherent Delay = minimum delay with delay enabled;
N = Delay register value;
Step Size = delay increment for that signal (5 ns).
The maximum delay provided by the delay element 52 is 330 ns.

For the remainder of this specification, the delay elements described below operate in an identical manner to the signal delay element 52 described above whereby the signal value provided to the delay select inputs of the delay element correspond to the number of 5 ns delays added to the signal input to the delay element.

For cases where the minimum delay of the advance/delay signal shifts a slave card output signal beyond its specification limits, the DIP switch jumper 56 is provided in each advance/delay circuit to allow a user to bypass the advance/delay signal conditioning logic for a respective signal. In this instance, the output of the multiplexer 54 is tri-stated by programming bit 0 and bit 1 of the control register 50 with 1 values, and the signal output from the slave card 32 is provided directly to the system board S.

When bits 0 and 1 of the control register 50 have values 0 and 1, respectively, then the ADVOUT* signal replaces the slave card output signal as the signal provided to the system board S. The ADVOUT* signal is used when the inherent delay of the advance/delay circuit makes it impossible for an output signal from the slave card 32 to meet the maximum allowable timing window for that signal. Therefore, signal advancing compensates for the inherent delays caused by the in-line signal advance/delay circuitry in those cases where the inherent delay caused by the advance/delay circuit shifts the slave output signal beyond the maximum specified limit of the EISA specification. Signal advancing also provides a means to locate the minimum window boundary for respective slave output signals. Signal advance testing is a relatively customized procedure for each respective signal. Only one signal advancing circuit is provided on the SLTAD adapter in the preferred embodiment, and therefore only one signal can be advanced at any one time according to the preferred embodiment. However, the use of a greater number of signal advancing circuits is also contemplated.

Referring now to FIG. 5, the advance signal generation logic 42 which generates the ADVOUT* signal is generally shown. The ADVOUT* signal feeds into all of the advance/delay circuits described above. Since the ADVOUT* signal may be substituted for any of the respective slave card output signals, the pulse width is programmable according to the present invention. The leading edge of the ADVOUT* signal is generated a delayed amount of time after the leading edge of the START* signal, dependent on the status of the M-IO signal, as is described further below.

The advance signal generation logic 41 includes two control registers 80 and 82, a programmable array logic (PAL) device referred to as the advance control PAL 84, and two signal delay elements 86 and 88. The control registers 80 and 82 are each eight bit programmable registers which allow a user to control the characteristics of the ADVOUT* signal. A signal referred to as ADVSEL is connected to the clock inputs of the control registers 80 and 82. The ADVSEL signal represents the decoded I/O address of the registers 80 and 82. The system RESET* signal is connected to inverted clear inputs on each of the control registers 80 and 82. The control registers 80 and 82 receive as inputs the data bus signals D<7..0> and D<15..8> signals, respectively. Therefore, when a user is writing to or programming the control registers 80 and 82, the ADVSEL signal is asserted, allowing the registers 80 and 82 to latch the programmed data from the data bus.

Bits 0 and 1 of each of the registers 80 and 82 are used as control bits, and the corresponding Q outputs generate control signals that are provided to the advance control PAL 84. Bits 0 and 1 of the control register 80 generate signals referred to as ADVS0 and ADVS1, and these signals control when the ADVOUT* signal is asserted. The ADVOUT* signal is asserted low a delayed amount of time after the START* signal is asserted. If bits 1 and 0 have values 1 and 0, respectively, then the ADVOUT* signal is asserted a delayed amount of time after the falling edge of the START* signal when the M-IO signal is a logic high value. If bits 1 and 0 both have 1 values, then the ADVOUT* signal is asserted low a delayed amount of time after the falling edge of the START* signal when the M-IO signal is a logic low value. The conditions where bits 1 and 0 either both have 0 values or have values 0 and 1, respectively, are preferably reserved for future enhancements according to the preferred embodiment.

Bits 0 and 1 of the control register 82 generate signals referred to as ADVS8 and ADVS9, and these signals also control the assertion or setup time of the ADVOUT* signal according to the preferred embodiment. Bits 0 and 1 are both preferably set to 0 values according to the preferred embodiment, signifying normal assertion of the ADVOUT* signal a delayed amount of time after the falling edge of the START* signal. The remaining combination of values for bits 0 and 1 of the control register 82 are preferably reserved for future enhancements according to the preferred embodiment.

The Q<2..7> outputs of the control register 80 are coupled to delay select inputs of the delay element 86.

The delay element 86 controls the assertion of the ADVOUT* signal by providing a selected amount of delay after the falling edge of the START* signal before the ADVOUT* signal can be asserted, and this delay length is dependent on the value stored in bits 2 through 7 of the control register 80. The Q<2..7> outputs of the control register 82 generate signals that are coupled to delay select inputs of the delay element 88. The delay element 88 controls the negation or hold time of the ADVOUT* signal by providing a selected amount of delay during which time the ADVOUT* signal remains asserted. This delay length is dependent on the value stored in bits 2 through 7 of the control register 82. Each of the delay elements 86 and 88 provides a length of delay dependent on the respective signal values provided to its delay select inputs, as was described above.

Signals input to the advance control PAL 84 include the START* signal, a signal referred to as LM-IO, a signal referred to as SLSEL*, the ADVS0, ADVS1, ADVS8, and ADVS9 signals generated from the control registers 80 and 82, a signal referred to as DELADV, and a signal referred to as DELEDGE. The LM-IO signal is a latched version of the M-IO signal. The SLSEL* signal indicates, when asserted low, that the slave 32 has been accessed. The outputs of the advance control PAL 84 are the ADVOUT* signal and signals referred to as ADVSIG and EDGE. The ADVSIG signal is connected to the signal input of the delay element 86, and the EDGE signal is connected to the signal input of the delay element 88. The output of the delay element 86 is the DELADV signal, and the output of the delay element 88 is the DELEDGE signal.

The advance circuit 41 asserts the ADVSIG signal when the slave 32 has been selected, the START* signal is asserted, and the LM-IO signal has the chosen polarity. The ADVOUT* signal is not asserted unless the SLSEL* signal is asserted. This ensures that the SLTAD 30 does not assert the ADVOUT* signal to the system board S unless the slave card 32 attached to it is addressed. Therefore, the SLSEL* signal, which indicates that the slave 32 is addressed, acts as an enable for the advance circuit 41. When the ADVSIG signal has propagated through the delay element 86, the DELADV signal is asserted to the advance control PAL 84. The asserted DELADV signal causes the PAL 84 to assert the ADVOUT* signal and also assert the EDGE signal to the delay element 88. When the EDGE signal has propagated through the delay element 88, the DELEDGE signal is asserted to the PAL 84, which negates the ADVOUT* signal.

The advance control PAL 84 generates two internal signals referred to as SPARE0 and SPARE1 which aid in decoding the assertion of the ADVOUT*, ADVSIG, and EDGE signals. The equation for the SPARE0 signal is:

$$\begin{aligned}SPARE0 = &\ RESET^* \cdot (SPARE1^* \cdot SPARE0^* \cdot \\ &\ SLSEL \cdot (ADVS1 \cdot ADVS0^* \cdot START \cdot LM\text{-}IO \\ &\ + ADVS1 \cdot ADVS0 \cdot START \cdot LM\text{-}IO^*) \\ &\ + SPARE1^* \cdot SPARE0 \\ &\ + SPARE1 \cdot SPARE0 \cdot DELEDGE^*)\end{aligned}$$

The SPARE0 signal decodes the condition where the ADVSIG signal should be asserted, which occurs on the falling edge of the START* signal when the LM-IO signal has the proper polarity. The SPARE0 signal remains asserted until the DELEDGE signal is negated. The equation for the SPARE1 signal is:

---
SPARE1 = (SPARE1* · SPARE0 · DELADV
+ SPARE1 · SPARE0
+ SPARE1 · SPARE0* · START*) · RESET*
---

The SPARE1 signal is asserted when the DELADV signal is asserted high and decodes the condition where the EDGE signal should be asserted. The SPARE1 signal remains asserted until the START* signal is negated low or until the RESET signal is asserted.

The equations for the ADVOUT*, ADVSIG, and EDGE signals are:

ADVOUT=SPARE1·SPARE0

ADVSIG=SPARE1*·SPARE0

EDGE=SPARE1·SPARE0

The control registers block circuit 43 on the SLTAD 30 includes two programmable 8 bit registers referred to as the data delay control registers. The data delay control registers control the assertion of the read data valid window of the slave card 32. These programmable registers enable a user to control the enabling of data from the slave 32 through software. The registers generate output signals referred to as DATADS<15:0>. The DATADS<15:0> signals are provided to the data enable conditioning logic 42, which is discussed below. The DATADS<3:0> signals control when data should be delayed from the slave card 32. When the DATADS<3:0> signals have value 0000, then the data delay feature is disabled, and data is enabled normally on all slave accesses. When the DATADS<3:0> signals have value 0001, then the read data valid period is delayed on all slave memory and I/O read cycles. In this instance, the amount of delay inserted before the data is enabled is controlled by the DATADS<15:10> signals, and for Burst and Compressed cycles is controlled by the DATADS<9:4> signals. During Burst and Compressed cycles, the data enable is delayed by delaying the BCLK signal, and the DATADS<9:4> signals control the amount of delay provided to the BCLK signal during Burst and Compressed cycle transfers. The DATADS<3:0> signal values 0010–0111 are spare conditions that are not used according to the preferred embodiment. When the DATADS<3:0> signals have value 1XXX, then the programmable delay is begun after XXX BCLK signal cycles. This provides an extra measure of delay for longer cycles, as is described further below.

The DIP switch block circuit 44 (FIG. 3) on the SLTAD 30 includes a physical address select DIP switch that is used to set up an I/O address for the SLTAD 30 so the various control registers on the SLTAD 30 can be user programmable. The DIP switch is used to select a base I/O address from the SA<11:4> address signals. The SA<3:0> signals are then used to decode the individual addresses for each of the respective control registers on the SLTAD 30. Because this type of address decode is well known to those skilled in the art, the details of its implementation have been omitted for the purpose of clarity.

The DIP switch block circuit 44 also includes a set of DIP switches that are used to match the address range set up on the slave expansion card 32. The SLTAD 30 duplicates the memory, I/O, and DMA channel decoding of the slave card 32. This allows the SLTAD 30 to know when the slave card 32 is being addressed, allowing it to enable data to and from the system board S at the proper times. The SLTAD 30 occupies the same slot as the slave card 32, and this requires that, in spite of the slot-specific I/O addressing of the EISA bus, the SA< > lines be monitored to determine whether the slave 32 or the SLTAD 30 is being addressed in order to avoid data contention problems. The SLTAD 30 decodes the I/O port address of an ISA slave 32 from the SA<11:8> signals. The block circuit 44 includes a DIP switch referred to as DIP switch 1 (not shown), which includes four switches that are set to logical values representing the SA<11:8> signal values of the I/O port address of the slave 32 if the slave 32 is an ISA slave. The four values output from DIP switch 1 are collectively referred to as the DIPSW1 signals. The DIPSW1 signals are tied to pull-up resistors and by default have logic high values.

The SLTAD 30 decodes an EISA memory address from the LA<31:17> signals and decodes an ISA memory address from the LA<23:17> signals. The DIP switch block circuit 44 on the SLTAD 30 includes two DIP switches referred to as DIP switch 2 and DIP switch 3 (not shown). DIP switch 2 includes 8 switches that are set to logical values representing the LA<31:24>* signal values of the EISA memory address of the slave 32 if the slave 32 is an EISA memory mapped slave. The outputs of DIP switch 2 are collectively referred to as the DIPSW2 signals. The DIPSW2 signals are tied to pull-up resistors and by default have logic high values. DIP switch 3 includes 7 switches that are set to logical values representing the LA<23:17> signal values of an EISA or ISA memory mapped slave 32. The outputs of DIP switch 3 are collectively referred to as the DIPSW3 signals. The DIPSW3 signals are tied to pull-up resistors and by default have logic high values.

Due to the unique cycle timing of Compressed cycles, the delay of the data enable is handled differently for these cycles than for normal cycles. Not all EISA system boards are capable of supporting Compressed cycles, and the SLTAD 30 must know if the respective system board S can support Compressed cycles. Therefore, the block circuit 44 includes a DIP switch (not shown) which allows a user to inform the SLTAD 30 that the system board S is capable of supporting Compressed cycles. The switch input receives a signal referred to as CMPR* from the data enable conditioning logic 42. The CMPR* signal indicates when asserted low that a Compressed cycle is occurring. The output of the switch generates a signal referred to as COMPR*. When the switch is closed, then the COMPR* signal is asserted low when the CMPR* signal is asserted, and the data enable conditioning circuit 42 on the SLTAD 30 enables the special timing required to execute control of these cycles.

The BCLK signal counter circuit 48 (FIG. 3) comprises two 8 bit counters (not shown) collectively referred to as the BCLK counter. The BCLK counter counts the number of BCLK signal cycles in respective bus cycles. Because this type of counting circuitry is well known to those skilled in the art, the details of its implementation have been omitted for the purpose of clarity. The BCLK counter provides the software with a method to verify that the previous cycle(s) included the proper number of BCLK signal cycles. This verifies that the system board S is executing the proper cycle types and the proper length. The BCLK counter counts the total number of BCLK signal cycles while the slave card 32 is selected (addressed) or when the slave card 32 is an active DMA device. The BCLK counter is read from the SLTAD's I/O space. This allows the BCLK counter to be read without altering its count. The BCLK counter is cleared after a read and continues its count from where it stopped if it has not been cleared.

Figure 6A:
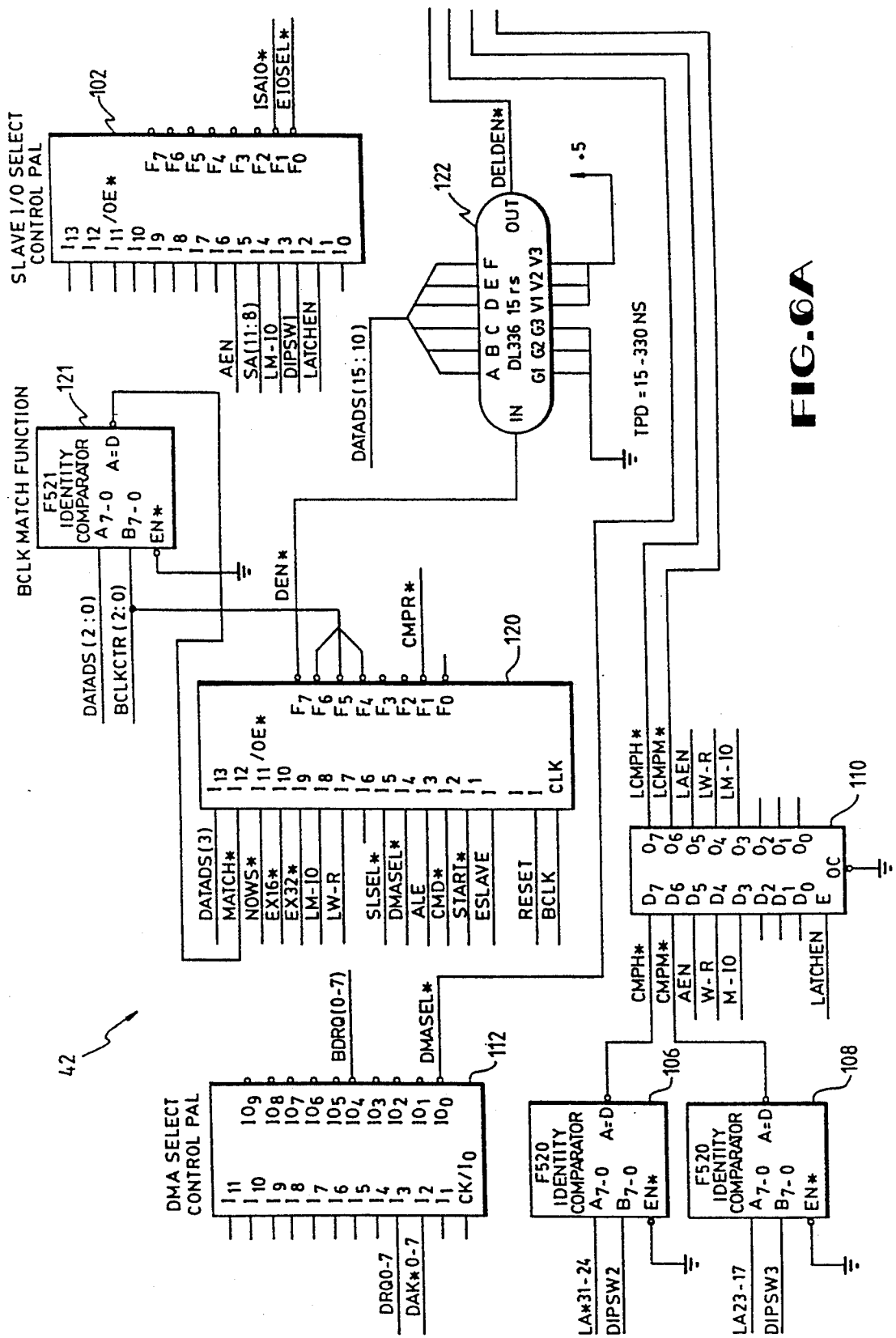
FIG. 6 is a block diagram illustrating data enable conditioning logic on the SLTAD of FIG. 3 according to the present invention.
Figure 6B:
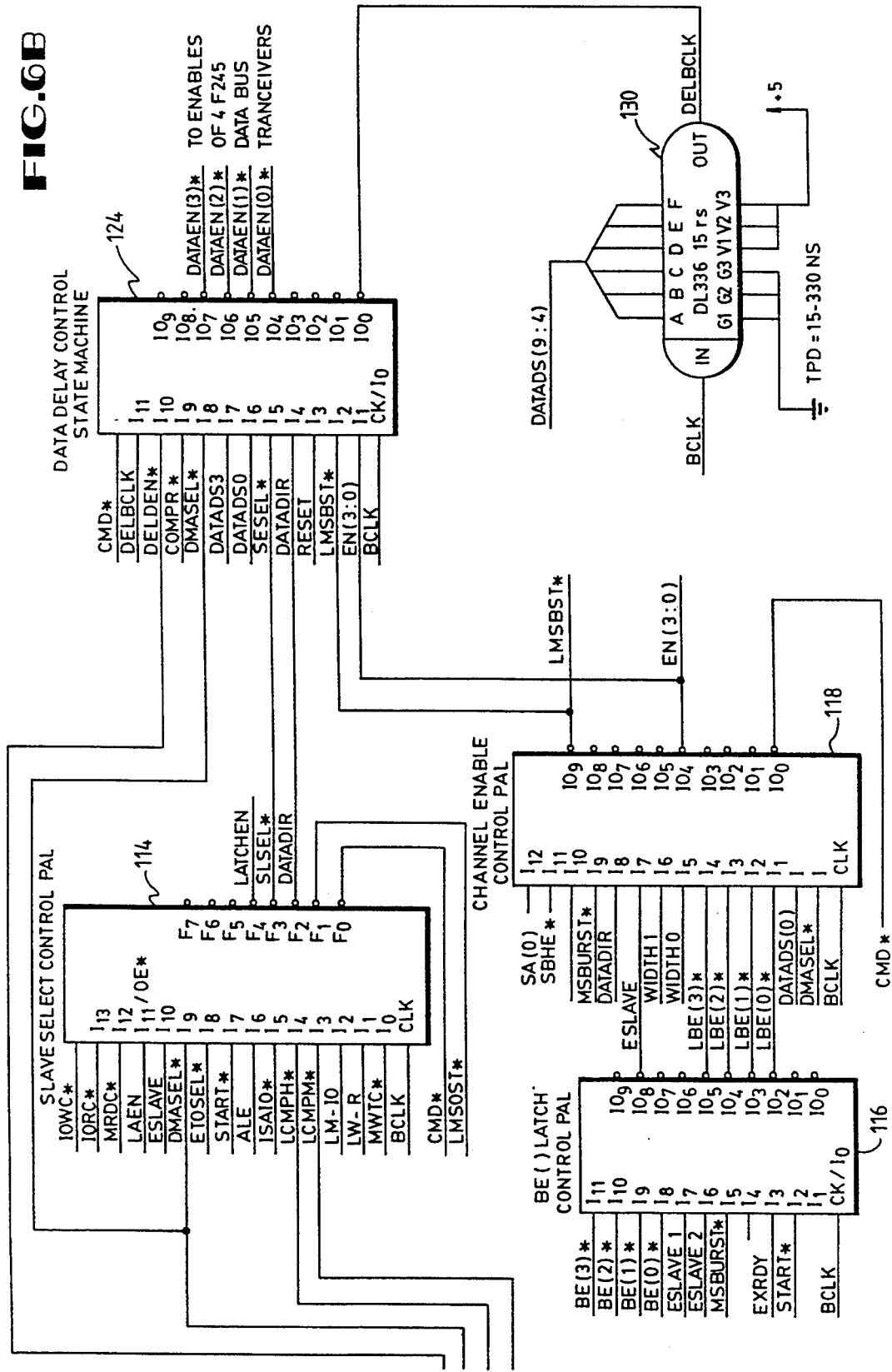

Referring now to FIG. 6, the data enable conditioning circuit 42 which controls the enabling of data to and from the slave 32 is shown. The data enable conditioning circuit 42 enables a user to shift the data valid window in 5 ns programmable steps as well as control its duration. The circuit works with EISA and ISA memory and I/O slaves, as well as with DMA devices. The circuit works in all cycle types, including cycles with various numbers of wait-states as well as Standard, Compressed and Burst Cycles.

The data enable conditioning circuit 42 includes a PAL referred to as the Slave I/O Select Control PAL 102, which decodes ISA or EISA I/O port addresses of the slave card 32, depending on whether the slave card 32 is an ISA or EISA I/O slave card, respectively. The PAL 102 receives input signals AEN, SA<11:8>, LM-IO, the four DIPSW1 signals, and a signal referred to as LATCHEN, and generates two signals referred to ISAIO* and EIOSEL*. The LATCHEN signal indicates when asserted high that the slave 32 has begun a cycle and is used to latch signals at the beginning of a cycle that are pipelined in order to preserve the status of these signals. The ISAIO* signal indicates when asserted low that the slave 32 is an ISA slave and has been selected. The EIOSEL* signal is asserted low when the slave 32 is an EISA slave and has been selected.

The PAL 102 decodes a condition referred to as LAX to aid in generating the EIOSEL* signal. The LAX condition is decoded as

LAX=AEN·LATCHEN+LAX·LATCHEN*

The LAX condition is a latched version of the AEN signal. The AEN signal is high during DMA cycles and slot-specific I/O cycles to other slots to prevent I/O slaves from mis-interpreting these cycles as valid I/O cycles. The I/O port address is decoded from the SA<11:8> signals when the AEN signal is low. The equation for the ISAIO* signal is:

ISAIO=(SA<11:8>==DIPSW1)·AEN*

The ISAIO* signal is asserted low when the slave I/O select control PAL decodes the port address of the ISA slave card 32 and the AEN signal is low, indicating that an I/O slave can respond. The EISA I/O port addressing is slot-specific and requires the AEN signal and the LM-IO signal to be low, as well as the SA<11:8> signals to have values :C or :8. The equation for the EIOSEL* signal is:

EIOSEL=((SA<11:8>==1000)+-
    (SA<11:8>==1100))·LAX*·LMIO*

The EIOSEL* signal is asserted low when the slave select I/O control PAL 102 decodes the respective slot-specific EISA addresses with the LAX condition false. The false LAX condition indicates that the slot-specific AEN signal is negated to the slave 32, signifying that the EISA slave 32 has been selected.

If the slave 32 is memory-mapped, the SLTAD 30 decodes its EISA or ISA memory address by comparing the LA<31:17> and/or LA<23:17> signals, respectively, with the address selected by DIP switch 2 and DIP switch 3. Referring again to FIG. 6, the LA<31..24>* signals are connected to the A<7:0> inputs of a comparator 106. The DIPSW2 signals are connected to the B<7..0> inputs of the comparator 106. The inverted enable input of the comparator 106 is connected to a logic low value. The output of the comparator 106 is a signal referred to as CMPH*, which is asserted low when the LA<31:24>* signals match the value stored in DIP switch 2. The LA<23..17> signals are connected to the A<7..0> inputs of a comparator 108. The DIPSW3 signals are connected to the B<7..0> inputs of the comparator 108. The inverted enable input of the comparator 108 is connected to a logic low value. The output of the comparator 108 is a signal referred to as CMPM*, which is asserted low when the LA<23:17> signals match the value stored in DIP switch 3. An EISA memory slave 32 requires both of the comparator outputs CMPH* and CMPM* to be true for a proper decode, and an ISA memory slave 32 requires only that the CMPM* signal be true.

The CMPH* signal, the CMPM* signal, the AEN signal, the W-R signal, and the M-IO signal are connected to the inputs of an 8 bit D-type latch 110. The LATCHEN signal is connected to the enable input of the latch 110. The outputs of the latch 110 are signals referred to as LCMPH*, LCMPM*, LAEN, LW-R, and LM-IO, respectively. The latch 110 operates such that when the enable input receives a logic high value, the Q outputs follow the D inputs. When the enable input receives a logic low value, the Q outputs are latched at the level of the data that was set up when the enable input went low. These signals are latched at the beginning of a cycle because they may change during a cycle because of pipelining.

The data enable conditioning logic 42 includes a PAL referred to as the DMA select control PAL 112, which determines when a DMA device on the slave 32 is active. The PAL 112 determines when a DMA channel is active in order to enable data to and from a DMA device, if one exists on the slave 32. A DMA channel is active if a respective DRQ signal from the slave 32 is asserted high and the corresponding DAK* signal is asserted low by the system board S. The DMA channel remains active until the corresponding DAK* signal is negated. The DRQ<0:7> signals and the DAK<0:7>* signals are connected to inputs of the PAL 112. The PAL 112 generates signals referred to as BDRQ<0:7> and DMASEL*. The BDRQ<0:7> signals mirror the corresponding DRQ<0:7> signals. The equation for the DMASEL* signal is:

DMASEL = (DRQ0 + DMASEL) · DAK0 + (DRQ1 +
    DMASEL) · DAK1 + (DRQ2 + DMASEL) · DAK2
    + (DRQ3 + DMASEL) · DAK3 + (DRQ5 +
    DMASEL) · DAK5 + (DRQ6 + DMASEL) · DAR6

+ (DRQ7 + DMASEL) · DAK7

The PAL 112 asserts the DMASEL* signal when a DMA device on the slave 32 generates a respective DRQ signal and the system board S responds with the corresponding DAK* signal. The DMASEL* signal remains asserted until the system board S deasserts the DAK* signal.

A PAL referred to as the slave select control PAL 114 determines when the slave 32 connected to the SLTAD 30 is addressed. This allows the SLTAD 30 to control the enabling and direction of data to and from the slave 32. The IOWC* signal, the IORC* signal, the MRDC* signal, the LAEN signal, the DMASEL* signal, the EIOSEL* signal, the START* signal, the ALE signal, the ISAIO* signal, the LCMPH* signal, the LCMPM* signal, the LM-IO signal, the LW-R signal, the MWTC* signal, the CMD* signal, the LMSBST* signal, and a signal referred to as ESLAVE are connected to inputs of the Slave Select Control PAL 114. The BCLK signal is connected to the clock input of the PAL 114. The ESLAVE signal indicates when asserted that the slave 32 is an EISA slave. The PAL 114 generates as outputs the LATCHEN signal, the SLSEL* signal, and a signal referred to as DATADIR.

The equation for the SLSEL* signal is:

```
SLSEL =   EIOSEL · LAEN* · LMIO* · DMASEL*
        + ISAIO · DMASEL* · (IORC + IOWC)
        + LCMPH · LCMPM · ESLAVE · DMASEL*
        + LCMPM · ESLAVE* · DMASEL* · (MWTC + MRDC)
        + DMASEL · (IORC + IOWC)
```

The SLSEL* signal is asserted low when the slave 32 has been addressed by the system board S, irregardless of whether the slave 32 is a memory-mapped or I/O slave or an ISA or EISA slave. The SLSEL* signal is also asserted if a DMA device on the slave 32 is active and either of the IORC* or IOWC* signals are asserted. This allows the data enable conditioning logic 42 to distinguish between a DMA and a programmed cycle, and to know when data should be enabled to or from the DMA device.

The equation for the DATADIR signal is:

```
DATADIR = LCMPH · LCMPM · LW-R* · ESLAVE · CMD
        + LCMPM · MRDC · ESLAVE*
        + DMASEL · IORC · MSBURST*
        + DMASEL · LW-R · MSBURST
        + LAEN* · EIOSEL · LW-R* · LM-IO* ·
          ESLAVE · CMD
        + ISAIO · IORC · ESLAVE*
```

The DATADIR signal indicates the direction of data transfer between the slave card 32 and the system board S. The DATADIR signal is a logic high value to enable data from the system board S to the slave card 32, and the DATADIR signal is a logic low value to enable data from the slave card 32 to the system board S. The equation for the LATCHEN signal is:

```
LATCHEN = BCLK* · START · MSBURST* · ESLAVE
        + BCLK* · MSBURST · ESLAVE
        + ALE · ESLAVE*
```

As previously discussed, the LATCHEN signal indicates when asserted high that the slave 32 is beginning a bus cycle. The LATCHEN signal is asserted when the BCLK signal is low when the slave 32 is an EISA slave and has begun a cycle, or when the slave 32 is an ISA slave and the BALE signal is asserted, indicating that a valid address is present on the LA<31:2> address lines. The asserted LATCHEN signal enables the latch 110 to latch the signals CMPH*, CMPM*, AEN, W-R, and M-IO at the beginning of a cycle and preserve the status of these signals because these signal may change during a cycle because of pipelining.

The data enable conditioning logic 42 includes a PAL referred to as the BE latch control PAL 116, which latches the BE<3:0>* signals to allow for pipelining on the EISA bus. The BE<3>* signal, the BE<2>* signal, the BE<1>* signal, the BE<0>* signal, the ESLAVE0 signal, the ESLAVE1 signal, the MSBURST* signal, the EXRDY signal, and the START* signal are connected to the inputs of the BE latch control PAL 116. The BCLK signal is connected to the clock input of the PAL 116. The PAL 116 generates output signals referred to as ESLAVE and LBE<3:0>*. In the following signal equations, the representations below appear:

BE=[BE<3>, BE<2>, BE<1>, BE<0>]

LBE=[LBE<3>, LBE<2>, LBE<1>, LBE<0>]

The PAL 116 generates a condition referred to as LEXRDY to aid in generating the LBE<3:0>* signals. The LEXRDY condition is a latched version of the EXRDY signal that is defined as:

LEXRDY=EXRDY·BCLK+LEXRDY·BCLK*

The equation for the LBE<3:0>* signals is:

```
LBE := BE · START · MSBURST*
     + LBE · START* · MSBURST*
     + BE · MSBURST · LEXRDY
     + LBE · MSBURST · LEXRDY*
```

The LBE<3:0>* signals are latched versions of the corresponding BE<3:0>* signals that are asserted at the beginning of non-Burst cycles when the START* signal is asserted and remain asserted until a new cycle begins. The LBE<3:0>* signals are also asserted at the beginning of Burst cycles when the EISA slave 32 has not requested wait state timing, and they remain asserted if the EISA slave 32 requests wait state timing. The equation for the ESLAVE signal is:

ESLAVE=ESLAVE0

The ESLAVE signal is asserted high when the slave 32 is an EISA slave and is negated low when the slave 32 is an ISA slave. The ESLAVE1 signal is not used in the PAL 116 but is reserved for future enhancements.

Due to the data translation requirements of the EISA bus, only certain data channels or bytes should be enabled from the slave 32. Therefore, the SLTAD 30 must enable data only on the channels that would be enabled by the slave 32. This is necessary because in some instances the system board S performs data copying from the low order bytes of the data bus to the high order bytes of the data bus to enable a 32 bit bus master to receive its data on the correct channels of the data bus. When data copying is required, the SLTAD 30 must ensure that only the low order bytes are enabled and that the high order bytes are tri-stated. This prevents the SLTAD 30 from inadvertently driving the high order bytes of the data bus while the system board S is attempting to copy data to these high order bytes. Therefore, the data enable conditioning logic 42 includes a PAL referred to as the channel enable control PAL 118 which duplicates the data enabling of the slave 32 and enables only the appropriate data channels or bytes of the data bus from the slave 32 to the system board S.

The channel enable control PAL 118 receives as inputs the SA<0> signal, the SBHE* signal, the CMD* signal, the MSBURST* signal, the DATADIR signal, the ESLAVE signal, the WIDTH1 signal, the WIDTH0 signal, the LBE<3:0>* signals, the DATADS<0> signal, and the DMASEL* signal. The BCLK signal is connected to the clock input of the PAL 118. The channel enable control PAL 118 utilizes the WIDTH1 and WIDTH0 signals generated by the parameters register 47 to determine the data width of the slave card 32 that is coupled to the SLTAD 30. This enables the PAL 118 to enable the same channels or bytes as would the slave 32 if the slave 32 were directly connected to the system board S. For EISA transfers, the PAL 118 utilizes the LBE<3:0>* signals to determine which bytes of the requested dword are being accessed. For ISA transfers, the PAL 118 utilizes the SA<0> and SBHE* signals to determine which bytes of the requested word are being accessed. The PAL 118 generates output signals referred to as LMSBST* and four enable signals referred to as EN<3:0>*. The equation for the LMSBST* signal is:

LMSBST :=MSBURST·CMD

The LMSBST* signal is a latched version of the MSBURST* signal that remains asserted while the CMD* signal is asserted. The following definitions are used in the EN<3:0>* signal PAL equations:

BEN=[LBE<3>, LBE<2>, LBE<1>, LBE<0>]

EN=[EN<3>, EN<2>, EN<1>, EN<0>]

SIZE=[WIDTH1, WIDTH0]

The equations for the EN<3:0>* signals are:

```
EN<0> = ESLAVE ·
          ((BEN == 0) + (BEN == 1) · (SIZE == 1)
      +  (BEN == 3) · ((SIZE == 1) + WIDTH0*)
      +  (BEN == 7) · (SIZE == 1)
      +  (BEN == 8)
```
-continued
```
      +  (BEN == 9) · (SIZE == 1)
      +  (BEN == Bh) · ((SIZE == 1) + WIDTH0*)
      +  (BEN == Ch)
      +  (BEN == Dh) · (SIZE == 1)
      +  (BEN == Eh))
      +  ESLAVE* · DMASEL* · ((SIZE == 1) +
         (SIZE == 0) · SA<0>*)
      +  DMASEL
```

The low order byte or channel of the data bus is enabled from the EISA slave 32 when the requesting device requests the low order byte from memory or when the requesting device requests any of the other respective bytes from memory and the slave 32 is an 8 bit EISA slave. The low order byte of the data bus is also enabled if the requesting device requests the third byte from memory (BE*<2> is asserted), and the slave 32 is a 16 bit EISA slave. The low order byte is also enabled on DMA cycles or if the slave 32 is an ISA slave and the SA<0> signal is negated low.

The equation for the EN<1>* signal is:

```
EN<1>  = ESLAVE ·
           ((BEN == 0) · (WIDTH0* + (SIZE == 3))
         + (BEN == 1) · (WIDTH0* + (SIZE == 3))
         + (BEN == 3) · WIDTH0*
         + (BEN == 7) · WIDTH0*
         + (BEN == 8) · (WIDTH0* + (SIZE == 3))
         + (BEN == 9) · (WIDTH0* + (SIZE == 3))
         + (BEN == Ch) · (WIDTH0* + (SIZE == 3))
         + (BEN == Dh) · (WIDTH0* + (SIZE == 3)))
         + ESLAVE* · DMASEL* · (SIZE == 0) · SBHE*
         + DMASEL* · (SIZE == 1)*
```

The second order byte of the data bus is enabled in all instances where the slave 32 is a 16 bit EISA slave and the requesting device is requesting any combination of bytes other than only the low order byte or only the third order byte. The second order byte is also enabled if the slave 32 is a 32 bit EISA slave, except in those instances where the requesting device is requesting only the high order byte or only the third and high order bytes. The second order byte is also enabled when the slave 32 is an ISA slave and the SBHE* signal is asserted, or on DMA cycles when the slave 32 is either 16 or 32 bits.

The equation for the EN<2>* signal is:

```
EN<2>  = (SIZE == 3) ·
           (((BEN == 0) + (BEN == 1) + (BEN == 3)
         + (BEN == 8) + (BEN == 9) + (BEN == Bh))
         + DMASEL · (SIZE == 3))
```

The third order byte of the data bus is enabled when the slave 32 is a 32 bit slave and either the requesting device requests the third order byte or the current bus cycle is a DMA cycle.

The equation for the EN<3>* signal is:

```
EN<3>  = (SIZE == 3) ·
           (((BEN == 0) + (BEN == 1) + (BEN == 3) +
           (BEN == 7)) + DMASEL · (SIZE == 3))
```

The high order byte of the data bus is enabled when the slave 32 is a 32 bit slave and either the requesting device requests the high order byte or the current bus cycle is a DMA cycle.

The data enable conditioning circuit 42 includes a PAL referred to as the BCLK counter match PAL 120. The circuit 42 also includes a delay element 122 which provides the programmable data enable delay for all cycles except Compressed and Burst cycles according to the present invention. The maximum delay that can be inserted before the data valid window by the delay element 122 is 330 ns according to the present invention. The BCLK counter match PAL 120 allows the delay of the enabling of data to be delayed for a period of time longer than the 330 ns maximum delay of the delay element 122 used in the data enable conditioning circuit. This function allows the programmable read data enable delay to begin a preset number of BCLK signal cycles into the cycle, allowing for data delays that are long enough to cause errors in long cycles such as DMA cycles and long ISA programmed cycles.

The PAL 120 receives as inputs the DATADS<3> signal, a signal referred to as MATCH*, the NOWS* signal, the EX16* signal, the EX32* signal, the LM-IO signal, the LW-R signal, the SLSEL* signal, the DMASEL* signal, the ALE signal, the CMD* signal, the START* signal, the ESLAVE signal, and the RESET signal. The BCLK signal is connected to the clock input of the PAL 120. As previously mentioned, the DATADS<3> signal represents when high that the BCLK counter delay function is on and the data enable programmable delay should begin after XXX number of BCLK signal cycles, with XXX determined by the DATADS<2:0> signals. The PAL 120 generates output signals referred to as DEN* and CMPR*, which are described below.

The PAL 120 also implements a 3 bit counter which counts the number of BCLK signal cycles in a bus cycle. The PAL 120 generates three signals representing the current state of the counter referred to as the BCLKCTR<2..0> signals. The counter is reset at the end of every cycle, allowing it to be used for back to back cycles in a transfer. The equation for the BCLKCTR<2:0> signals, here referred to collectively as CTR is:

$$CTR := (CTR+1) \cdot ((CMD \cdot ESLAVE + ESLAVE^*) \cdot DMASEL^* + DMASEL) \cdot SLSEL \cdot RESET^*$$

The counter counts the number of BCLK signal cycles during EISA, ISA or DMA slave bus cycles. The BCLKCTR<2:0> signals are connected to the B<2:0> inputs of a comparator 121. The DATADS<2:0> signals are connected to the A<2:0> inputs of the comparator 121. The inverted enable input of the comparator 121 is connected to a logic low value. The comparator 121 generates the MATCH* signal, which is asserted low when the BCLKCTR<2:0> signals match the DATADS<2:0> signals. The MATCH* signal indicates when asserted low that the selected number of BCLK signal cycles represented by the DATADS<2:0> signals have occurred in the current bus cycle.

The equation for the CMPR* signal is:

$$CMPR := NOWS \cdot SLSEL \cdot (EX16 + EX32).$$

The CMPR* signal indicates when asserted low that the EISA 16 bit or 32 bit slave is generating Compressed cycles if it supports such cycles.

The DEN* signal is a signal pulse that is generated from the bus control signals input to the PAL 120. The equation for the DEN* signal is $$\begin{aligned}DEN = &\ START \cdot BCLK^* \cdot DATADS<3>^* \cdot DMASEL^* \cdot ESLAVE \\&+ SLSEL^* \cdot DATADS<3>^* \cdot DMASEL^* \cdot ESLAVE^* \\&+ (DATADS<3> + DMASEL) \cdot MATCH \cdot SLSEL\end{aligned}$$

The DEN* signal is asserted low at the beginning of an EISA slave cycle for a one half BCLK signal cycle when the BCLK signal is low and the BCLK counter delay function is disabled. For ISA cycles, the DEN* signal is asserted low on the rising edge of the SLSEL* signal and remains asserted low until the SLSEL* signal is asserted low, which occurs when one of the ISA command signals MRDC* or IORC* is asserted. During ISA read cycles, the asserted ISA command signals MRDC* and IORC* indicate that the slave 32 should drive its data onto the bus. Therefore, the DEN* signal approximates the read data valid window for ISA and EISA cycles. If the BCLK counter delay function is enabled, or if the current cycle is a DMA cycle, then the DEN* signal is asserted low when the slave 32 is selected and the number of BCLK signal cycles in the current bus cycle equals the number represented by the DATADS<2:0> signals.

The DEN* signal output from the PAL 120 is input to the delay circuit 122. The DATADS<15:10> signals are connected to the control inputs of the delay circuit 122. The output of the delay circuit is a signal referred to as DELDEN*. The DELDEN* signal is a delayed version of the DEN* signal pulse. When the BCLK match function is disabled, the DELDEN* signal is asserted low to indicate that the read data valid programmable delay has begun and makes a low to high transition to indicate that the delay has expired. When the BCLK match function is enabled, the DELDEN* signal is asserted to indicate that the BCLK signal delay and the programmable delay have expired.

The BCLK signal is connected to the input of a delay element 130 whose output is a signal referred to as DELBCLK. The DATADS<9:4> signals are connected to the delay select inputs of the delay element 130. The delay element 130 controls the enable delay for Burst and Compressed transfers.

The data enable conditioning circuit 42 includes a PAL referred to as the data delay control PAL 124. The PAL 124 implements an asynchronous state machine which controls the enabling of data bus transceivers 46 on the SLTAD 30. The PAL 124 receives as inputs the CMD* signal, the DELBCLK signal, the DELDEN* signal, the COMPR* signal, the DMASEL* signal, the DATADS<3> signal, the DATADS<0> signal, the SLSEL* signal, the DATADIR signal, the RESET signal, the LMSBST* signal, and the EN<3:0>* signals. The PAL 124 generates four data enable output signals referred to as DATAEN<3>*, DATAEN<2>*, DATAEN<1>* and DATAEN<0>*. Each of these signals are connected to the enable input of a respective data bus transceiver.

Figure 7:
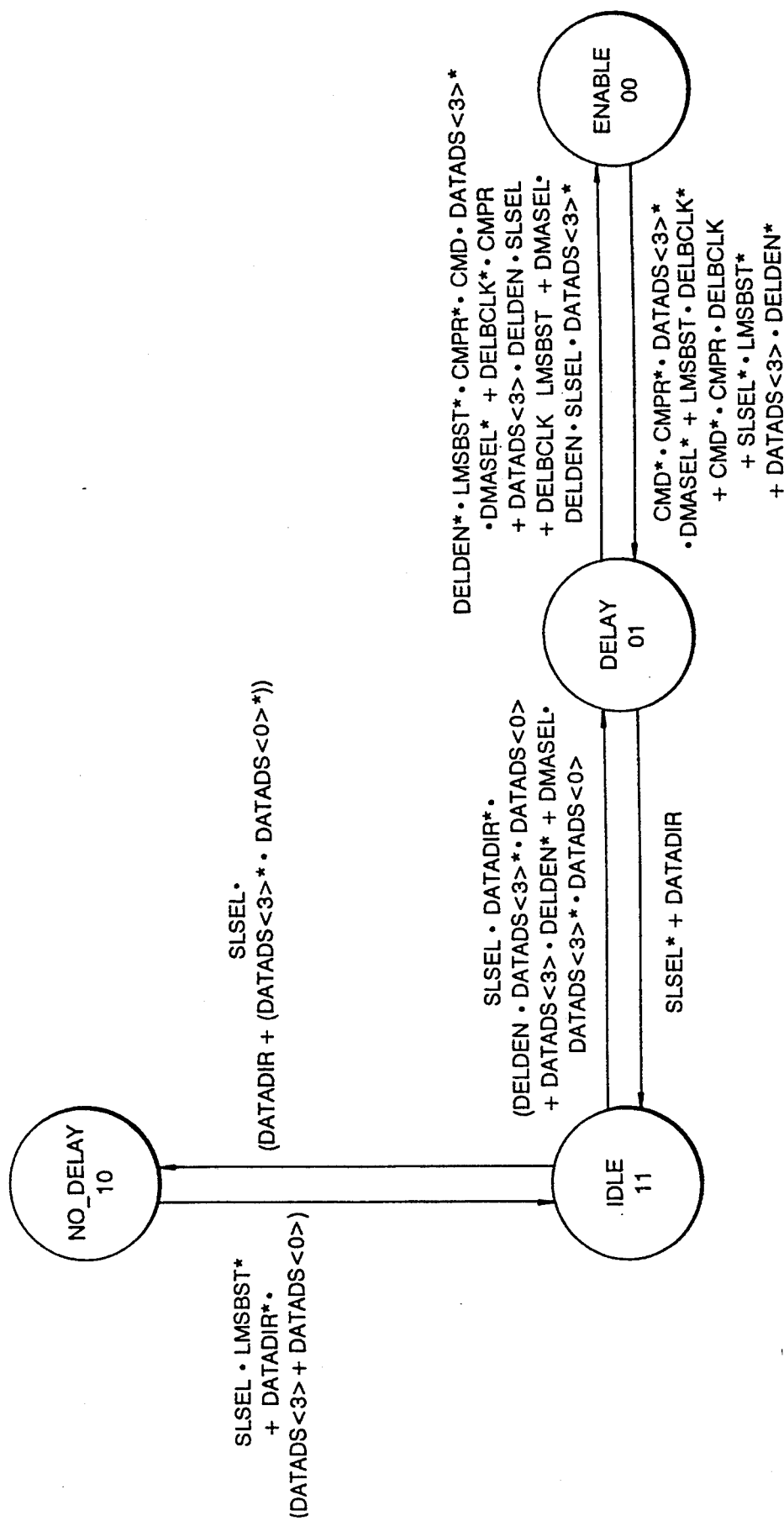
FIG. 7 is a state transition diagram illustrating the operation of the data enable conditioning logic of FIG. 6.

Referring now to FIG. 7, a state diagram illustrating the operation of the data delay control PAL 124 is shown. The state machine comprises four states referred to as IDLE, NO_DELAY, DELAY, and ENABLE. The state machine begins in its IDLE state, and the DATAEN<3:0>* signals are negated high in this state. The state machine progresses from its IDLE state to its NO_DELAY state when the condition:

SLSEL·(DATADIR+(DATADS<3>*·DATADS<0>*))

is true. In the normal mode of operation, with the delay feature disabled (DATADS<0> ==0) and the BCLK match function disabled, or in a write cycle, the state machine looks at the status of the SLSEL* signal. If the SLSEL* signal is asserted, the state machine progresses from the IDLE state to the NO_DELAY state, and the appropriate DATAEN<3:0>* signals are asserted in the NO_DELAY state. The DATAEN<3:0>* signals remain asserted until the state machine returns to its IDLE state. The equation for this progression is:

SLSEL*·LMSBST*+DATADIR*·(DATADS<3>+DATADS<0>).

The state machine returns to its IDLE state when the SLSEL* signal is negated.

The state machine progresses from the IDLE state to the DELAY state when the condition:

| SLSEL · DATADIR* · (DELDEN · DATADS<3>* · DATADS<0> + DATADS<3> · DELDEN* + DMASEL · DATADS<3>* · DATADS<0>) |
|---| is true. If the current cycle is a slave read cycle, the state machine enters the DELAY state when the programmable delay feature is enabled and the BCLK counter match function is off when the DELDEN* signal goes low. If the BCLK count delay feature is enabled or the current cycle is a DMA cycle, the state machine advances from the IDLE state to the DELAY state at the beginning of the read cycle when the DATADIR signal goes low and the DELDEN* signal is still high.

The state machine progresses from the DELAY state to the ENABLE state when the condition:

| DELDEN* · LMSBST* · COMPR* · CMD · DATADS<3>* · DMASEL* |
|---|
| + DELBCLK* # COMPR |
| + DATADS<3> · DELDEN · SLSEL |
| + DELBCLK · LMSBST |
| + DMASEL · DELDEN · SLSEL · DATADS<3>* | is true. On standard cycles, the state machine remains in the DELAY state until the DELDEN* signal goes high, which signifies that the delay element 22 has interposed the appropriate amount of delay from the assertion of the DEN* signal pulse, and the CMD* signal is asserted, which causes the state machine to enter the ENABLE state. If the BCLK count delay feature is enabled or the current cycle is a DMA cycle, the state machine remains in the DELAY state until the DELDEN* signal is asserted low. When the BCLK count delay feature is enabled, the DEN* signal is asserted low when the BCLKCTR<2:0> signals equal the DATADS<2:0> signals, which signifies that the programmed number of BCLK signal cycles forming the delay have occurred. Therefore, when the BCLK match function is enabled, the DELDEN* signal goes low to indicate that both the BCLK signal delay and the programmable delay from the delay element 122 have both occurred. When the DELDEN* signal goes low, the state machine enters the ENABLE state. During Compressed and Burst cycles, the state machine enters the ENABLE state when the DELBCLK signal is low and high, respectively, as is discussed further below.

In the ENABLE state, the PAL 120 asserts the appropriate data enable signals DATAEN<3:0>* low. The state machine returns from the ENABLE state to the DELAY state when the condition:

| CMD* · CMPR* · DATADS<3>* · DMASEL* |
|---|
| + LMSBST · DELBCLK* |
| + CMD* · CMPR · DELBCLK |
| + SLSEL* · LMSBST* |
| + DATADS<3> · DELDEN* | is true. On normal or Standard cycle transfers, the state machine returns to the DELAY state when the CMD* signal is negated. If the BCLK match function is enabled, the state machine remains in the ENABLE state until the DELDEN* signal is negated high, at which time the state machine returns to the DELAY state. On Compressed and Burst cycles, the state machine returns to the DELAY state when the DELBCLK signal is high and low, respectively, as is discussed further below.

The state machine returns from the DELAY state to the IDLE state when the condition:

SLSEL*+DATADIR is true. The state machine remains in the DELAY state until the SLSEL* signal is negated or the DATADIR signal goes high, which causes the state machine to return to the IDLE state. If the slave is still being accessed, the state machine returns to the DELAY state when the DELDEN* signal again goes low, and the procedure described above is repeated.

Therefore, with the BCLK signal count delay feature enabled, the operation of the state machine differs from the normal mode. This mode allows the delay of the enabling of data until a specific number of BCLK signal cycles into the cycle, plus the delay provided by the delay element 122. This allows the enabling of data to be delayed for a longer period than the 330 ns total delay of the delay element, allowing the delay to force errors in long ISA and DMA cycles.

In an EISA Burst Cycle, the first data transfer is identical to a standard EISA transfer requiring 2 BCLK signal cycles, and subsequent transfers occur every BCLK signal cycle. Therefore, the first transfer in a Burst transfer is treated as if it were a normal transfer, and the state machine begins as if it were a normal cycle. In the ENABLE state of the first Burst cycle transfer, when the LMSBST* signal is asserted, the state machine returns to the DELAY state on the falling edge of the DELBCLK signal. For the remainder of the Burst transfer, the data valid window is controlled by the DELBCLK signal. The state machine remains in the DELAY state until the DELBCLK signal goes high again. Data is only enabled when the DELBCLK signal is low in order to give more control to the enabling of data during Burst cycles. This allows the data valid setup time to be less than 60 ns, allowing full testing of the valid data window during Burst transfers.

In a Compressed Cycle, the stretching of the BCLK signal causes unique cycle timing. The state machine advances from the IDLE state to the DELAY state when the DELDEN* signal goes low, just as in a normal transfer. In the DELAY state, control of the state machine switches to the DELBCLK signal. The state machine advances from the DELAY state to the ENABLE state when the DELBCLK signal goes low, signified by the minterm:

DELBCLK*·CMPR.

The state machine returns to the DELAY state when the DELBCLK signal goes high and the CMD* signal is asserted, asserted by the minterm:

CMD*·CMPR·DELBCLK

If a DMA device on the slave 32 is involved in a DMA cycle, the DEN* signal goes low when the IORC* signal is asserted (if the BCLK delay feature is disabled). The state machine advances from the IDLE state to the DELAY state on slave DMA read cycles, signified by the condition:

DMASEL·DATADS<3>*·DATADS<0> being true. When the DELDEN* signal is asserted low, the state machine enters the ENABLE state, signified by the minterm

DMASEL·DELDEN·SLSEL·DATADS<3>*;

and the appropriate DATAEN<3:0>* signals are asserted. The state machine remains in the ENABLE state until the IORC* signal is negated, which causes the SLSEL* signal to be negated, and the state machine returns through the DELAY state to the IDLE state. With the BCLK signal delay feature enabled during a DMA cycle, the state machine operates like the normal or Standard cycle described above with the BCLK match function enabled. The BCLK delay feature is generally utilized more for DMA cycles than for normal or programmed cycles because DMA cycles are longer. DMA cycles require time to access the data from the DMA device and write it to the memory slave 32.

The DATAEN<3:0>* signals are asserted in either the NO_DELAY state or the ENABLE state. The equations for the DATAEN<3:0>* signals are:

transceivers 190, 192, 194 and 196, respectively. The DATADIR signal is connected to the directional inputs of each of the transceivers 190, 192, 194, and 196. The DATAEN<3>*, DATAEN<2>*, DATAEN<1>*, and DATAEN<0>* signals are connected to the enable inputs of the transceivers 190, 192, 194, and 196. Therefore, when the respective DATAEN<3:0>* signals are asserted low, the appropriate bytes of data are enabled through the transceivers 190, 192, 194, and 196, the direction being dependent on the status of the DATADIR signal.

Referring now to FIGS. 9, 10, 11 and 12 timing diagrams which illustrate the operation of data enable conditioning in Standard EISA cycles, Compressed cycles, Burst cycles, and DMA cycles is shown.

The SLTAD 30 allows a user to control the read data valid window of the expansion slave card 32 coupled to the SLTAD 30. If a user wishes to control the read data valid window, the controlling software must be aware of the type of slave card 32 situated on the SLTAD 30 and also the type of cycle that the slave card 32 executes. As has already been noted, different cycle types require different windows. Therefore, the DATADS<15:0> control register must be programmed to ensure that the read data valid window is properly configured to allow the window to be large enough and also to be located in the correct position of the cycle.

Therefore, the SLTAD 30 includes a plurality of advance/delay circuits which are used to advance or delay signals that are output from the slave card 32 to the system board S. The advance/delay circuits enable a user to choose between the unaltered signal from the slave card 32, a delayed version of the signal, an advanced version of the signal, or a tri-state output to be provided as the version of the respective signal supplied to the system board S. The SLTAD 30 also includes data enable conditioning logic 42 which allows a user to delay the read data valid window of data signals output from the slave card 32 to the system board S.

Figure 13:
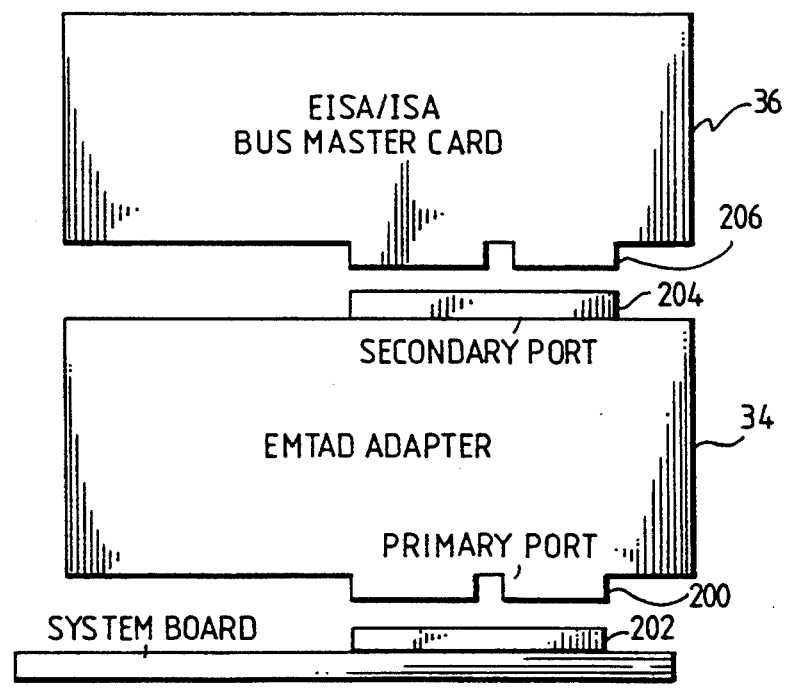
FIG. 13 is a side view of the bus master signal conditioning card (BMTAD) interfaced between the system board and the bus master card according to the present invention.

Referring now to FIG. 13, the BMTAD 34 is shown coupled between the system board S and the bus master card 36. The BMTAD 34 fits into a standard EISA expansion slot 202. The BMTAD 34 has a width equal to that of a standard EISA expansion card and is approximately two inches taller than a standard card. The

```
DATAEN<3> = EN<3> · (NO_DELAY + ENABLE · (BCLK ·
    DATADS<0> · LMSBST · DATADIR* · DMASEL*)*);
DATAEN<2> = EN<2> (NO_DELAY + ENABLE · (BCLK ·
    DATADS<0> · LMSBST · DATADIR* · DMASEL*)*);
DATAEN<1> = EN<1> · (NO_DELAY + ENABLE · (BCLK ·
    DATADS<0> · LMSBST · DATADIR* · DMASEL*)*);
DATAEN<0> = EN<0> · (NO_DELAY + ENABLE · (BCLK ·
    DATADS<0> · LMSBST · DATADIR* · DMASEL*)*);
```

The respective DATAEN<3:0>* signals are asserted in the ENABLE state except when the BCLK signal is high.

Figure 8:
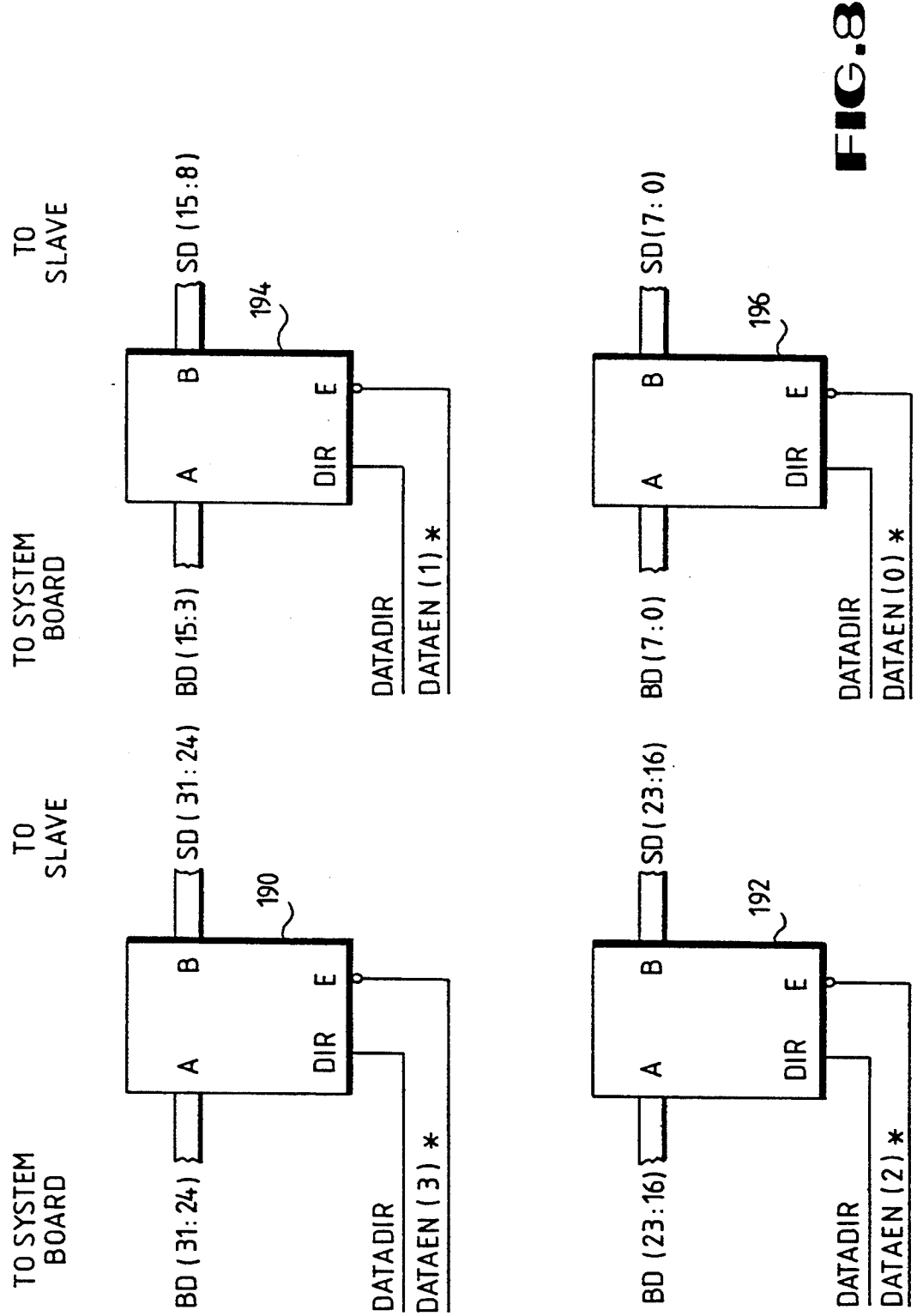
FIG. 8 is a schematic diagram of the data bus transceivers on the SLTAD of FIG. 3 according to the present invention.
Figure 9:
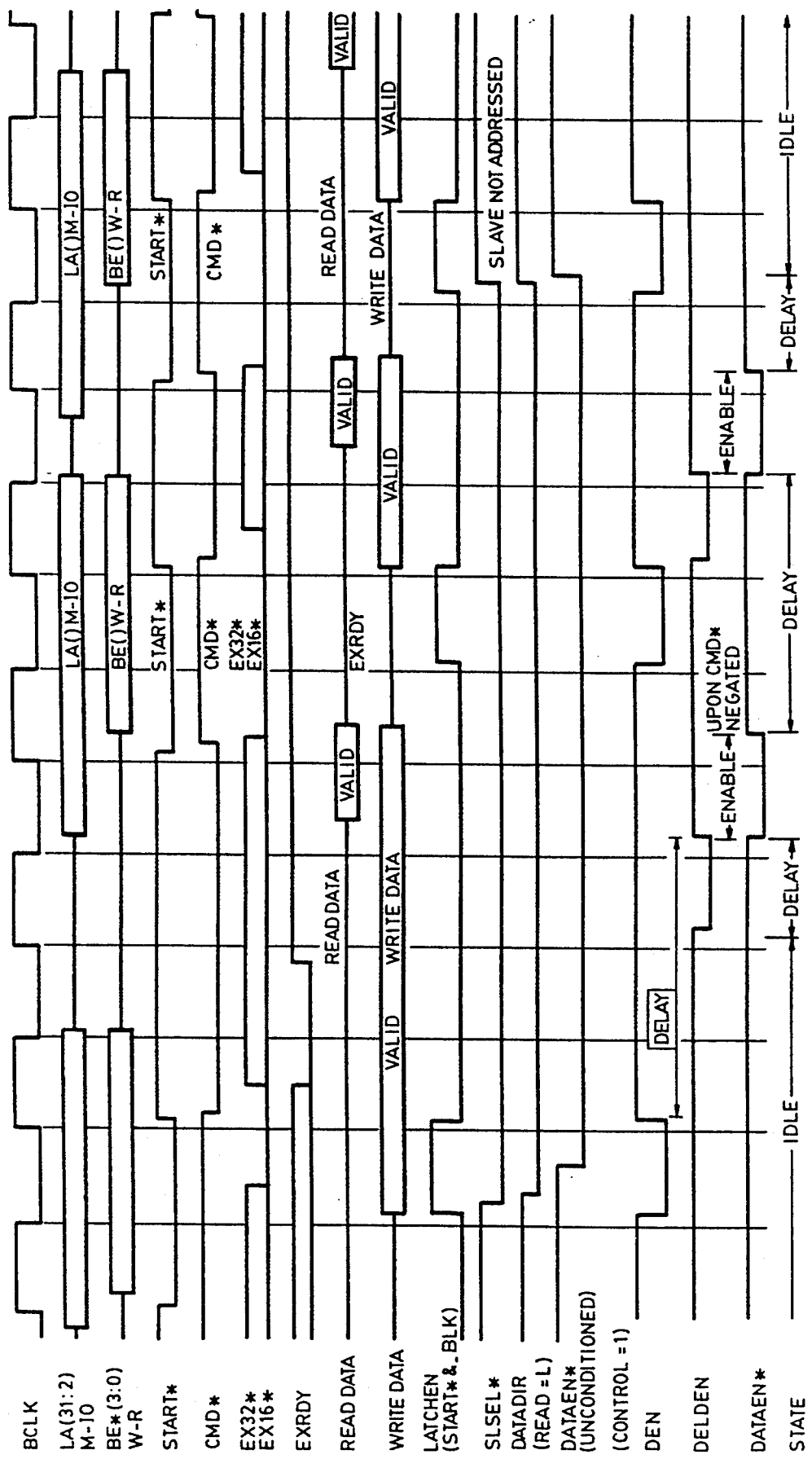
FIGS. 9, 10, 11 and 12 are timing diagrams illustrating the timing of the various cycle types as controlled by the Data Enable Control Logic of FIG. 6.
Figure 10:
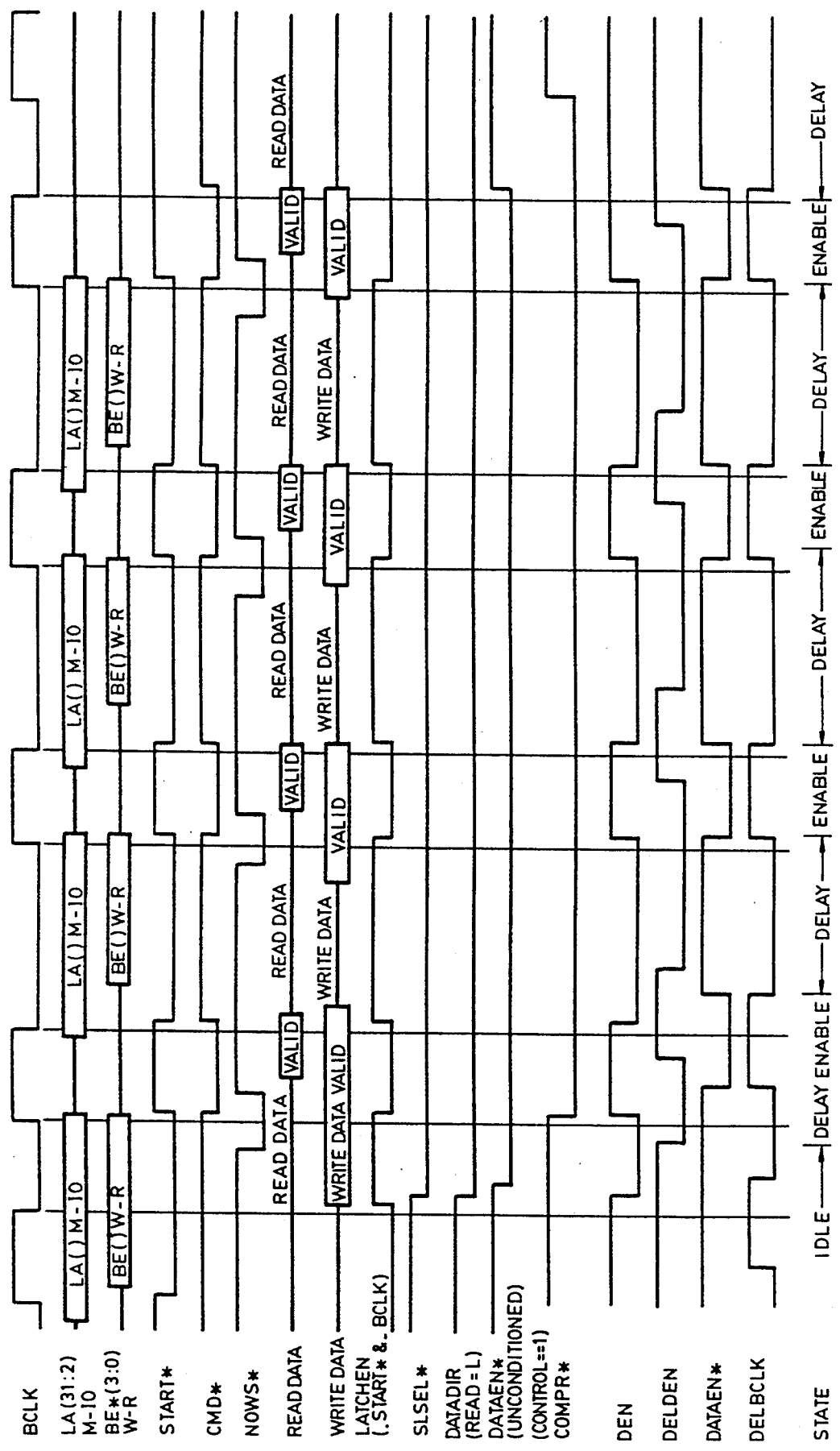
Figure 11:
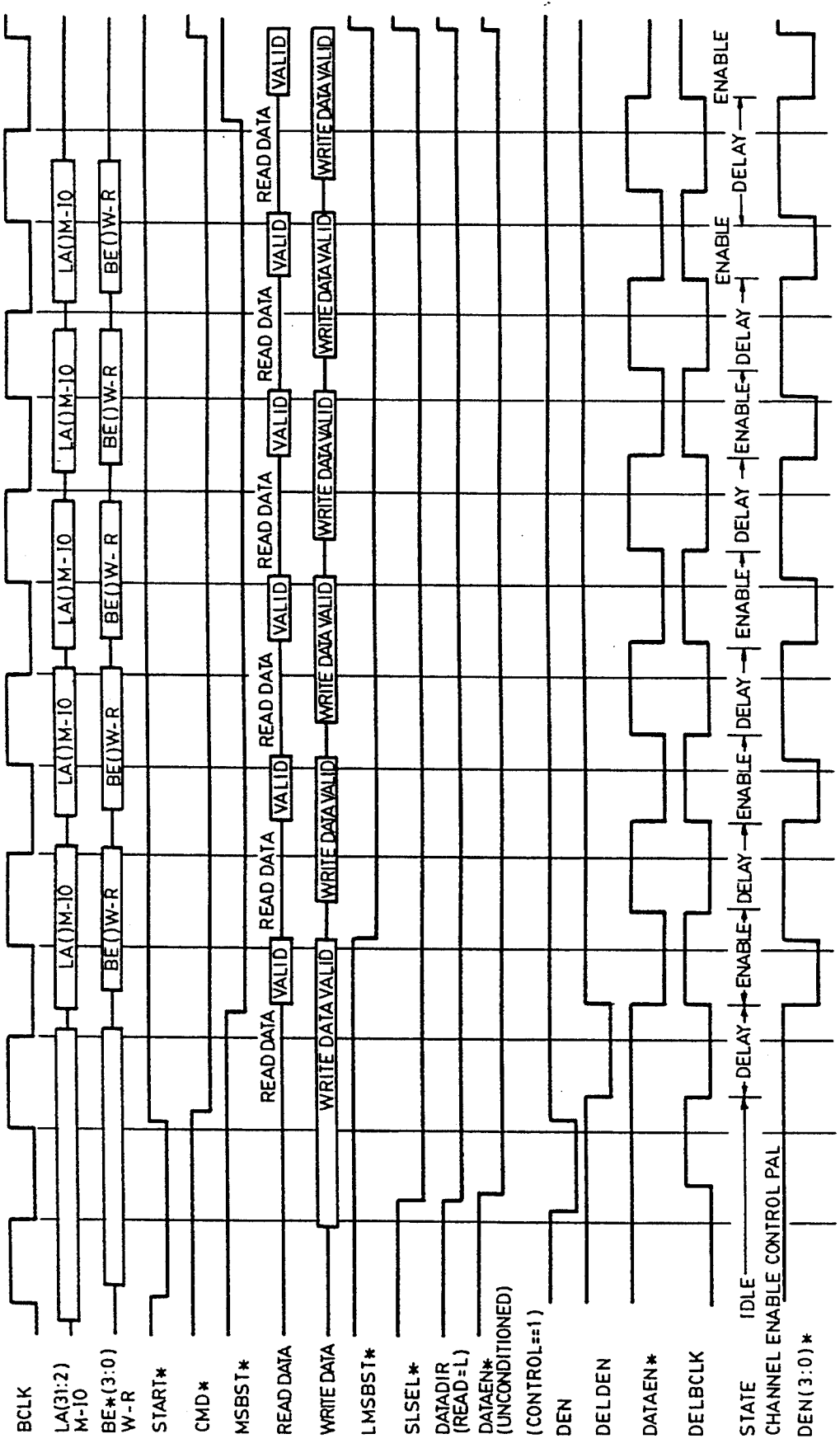
Figure 12:
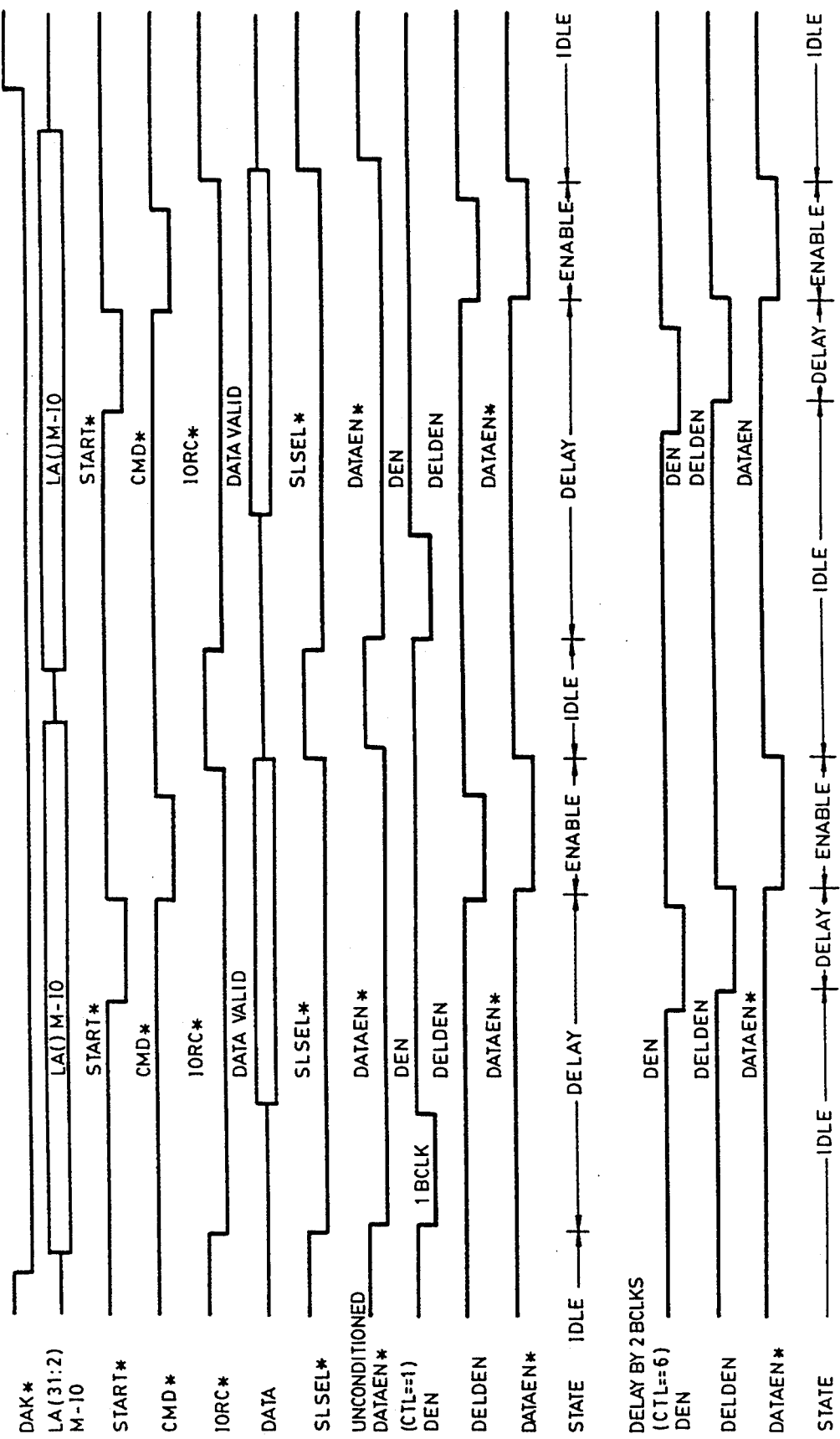

Referring now to FIG. 8, the SLTAD 30 includes four transceivers 190, 192, 194, and 196 which it uses to enable data between the system board S and the slave 32. The data signals received from the system board S are referred to as the BD<31:0> signals, and the data signals from the slave are referred to as the SD<31:0> signals. The BD<31:24>, BD<23:16>, BD<15:8>, and BD<7:0> signals are connected to the A inputs of the transceivers 190, 192, 194, and 196, respectively. The SD<31:24>, SD<23:16>, SD<15:8>, and SD<7:0> signals are connected to the B inputs of the BMTAD 34 is designed to allow an EISA or ISA bus master 36 to plug into its top connector, thereby functioning as an extender card. The BMTAD 34 includes a primary port 200 which couples to the EISA slot 202 on the system board S. The BMTAD 34 also includes a secondary port 204 which is adapted to receive the EISA slot connection 206 of the bus master card 36. Both connectors 200 and 204 employ the standard EISA pinout. The BMTAD 34 is preferably interfaced through the logic analyzer interface card 28 to a logic analyzer (not shown) to record the operation of the bus master 36 according to the preferred embodiment.

The bus master 36 generates output signals referred to as MSBURST*, MASTER16*, START*, W-R, and M-IO, among others. If the bus master 36 is an EISA bus master, it asserts the MSBURST* signal low to indicate to a slave or main memory that the bus master 36 is providing Burst cycles. The bus master 36 asserts the MASTER16* signal low to indicate a 16-bit data size for its operations. The bus master 36 asserts the START* signal to provide timing control at the start of a cycle. If the bus master 36 is an ISA bus master, then it will generate address signals SA<0> and SA<1> and a signal referred to as SBHE*. The SA<1> and SA<0> signals are asserted to indicate which of the respective bytes in a dword of memory are being accessed. If the bus master 36 is an EISA bus master, then it will generate four byte enable signals referred to as BE*<3..0>. The BE*<3..0> signals indicate which byte(s) of data in the 32 bit dword in memory are being accessed.

The bus master 36 output signals that are manipulated are inputs to the system board S that are used to control the system memory or that are required for EISA/ISA conversion. Some bus master 36 output signals are conditioned by placing a delay element "in line" with the signal similar to the advance/delay circuit described above with regard to the SLTAD 30. This simple asynchronous delay method is not sufficient to test certain bus master 36 outputs for various reasons. For example, the W-R and M-IO signals have three distinct states, each with a different meaning, and they do not necessarily change state during a cycle, thus rendering the asynchronous delay scheme useless. Therefore, these signals are conditioned by either forcing them to a pre-determined invalid state or tri-stating them prior to their assertion according to the present invention. Also, for the BE*<3:0> or SA<1:0> and SBHE* signals it is important to delay both their setup and hold timing, and therefore using an in-line element to delay these signals is insufficient. In addition, write data is delayed from the bus master 36 to verify the timing of the data translation logic on the system board S. In order to accomplish this, the BMTAD 34 must know what type of bus master 36 is attached and constantly monitor the current state of the cycle.

Figure 14:
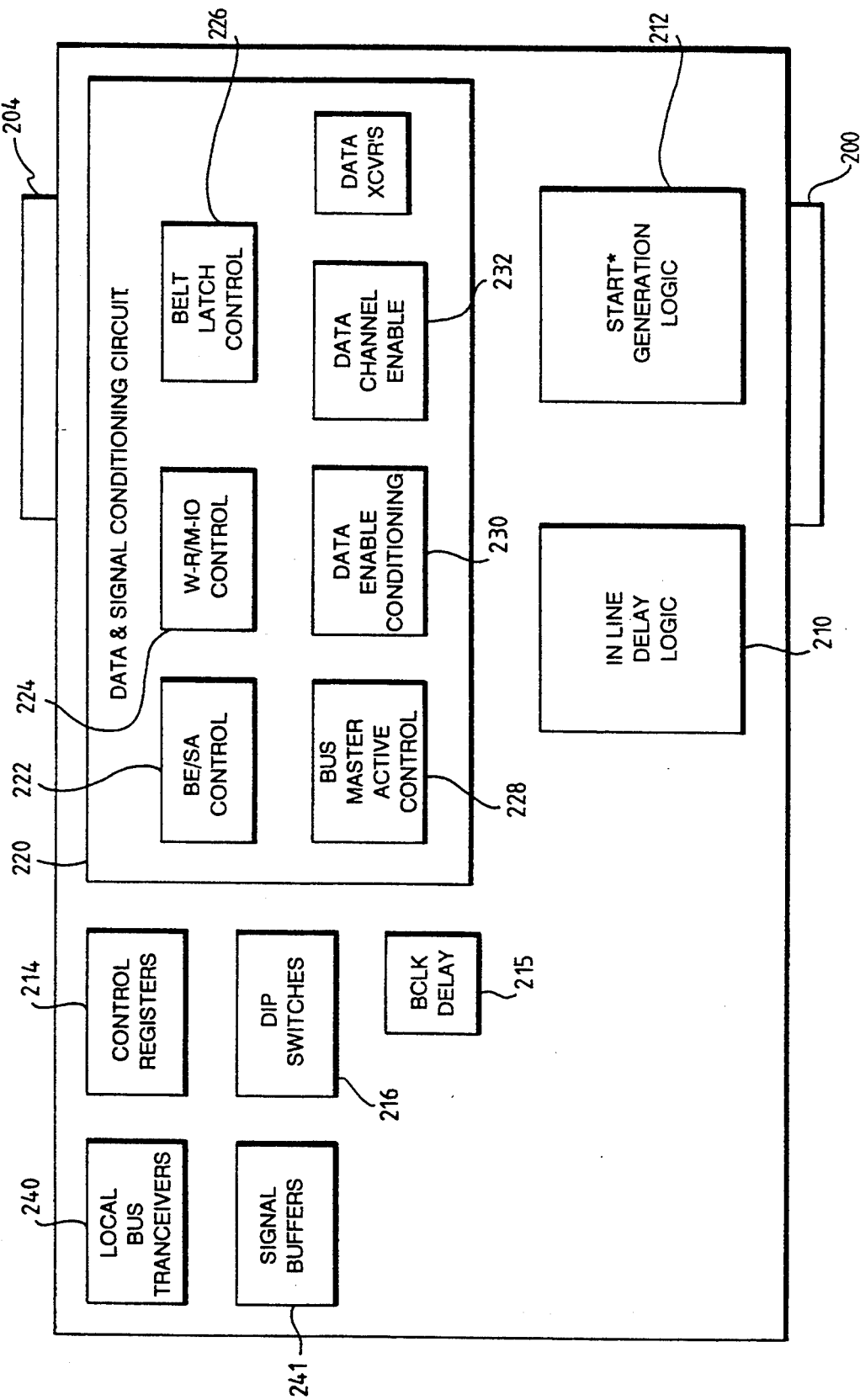
FIG. 14 is a block diagram illustrating the various components and signal conditioning logic on the BMTAD of FIG. 13.

Referring now to FIG. 14, the BMTAD 34 includes in line signal conditioning logic circuitry 210 which is used to delay the MSBURST* and MASTER16* signals from the bus master card 36 to the system board S. The logic circuitry is user programmable and therefore allows a user to control which of these signals are to be delayed and the length of the delay. The BMTAD 34 includes START* generation logic 212 which generates a conditioned version of the START* signal that is supplied to the system board S. The BMTAD 34 includes data and signal conditioning circuitry 220 which allows a user to selectively delay write data from the bus master 36 to the system board S. The data and signal conditioning circuit includes a block circuit 222 which generates the BE<3:0>*, SA<1:0>, and SBHE* signals. The circuit 220 includes a block circuit 224 which conditions the W-R and M-IO signals to the system board S. The circuit 220 includes BE< > latch control logic 226 which latches the BE<3:0>* signals at the beginning of a cycle. These signals are latched at the beginning of a cycle because they may change during a cycle because of pipelining. The circuit 220 also includes logic which indicates when the bus master 36 is active referred to as bus master active control 228. The BMTAD 34 also includes data enable conditioning logic 230, data channel enable logic 232, and data transceivers 240, all of which are discussed further below.

The BMTAD 34 occupies the same slot as the bus master 36, and this requires that the I/O address of the BMTAD 34 be different from the I/O address of the bus master 36. The programmable features of the BMTAD 34 are accessed using the ISA portion of the bus, and the BMTAD 34 is addressed as a 16-Bit I/O slave. The D<15:0> data bus signals from the system board S are coupled through transceivers 240 to a local data bus of the BMTAD, referred to as the LD<15:0> signals. Therefore, when a user is programming or reading a control register on the BMTAD 34, data transfer is enabled through the transceivers 240 to the BMTAD 34 or from the BMTAD 34 to the system board S, respectively. Because this type of logic is well known to those skilled in the art, details of its implementation have been omitted for the purpose of clarity.

The BMTAD 34 includes a block circuit 216 comprising a number of DIP switches which are used to match the I/O address decode of the bus master card 36. The BMTAD 34 includes a DIP switch which is used to set a base address of the BMTAD 34. The addresses of the various user programmable control registers on the BMTAD 34 are determined from this base address. The bus master 36 includes two DIP switches that determine where its I/O configuration registers are located, and this switching is duplicated on the BMTAD 34. The first switch determines whether the bus master 36 resides in the EISA or ISA I/O space. If the first switch is open, then the bus master 36 resides in the EISA I/O space at I/O address 0C8X. If the first switch is closed, then the second switch chooses between ISA addresses 10X (open) or 14X (closed). The first and second switches generate signals referred to as BMS0 and BMS1, respectively.

The BMTAD 34 includes a block circuit 214 comprised of control registers which control the operation of the data and signal conditioning circuit 220. The BMTAD 34 also includes a BCLK delay circuit 215 which is used to delay the BCLK signal for the purpose of controlling the write data valid window during Burst transfers.

All of the system board signal outputs that are provided to the bus master 36 are passed through buffers 241 on the BMTAD 34 and passed through to the bus master 36. When the functions of the BMTAD 34 are disabled, the BMTAD 34 acts as an extender board with only minimal delays imposed on the output signals of the bus master card 36. The exception to this is the data bus, which is only enabled if the bus master card 36 is addressed or on bus master cycles.

Figure 15:
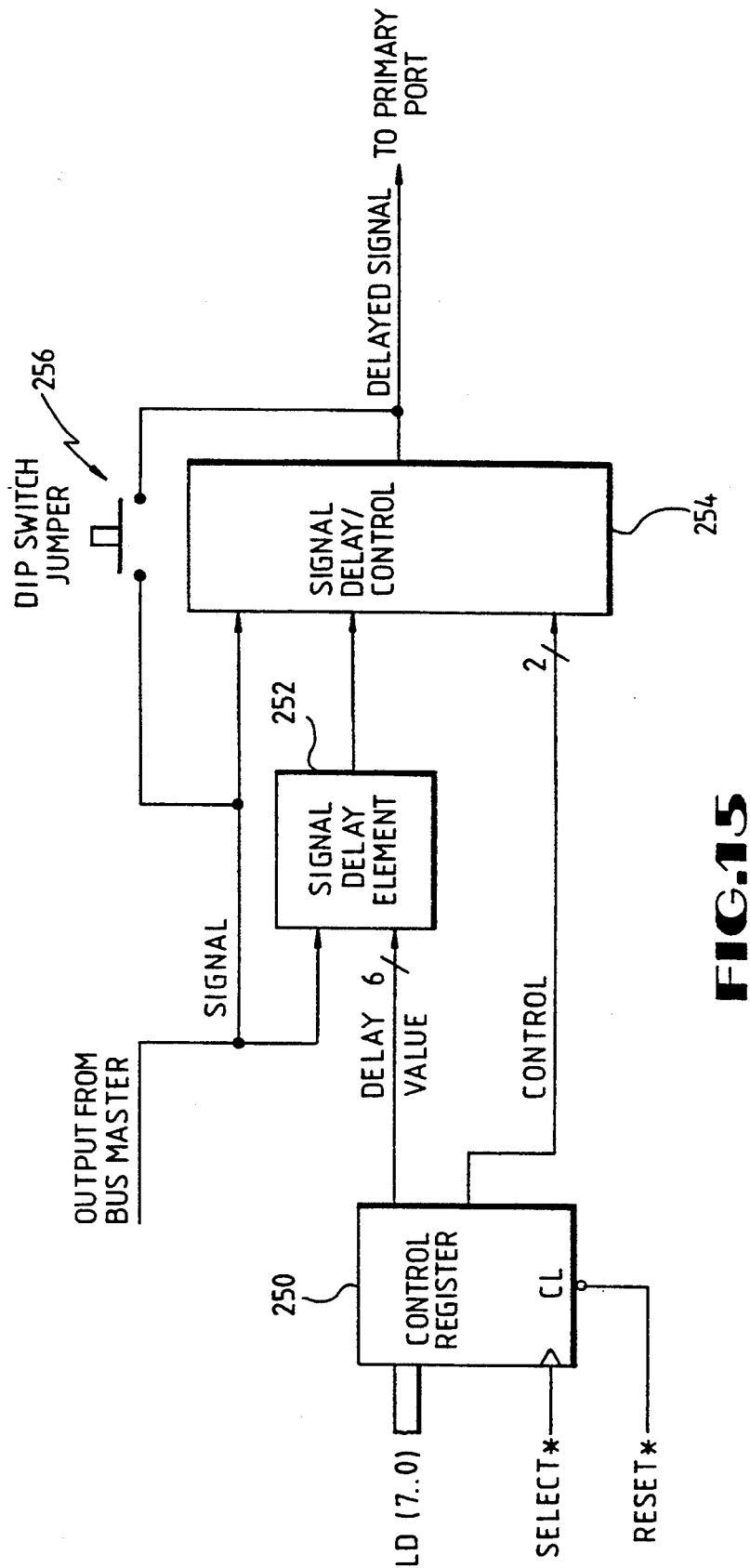
FIG. 15 is a block diagram illustrating an in line delay circuit and its associated control register on the BMTAD of FIG. 14 according to the present invention.

Referring now to FIG. 15, a block diagram illustrating an in line delay circuit used in the in line delay logic 210 to delay the MSBURST* and MASTER16* signals output from the bus master card 36 is generally shown. The MSBURST* and MASTER16* signals each include their own delay circuit, but only one delay circuit is described here for simplicity. The in line delay circuit used in the BMTAD 34 is similar to the in line delay circuit (FIG. 4) of the SLTAD 30 except that no advancing signal is used. Each delay circuit includes a user programmable 8-bit control register 250, a signal delay element 252, a signal delay/control multiplexer 254, and a DIP switch jumper 256. The control register 250 generates six delay value signals that are connected to delay select inputs of the delay element 252. The control register 250 also generates two control signals which are connected to select inputs of the multiplexer 254. The respective signal output from the bus master card 36 is connected to the signal delay element 252 and the multiplexer 254. The output of the signal delay element 252 is connected to the multiplexer 254. The respective bus master 36 output signal is also connected through the DIP switch jumper 256 to the signal output from the multiplexer 254. The output of the multiplexer 254 is the desired version of the bus master card output signal that is provided to the system board S. The signal output from the multiplexer 254 may either be the unconditioned signal output from the bus master card 36, a delayed version of the bus master output signal, or the multiplexer output may be tri-stated.

The control register 250 is a user programmable register which selects the version of the bus master output signal provided to the system board S. The register 250 also determines the amount of delay added to the bus master output signal by the delay element 252. The control register 250 receives as inputs the LD<7:0> signals. The decoded I/O address signal of the respective control register 250, referred to as SELECT*, is connected to the clock input of the control register 50. Therefore, when a user is writing to or programming the respective control register 250, the respective SELECT* signal is asserted to enable the control register 250 to latch its data from the BMTAD local data bus. The system bus RESET* signal is connected to the inverted CLR input of the register 250. Therefore, the contents of the register 250 are cleared when the RESET* signal is asserted.

The control register 250 comprises eight bits referred to as bits 0 through 7, and each of the bits in the register 250 generates a corresponding signal. Bit 0 and bit 1 are used as control bits to select the desired version of the bus master card output signal provided to the system board S, and these bits generate the two control signals that are connected to select inputs of the multiplexer 254. When bits 0 and 1 both have 0 values, then the multiplexer 254 passes through the unconditioned bus master output signal to the system board S. If bit 0 and bit 1 have values 0 and 1, respectively, then the output of the multiplexer 254 is tri-stated. If bit 0 and bit 1 have values 1 and 0, respectively, then the delayed signal output from the signal delay element 252 is provided to the system board S. In this instance, the amount of delay provided to the bus master output signal depends on the value stored in bits 2 through 7 of the control register 250, as is described further below. The condition where bits 0 and 1 both have value 1 is not used according to the preferred embodiment.

The minimum delay for the bus master output signal is the propagation delay through the delay circuit with the DIP switch 256 disabled and the delay feature programmed OFF such that bits 0 and 1 of the control register 250 both have 0 values. When so configured, a 12 ns delay exists through the delay circuit. The inherent delay is defined as the propagation delay through the delay circuit with the delay feature programmed ON such that bits 0 and 1 of the control register 250 have values 1 and 0, respectively, and the delay element 252 programmed to provide zero delay. The value of the inherent delay varies for each delay circuit and is preferably generally characterized as having a maximum of 27 ns. This 27 ns delay derives from the minimum 12 ns of delay plus a minimum of 15 ns delay from the delay element 252 when it is programmed to provide 0 delay.

The amount of delay added to the delayed version of the bus master 36 output signal is the amount of programmable delay provided by the signal delay element 252 plus the inherent delay of the circuit. Bits 2 through 7 of the control register 250 generate corresponding signals that are connected to delay select inputs of the delay element 252, and these bits control the amount of programmable delay provided by the signal delay element 252 that are added to the output signal. The programmable delay adds to the inherent delay in steps of 5 ns, and the value stored in bits 2 through 7 correspond to the number of 5 ns delays added to the inherent delay of the signal. For the remainder of the discussion of the BMTAD 34, delay elements described below operate in an identical manner to the signal delay elements described above for the SLTAD 30.

For cases where the minimum delay of the delay circuit shifts a bus master card output signal beyond its specification limits, each delay circuit includes the DIP switch jumper 256, which is provided to bypass the delay logic for a respective signal. When the DIP switch jumper is enabled, the output of the multiplexer 254 is tri-stated by programming bit 0 and bit 1 of the control register 250 with 0 values and 1, respectively, and the bus master output signal is provided directly to the system board S.

Figure 16:
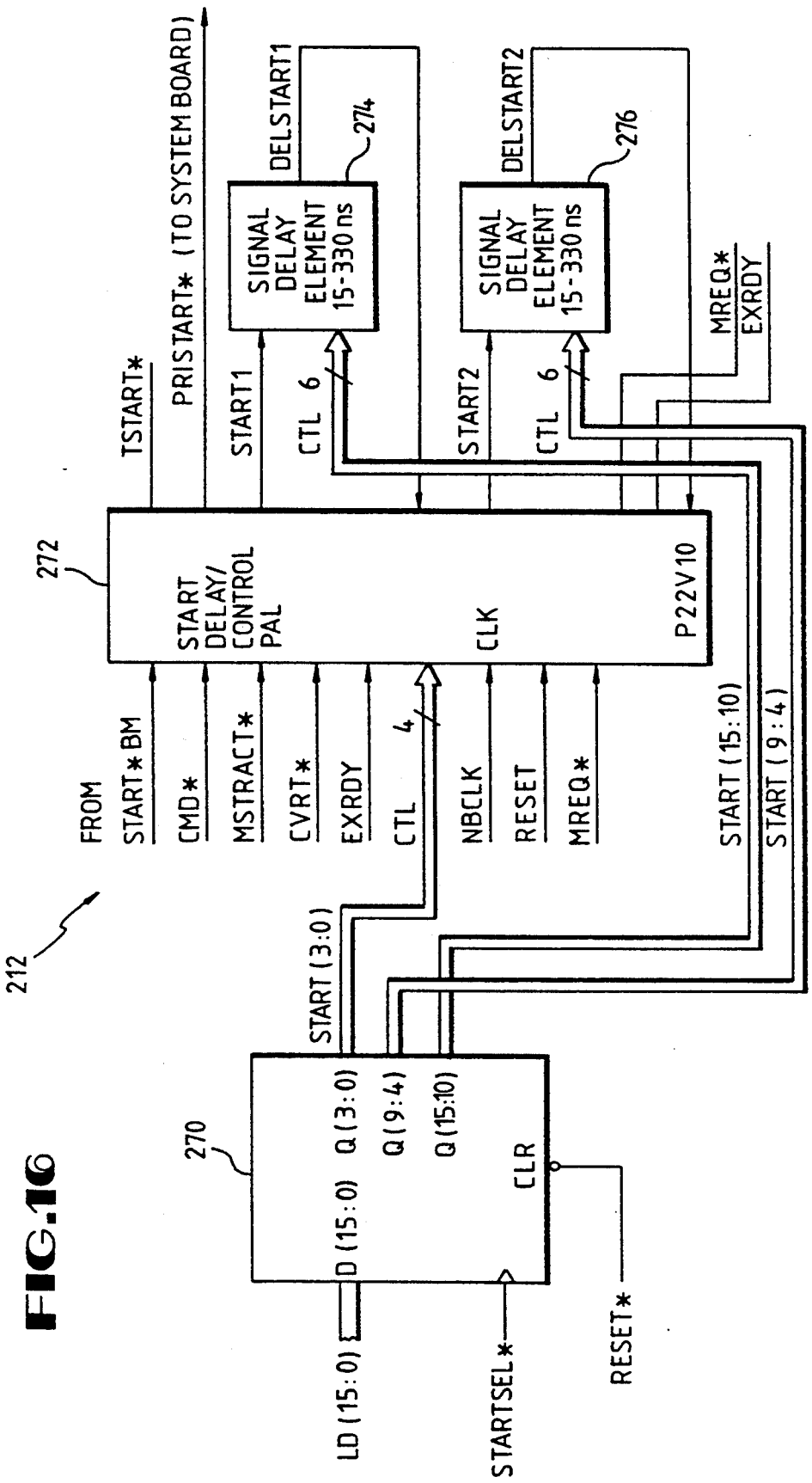
FIG. 16 is a block diagram illustrating the START* signal generation logic on the BMTAD of FIG. 14 according to the present invention.

Referring now to FIG. 16, the START* generation logic 212 is generally shown. The START* generation logic 212 generates the EISA cycle control signal START* that is provided to the system board S. The BMTAD 34 generates this signal because the EISA specification requires the START* signal to be asserted less than 25 ns after the rising edge of the BCLK signal, and the 27 ns inherent delay imposed by the in line delay circuit (FIG. 14) would cause this signal to be delayed beyond its specified limit. The START* generation logic 212 tracks the current state of the bus master 36 to predict when the START* signal should be asserted and then selectively delays its leading and/or trailing edges to generate a delayed version of the START* signal that is provided to the system board S. The START* generation logic 212 must predict when the START* signal is to be asserted because the inherent delay of the PAL 272 would otherwise cause the START* signal to be delayed beyond its specified limit.

The START* generation 212 logic includes a 16-bit programmable register referred to as the START* Control register 270. The LD<15:0> signals are connected to the D inputs of the register 270. The decoded I/O address signal of the register 270, referred to as STARTSEL*, is connected to the clock input of the control register 270. Therefore, when a user is writing to or programming the register 270, the STARTSEL* signal is asserted low, enabling the register 270 to latch data from the LD<15:0> signals. The Q<15:0> outputs of the register 270 generate signals referred to as START<15:0>. The RESET* signal is connected to the inverted clear input of the register 270.

The START* generation logic 212 is implemented in a PAL device referred to as the START* delay/control PAL 272. The PAL 272 receives as inputs the START* signal, the CMD* signal, a signal referred to as MSTRACT*, a signal referred to as CVRT*, the EXRDY signal, the START<3:0> signals, and the RESET signal. The PAL 272 also receives inputs referred to as DELSTART1 and DELSTART2. A signal referred to as NBCLK, which is the inverted BCLK signal, is connected to the clock input of the PAL 272. The MSTRACT* signal indicates when asserted low that the bus master 36 is active. The CVRT* signal indicates when asserted low that the system board S is performing data conversions because of data size incompatibilities between the bus master 36 and a slave.

The PAL 272 generates output signals referred to as TSTART*, PRISTART*, START1, and START2. The TSTART* signal is a local version of the START* signal on the BMTAD 34. The PRISTART* signal is the version of the START* signal supplied to the system board S. The START1 signal is connected to the input of a signal delay element 274. The START<15:10> signals are connected to the delay select inputs of the delay element 274. The signal delay element 274 controls the setup time of the PRISTART* signal by providing an amount of delay before the PRISTART* signal can be asserted. The output of the delay element 274 is the DELSTART1 signal. The START2 signal is connected to the input of a signal delay element 276. The START<9:4> signals are connected to the control inputs of the delay element 276. The signal delay element 276 controls the hold time of the PRISTART* signal by providing an amount of delay during which time the PRISTART* signal remains asserted. The output of the delay element 276 is the DELSTART2 signal.

Therefore, bits 15 through 10 of the control register 270, which correspond to the START<15:10> signals, control the assertion or leading edge of the PRISTART* signal. Bits 9 through 4 of the control register 270, which correspond to the START<9:4> signals, control the deassertion or trailing edge of the PRISTART* signal. The signal delay elements 274 and 276 work in a similar manner to the signal delay element 252 (FIG. 2) in that the signals input to their delay select inputs determine the number of 5 ns delays provided by the delay elements.

Bits 0 and 1 of the control register 270 control the generation of the PRISTART* signal with regard to whether the START* signal is passed through unconditioned, or whether the leading edge, trailing edge, or both edges of the START* signal are delayed. When the conditioning for an edge of the START* signal is not enabled, then the respective edge of the START* signal is passed through the conditioning logic unchanged to the system board S. When bits 0 and 1 both have value 0, the START* signal generated by the bus master 36 is passed through unconditioned to the system board S as the PRISTART* signal. When bits 0 and 1 have values 0 and 1, respectively, then the leading edge of the START* signal is delayed, the delay value being determined by bits 15 through 10 of the control register 270. When bits 0 and 1 have values 1 and 0, respectively, then the trailing edge of the START* signal is delayed, the delay value being determined by bits 9 through 4 of the control register 270. When bits 0 and 1 both have 1 values, then both edges of the START* signal are delayed. Bits 2 and three of the control register are not used according to the present invention. The operation of the START* control register 270 can be summarized as follows:

| BIT MNEMONIC | FUNCTION |
| --- | --- |
| 0-1 CONTROL | 00-START* signal unconditioned. |
| | 01-Delay leading edge of START*. |
| | 10-Delay trailing edge of START*. |
| | 11-Delay both edges of START*. |
| 2-3 SPARE | |
| 4-9 TRAILING EDGE | Trailing Edge delay value. |
| 10-15 LEADING EDGE | Leading Edge delay value. |

The START* generation circuit 212 enters a state in which it begins to assert the PRISTART* signal on the falling edge of the BCLK signal prior to the rising edge where the START* signal would normally be asserted. The inherent delay of the START* generation circuit 212 is 50 ns maximum as measured from the falling edge of the BCLK signal. Therefore, if the BCLK signal is operating at 8.333 Mhz, meaning a 120 ns length cycle, then setting the first delay element 274 to 00 0010 (10 ns) causes the START* signal to be asserted approximately on the rising edge of the BCLK signal.

Figure 17:
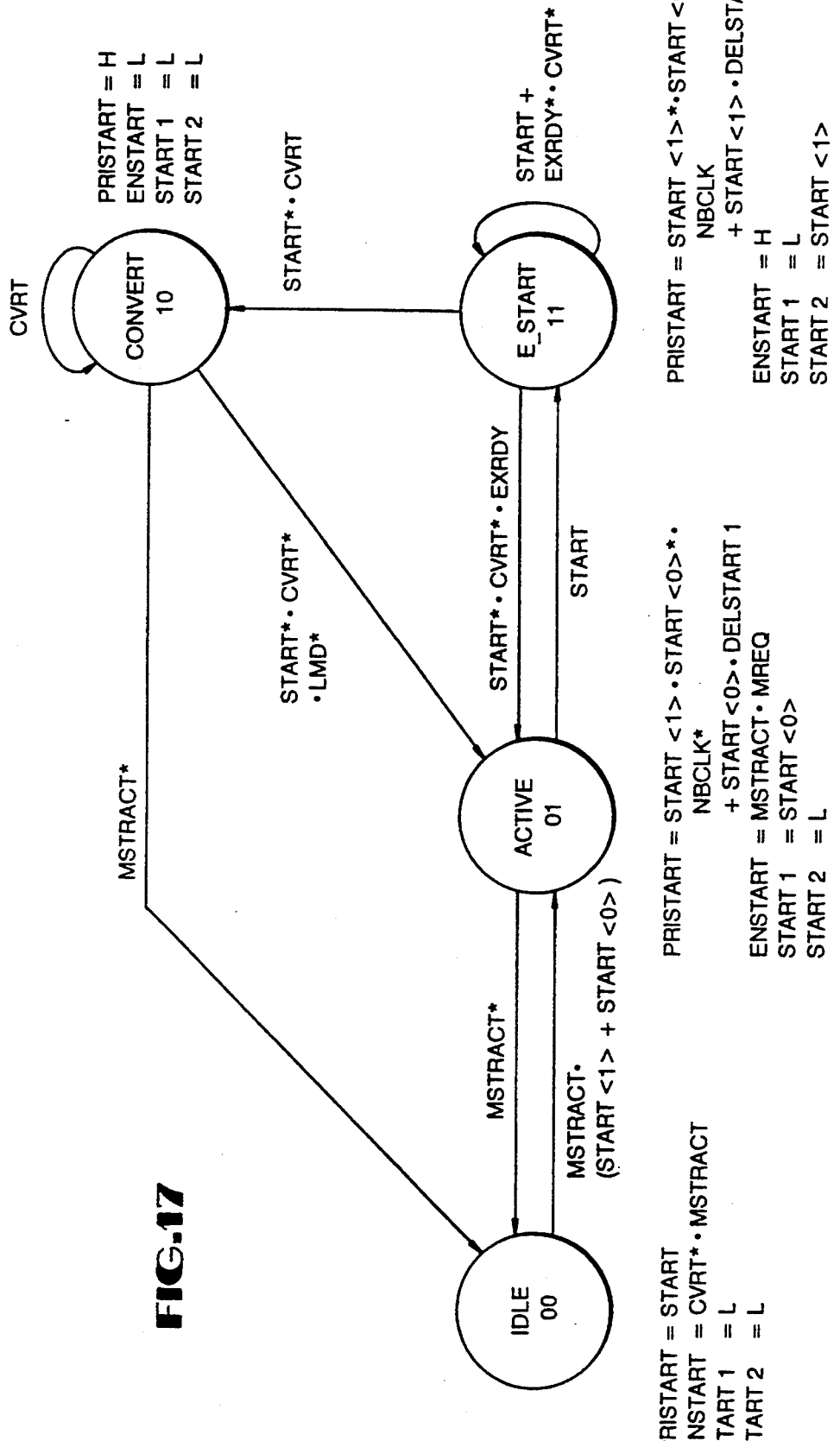
FIG. 17 is a state diagram illustrating the operation of the START* signal generation logic of FIG. 16 according to the present invention.

Referring now to FIG. 17, a state diagram which illustrates the operation of the START* generation logic 212 is shown. The state machine is synchronous to the rising edge of the NBCLK signal. The state machine is implemented in the PAL 272 and tracks the present state of the bus master 36 to enable the PAL 272 to know when to assert the PRISTART* signal to the system board S. The PAL 272 generates an internal condition referred to as ENSTART, which decodes the condition when the START* signal should be asserted. The ENSTART condition predicts when the START* signal is to be asserted and acts as an output enable for the PRISTART* signal, meaning that the PRISTART* signal is only asserted low when the ENSTART condition is true.

The state machine includes four states referred to as IDLE, ACTIVE, E_START, and CONVERT. The state machine begins in its IDLE state, and all states lead to this state when the RESET signal is asserted. In the IDLE state, the PRISTART* equals the START* signal. The equation for the ENSTART condition in this state is:

ENSTART=CVRT*·MSTRACT

The ENSTART condition is true when the bus master 36 is active and the system board S is not performing data conversions. The START1 and START2 signals are both negated low in the IDLE state. The state machine advances from its IDLE state to its ACTIVE state when the condition:

MSTRACT·(START<1>+START<0>)

is true. The state machine advances to its ACTIVE state when the bus master 36 is active and the START* control register 270 has been programmed to condition the START* signal. In the ACTIVE state, the equation for the PRISTART* signal is:

PRISTART=START<1>·START<0>*·NBCLK*
+START<0>·DELSTART1

Therefore, if only the trailing edge of the START* signal is to be conditioned, signified by the START<1> and START<0> signals having values 1 and 0, respectively, then the PRISTART* signal is asserted low in this state during the period when the NBCLK signal is high. If the leading edge of the PRISTART* signal is being conditioned, signified by the START<0> signal having a logic high value, then the PRISTART* signal is asserted low when the DELSTART1 signal is asserted. In this manner, the signal delay element 274 provides the appropriate amount of delay to the leading edge of the PRISTART* signal. In the ACTIVE state, the equation for the ENSTART condition is:

ENSTART=MSTRACT·MREQ

The ENSTART condition is asserted high when the bus master 36 is active and has requested bus access. The equation for the START1 signal in the ACTIVE state is:

START1=START<0>

Therefore the START1 signal is asserted high if the leading edge of the START* signal is being conditioned. The START2 signal is a logic low value in the ACTIVE state.

The state machine progresses from the ACTIVE state to the E_START state when the START* signal is asserted on the rising edge of the NBCLK signal. The equation for the PRISTART* signal in the E_START state is:

PRISTART=START<1>*·START<0>·NBCLKP+START<1>·DELSTART2*.

Therefore, the PRISTART* signal remains asserted until the NBCLK signal is asserted if only the leading edge delay feature is enabled. The PRISTART* signal remains asserted until the DELSTART2 signal is asserted if the trailing edge of the START* signal is being delayed, signified by the START<1> signal having a logic high value. Therefore, if the trailing edge delay feature is enabled, then the signal delay element 276 provides the appropriate amount of delay before the trailing edge of the PRISTART* signal occurs. In the E_START state, the ENSTART condition has a logic high value, enabling the PRISTART* signal in this state. The START1 signal has a logic low value in this state. The equation for the START2 signal is:

START2=START<1>

The START2 signal is asserted in the E_START state if the trailing edge of the START* signal is being conditioned. The asserted START2 signal enables the signal delay element 276 to provide the appropriate amount of delay before the trailing edge of the PRISTART* signal.

The state machine remains in the E_START state while the condition:

START+EXRDY*·CVRT* is true. The state machine remains in the E_START state while the START* signal remains asserted, or if the slave being accessed has requested wait states and the system board S is not performing data conversions. The state machine returns from the E_START state to its ACTIVE state when the condition

START*·CVRT*·EXRDY is true. The state machine returns to its ACTIVE state when the START* signal is negated, the accessed slave has not requested wait state timing, and system board data conversion is unnecessary.

The state machine progresses from the E_START state to the CONVERT state when the condition:

START*·CVRT is true. The state machine progresses to the CONVERT state upon the negation of the START* signal when the system board S must perform data signal conversions. The state machine remains in the CONVERT state while the CVRT* signal remains asserted, during which time the system board S is performing the necessary data conversions. In the CONVERT state the PRISTART* signal is negated high, the START1 and START2 signals are both logic low values, and the ENSTART condition is false.

The state machine progresses from the CONVERT state to the ACTIVE state when the condition:

START*·CVRT*·CMD* is true. The state machine returns to its ACTIVE state when the current bus cycle is completed and the system board S has completed its data signal conversions. In the ACTIVE state, the state machine operates as previously described, generating the PRISTART* signal depending on the value stored in the START* control register 270. The state machine progresses from its CONVERT state to the IDLE state if the MSTRACT* signal is negated, signifying that the bus master 36 is no longer active.

Figure 18A:
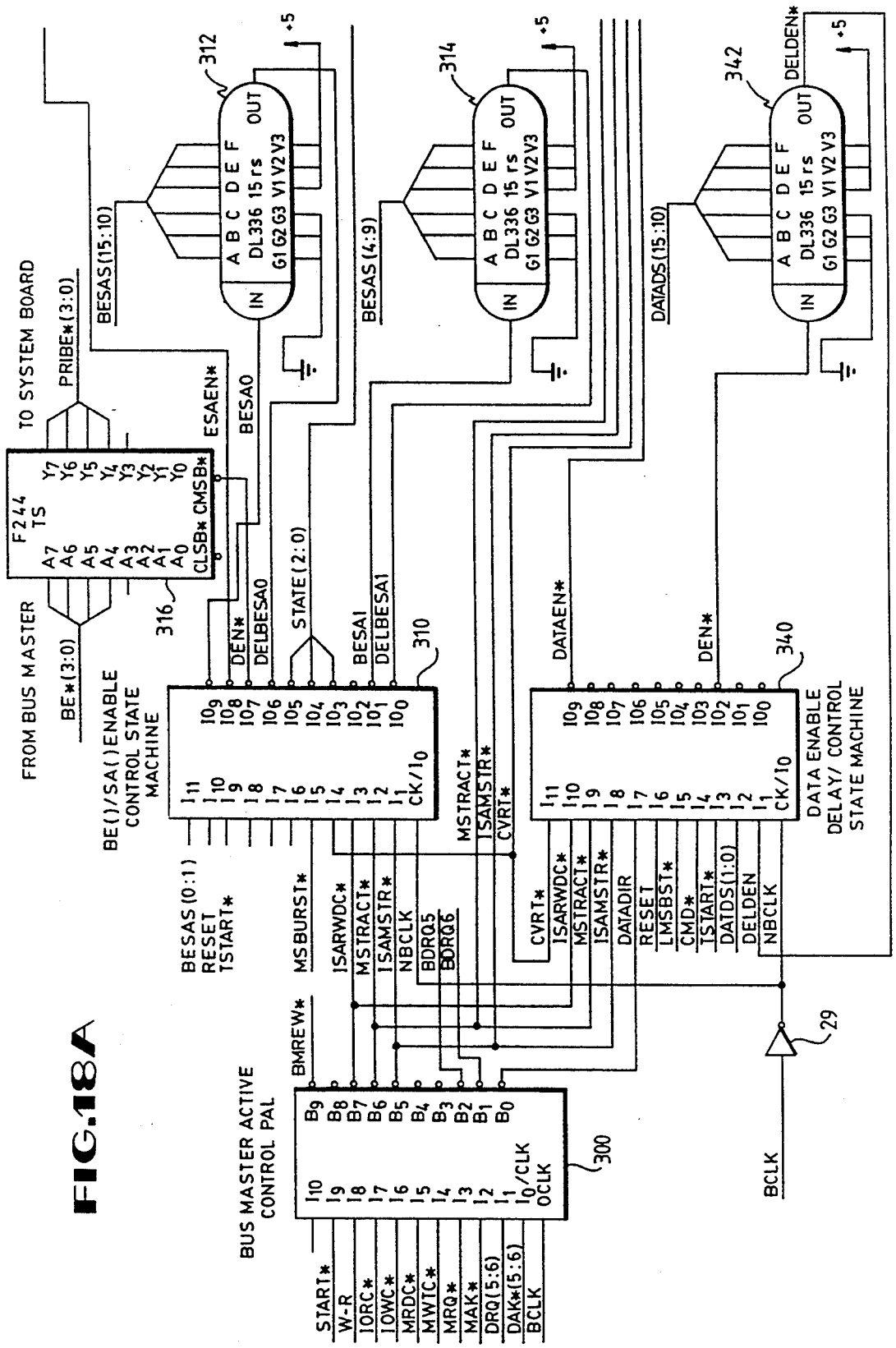
FIG. 18 is a schematic diagram illustrating the data & signal conditioning logic on the BMTAD of FIG. 14 according to the present invention.
Figure 18B:
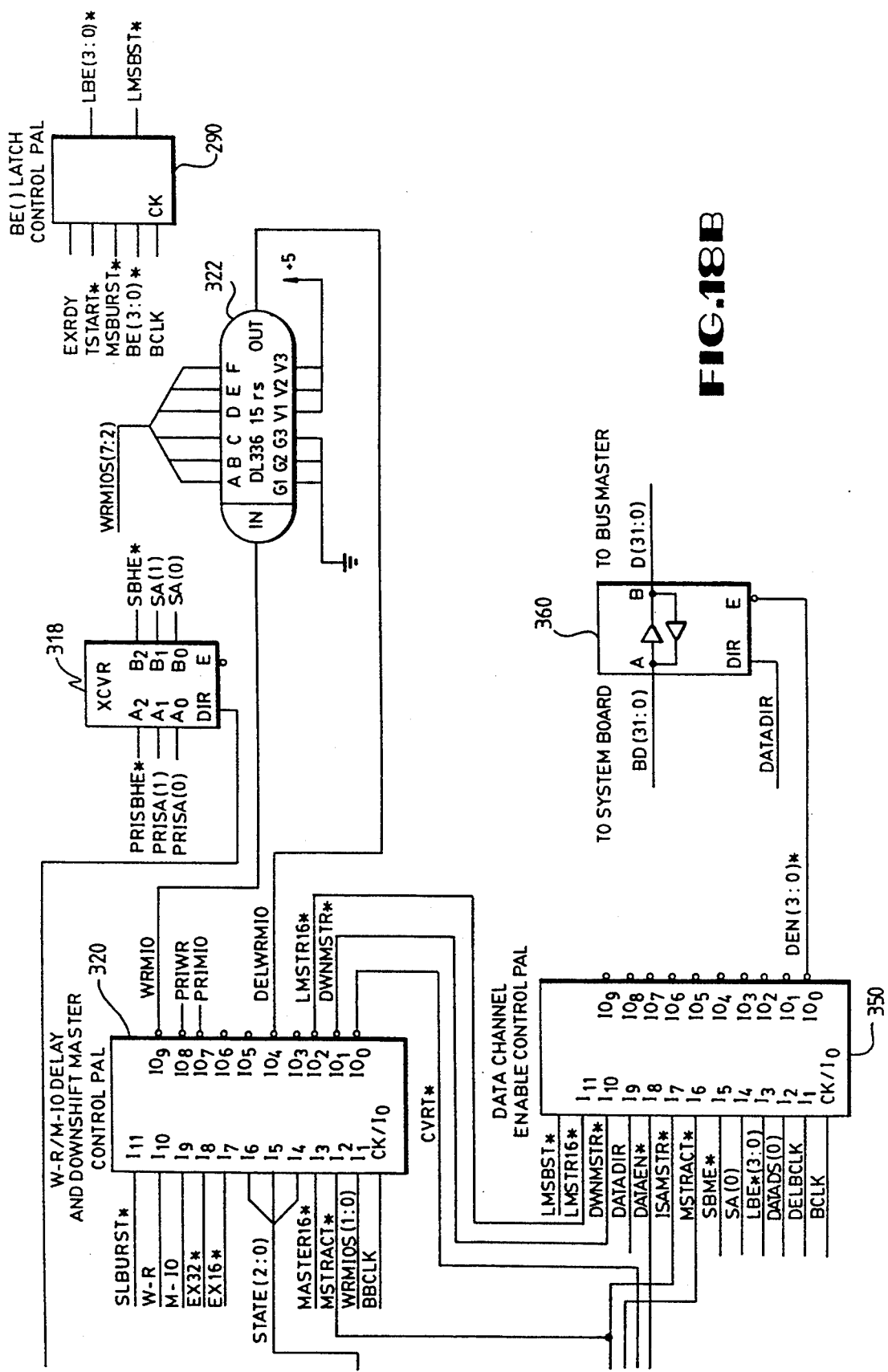

Referring now to FIG. 18, the data and signal conditioning circuit 220 is shown. The data and signal conditioning circuit 220 controls the timing of the assertion of all of the conditioned bus master output signals except the MSBURST*, MASTER16* and START* signals. The data and signal conditioning circuit 220 controls the assertion of the W-R and M-IO signals, the write data valid window, and the BE*<3:0> signals or the SA<1:0> and SBHE* signals, depending on whether the bus master 36 is an EISA or ISA bus master, respectively.

The BE< > latch control block circuit 226 is comprised of a PAL referred to as the BE< > Latch Control Pal 290, which latches the BE<3:0>* signals and the MSBURST* signal to allow for pipelining on the EISA bus. The BE<3>* signal, the BE<2>* signal, the BE<1>* signal, the BE<0>* signal, the EXRDY signal, the TSTART* signal, and the MSBURST* signal are connected to the inputs of the BE< > Latch Control PAL 290. The BCLK signal is connected to the clock input of the PAL 290. The PAL 290 generates output signals referred to as LBE<3>*, LBE<2>*, LBE<1>*, LBE<0>*, and LMSBST*. In the following signal equations, the representations below appear:

BE=[BE<3>, BE<2>, BE<1>, BE<0>]

LBE=[LBE<3>, LBE<2>, LBE<1>, LBE<0>]

The LEXRDY condition is a latched version of the EXRDY signal that is defined as:

LEXRDY=EXRDY·BCLK+LEXRDY·BCLK*

The BE<3:0>* signals tell the BMTAD 34 which data channels to enable during bus master cycles. Because the BE<3:0>* signals are pipelined, a latched version of the BE<3:0>* signals, referred to as LBE<3:0>*, are used by the BMTAD 34 to ensure that the proper channels are enabled for the entire cycle. On standard cycles, the BE<3:0>* signals are latched during START* and held for the entire cycle. During Burst cycles, the BE<3:0>* signals can change on every transfer within the cycle, so they are latched every BCLK signal period, unless wait states are added. To accomplish this task, a latched version of the BE<3:0>* signals, referred to as XBE<3:0>*, are maintained. The following representation is used for the XBE<3:0>* signals:

XBE=[XBE<3>, XBE<2>, XBE<1>, XBE<0>]

The equation for the XBE signals is:

XBE
:=BE·(TSTART+MSBURST·LEXRDY)+X-
BE·(TSTART+MSBURST·LEXRDY)*

The XBE<3:0>* signals are latched at the beginning of a transfer when the START* signal is asserted and every subsequent transfer in a burst cycle. The equation for the LBE<3:0>* signals is:

LBE=TSTART*·XBE+TSTART·BE

The LBE<3:0>* signals track the BE<3:0>* signals when the START* signal is asserted and the XBE<3:0>* signals when the START* signal is negated.

The bus master active control block circuit 228 comprises a PAL referred to as the Bus Master Active Control PAL 300. The PAL 300 indicates when the bus master 36 mounted on the BMTAD 34 has control of the system bus and whether the bus master 36 is an ISA or EISA bus master. The PAL 300 also determines the direction of data flow when the bus master 36 has control of the bus.

The PAL 300 receives input signals, START*, W-R, IORC*, IOWC*, MRDC*, MWTC*, MRQ*, MAK*, DRQ<5:6>, and DAK*<5:6>. The BCLK signal is connected to the clock input of the PAL 300. According to the preferred embodiment, DMA channels 5 and 6 are preferably used by the ISA bus master 36, but the use of other channels is also contemplated. The PAL 300 generates the MSTRACT* signal as well as output signals referred to as ISARWDC*, ISAMSTR*, DATADIR, BMREQ, BDRQ5, and BDRQ6. The PAL 300 generates a condition referred to as LW-R to aid in generating the DATADIR signal. The LW-R condition is decoded as:

LW-R=W-R·START+LW-R·START*

The LW-R condition is a latched version of the W-R signal which latches the polarity of the W-R signal during an entire cycle.

The DATADIR signal indicates the direction of data flow between the bus master 36 and the system board S. The equation for the DATADIR signal is:

DATADIR*=MSTRACT·(ISAMSTR*·LW-R+ISAMSTR·(IOWC+MWTC))

The default value of the DATADIR signal is a logic high value, which provides for data flow from the system board S to the bus master 36. The DATADIR signal is also a logic high value during bus master read cycles. The DATADIR signal is a logic low value during bus master write operations to enable data from the bus master 36 to the system board S. For ISA bus master cycles, the DATADIR signal is a logic low value until either the IORC* or MDRC* signal is asserted. This allows write data to be valid before the assertion of the IOWC* or MWTC* signals.

The ISARWDC* signal is used to determine the state of the ISA bus master 36, and the equation for this signal is:

ISARWDC=IOWC+IORC+MWTC+MRDC

The ISARWDC* signal is asserted low when either of the above signals are asserted low. The BDRQ5, BDRQ6, and BMREQ signals are buffered versions of the corresponding DRQ5, DRQ6, and MREQ signals.

The PAL 300 determines whether an EISA or ISA bus master 36 has control of the bus, depending on what type of request was made, master request (MREQ) or DMA request (DRQ). The ISAMSTR* signal indicates when asserted low that the bus master 36 is an ISA bus master and has control of the bus. The ISAMSTR* signal is negated high when the bus master 36 is an EISA bus master and has control of the bus. The MSTRACT* signal indicates when asserted low that the bus master 36 has control of the system bus. The bus master 36 gains control of the bus asynchronously when it requests the bus and the system board S grants it the bus. The bus master remains on the bus until the system board S removes the grant and the request is negated. The MSTRACT* signal is generated asynchronously when the MREQx* (or DRQx) and MAKx* (or DAKx*) signals are both asserted, and this signal remains low until the MAKx* (or DAKx*) signals and their corresponding requests ar negated.

Figure 19:
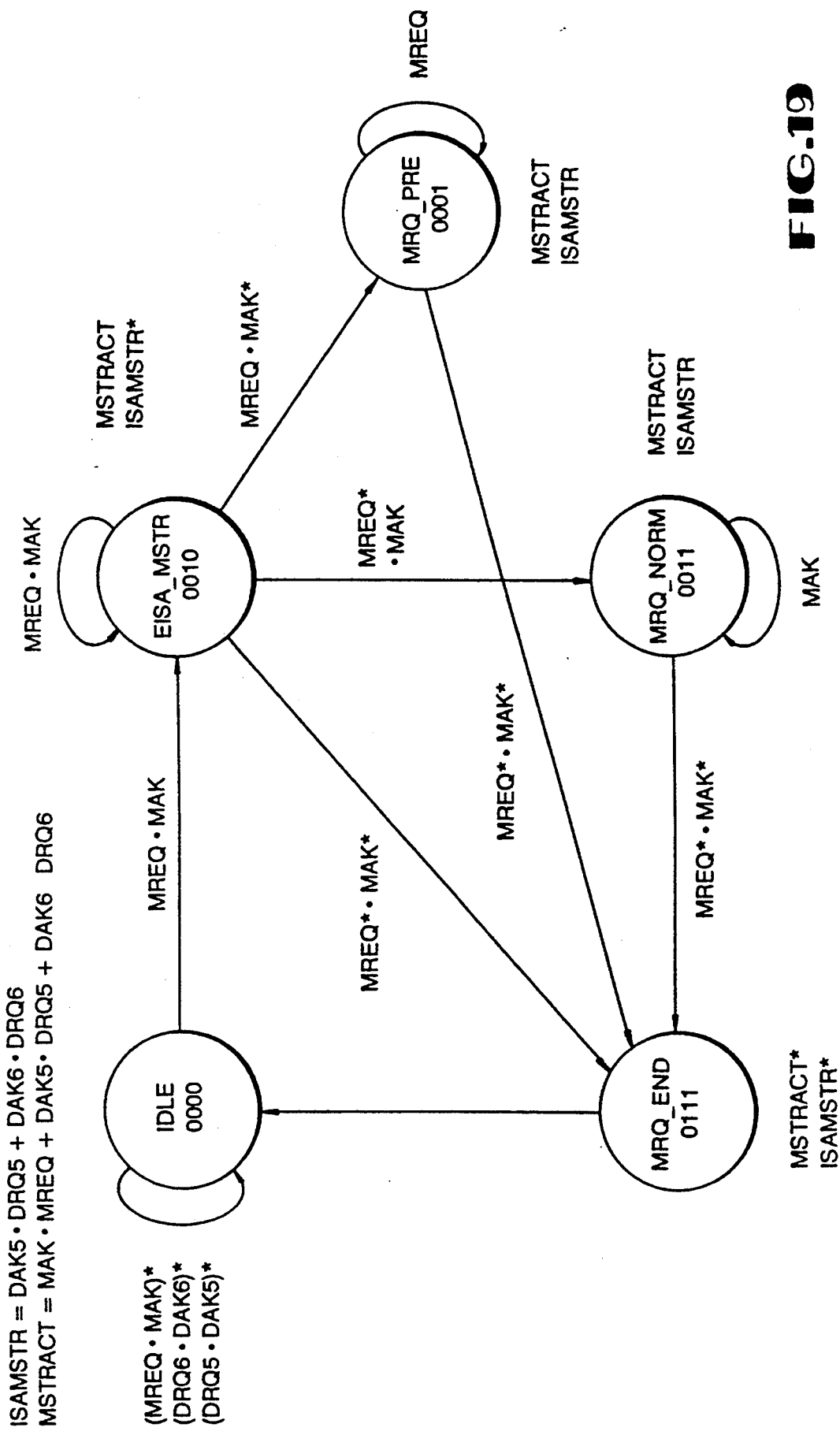
FIGS. 19, 20, and 21 are state diagrams illustrating the operation of the Master Active Control PAL of FIG. 18.
Figure 20:
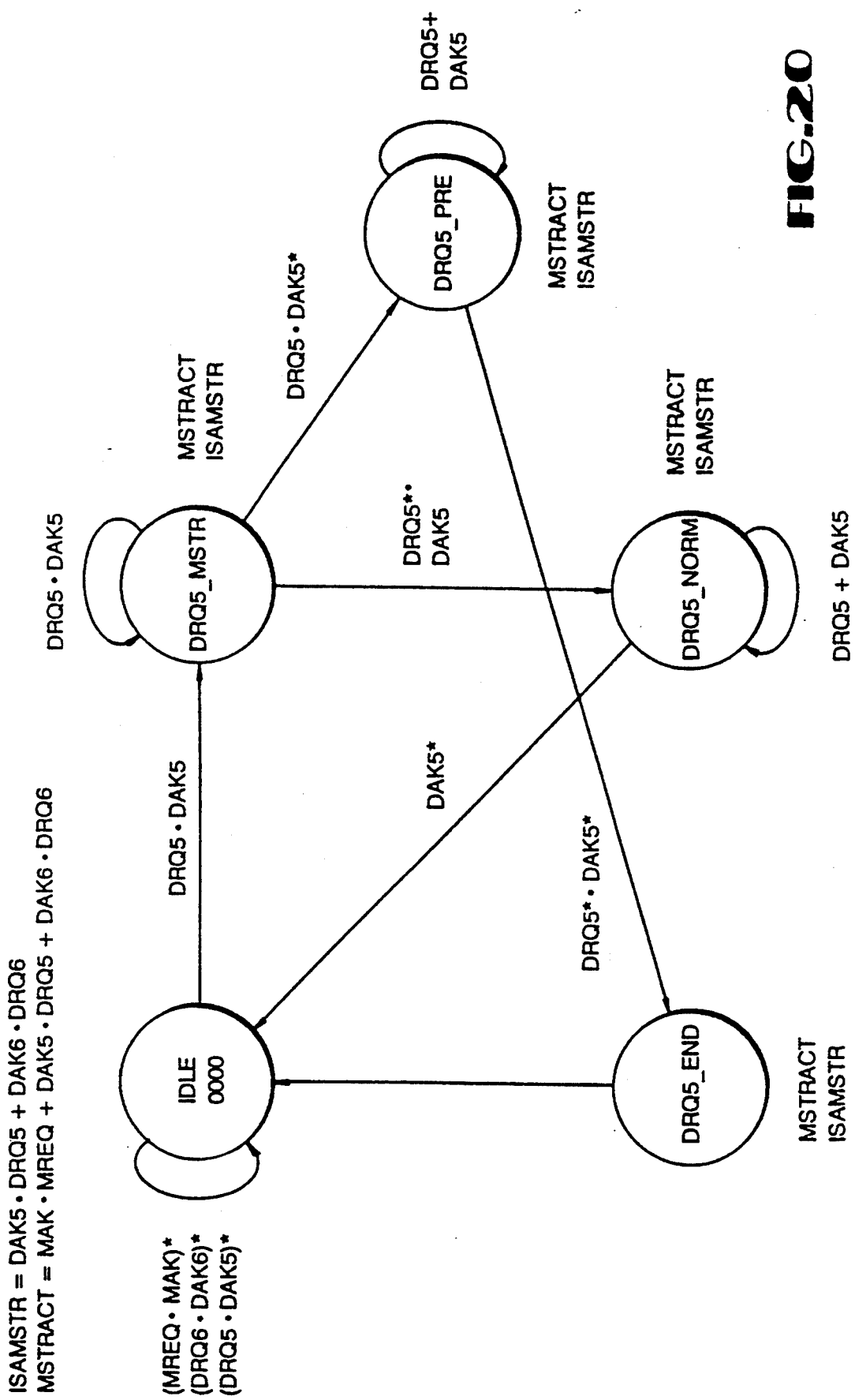
Figure 21:
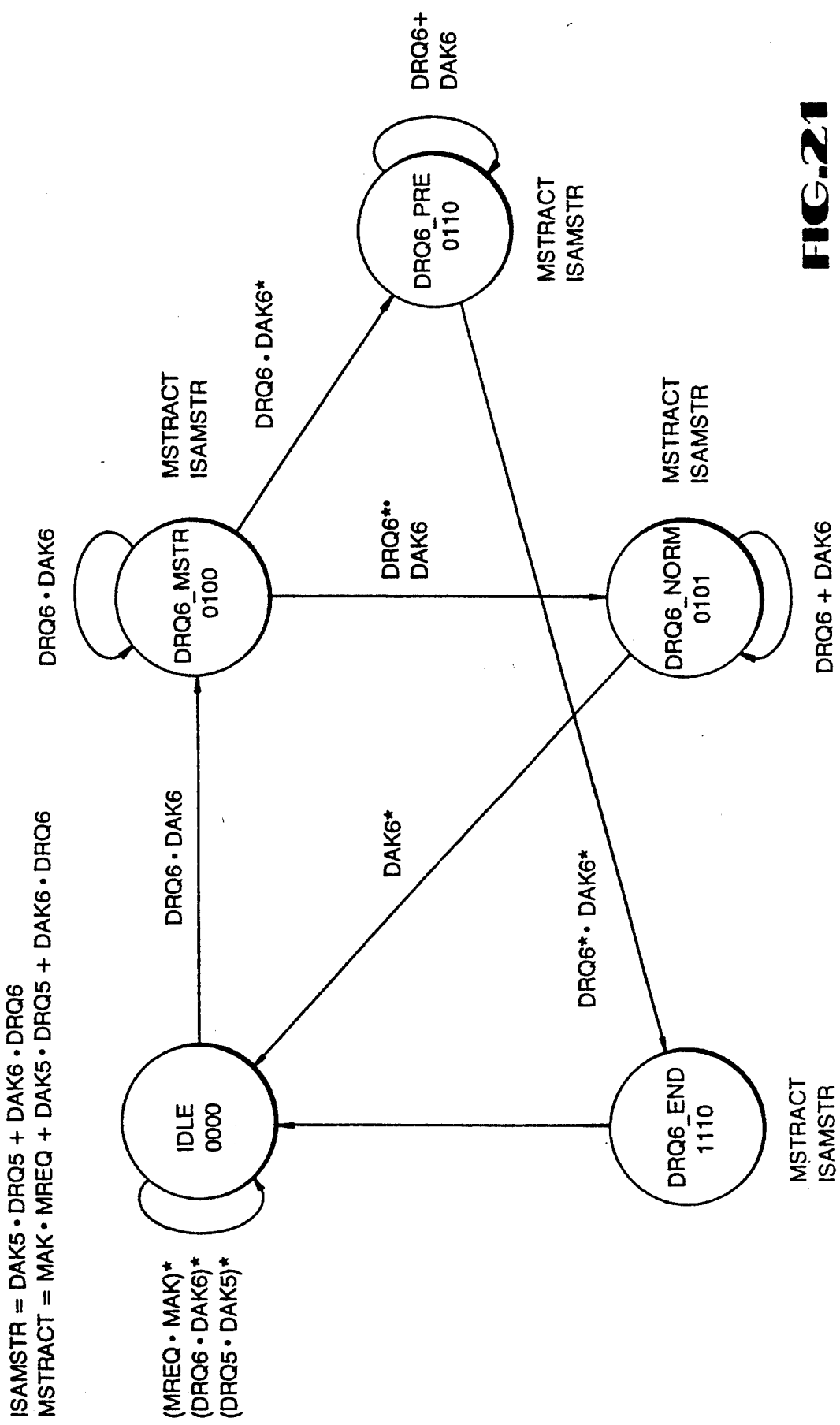

Referring now to FIGS. 19, 20, and 21, the Bus Master Active Control PAL generates a state machine which controls the generation of the MSTRACT* and ISAMSTR* signals. A state machine is required to control the generation of these signals because the system board S includes a feature whereby it can preempt the bus master 36 in control of the bus and grant bus access to another device in certain situations. During DMA cycles, the system board S negates the respective DAKx* signal to preempt the bus master 36 after another device requests the bus and 4 microseconds have elapsed. During EISA master cycles, the system board S negates the MAKx* signal to indicate to the active bus master 36 that another device has requested the bus. In this instance, the bus master 36 must negate its MREQx* request to release control of the bus within 8 microseconds, which is when preemption occurs. Therefore, the state machine distinguishes between instances where the bus master 36 gains access to the bus through a slot-specific EISA request or through a DMA request and accounts for instances where the system board S preempts the DMA process. The state machine is synchronous to the rising edge of the BCLK signal and includes three paths for instances where slot-specific bus master requests using the MREQx* and MAKx* signals are initiated, or where DMA channels 5 or 6 are requested using the DRQ<5> and DAKx*<5> or DRQ<6> and DAKx*<6> signals, respectively.

The state machine begins in its IDLE state and changes state on the BCLK signal. The equations for the ISAMSTR* and MSTRACT* signals in the IDLE state are:

ISAMSTR=DAK5·DRQ5+DAK6·DRQ6

MSTRACT=MAK·MREQ+DAK5·DRQ5+DAK6·DRQ6

The ISAMSTR* signal is asserted low in the IDLE state when the bus master 36 has requested a DMA channel and has received a DMA acknowledge from the system board S. The MSTRACT* signal is asserted low in the IDLE state when the bus master 36 gains access to the bus through DMA channels 5 or 6 or through its slot-specific bus request. The ISAMSTR* and MSTRACT* signals are asserted in the IDLE state to ensure that these signals are asserted immediately when the proper conditions occur. If these signals were not asserted until a subsequent state, then they would not have a proper timing window. The state machine remains in the IDLE state until one of the conditions for the MSTRACT* signal is true.

Referring now to FIG. 19, the state machine advances from its IDLE state to a state referred to as EISA_MSTR when the condition:

MREQ·MAK is true. The state machine enters the EISA_MSTR state when the bus master 36 makes a slot-specific bus request and receives an acknowledgement from the system board S. In this state, the MSTRACT* signal is asserted and the ISAMSTR* signal is negated, signifying that the bus master 36 is an EISA bus master. The state machine remains in this state while the condition:

MREQ·MAK is true.

The state machine advances to a state referred to as MRQ_NORM when the bus master 36 removes its request, signified by the condition:

MREQ*·MAK

The state machine remains in the MRQ_NORM state while the MAKx* signal remains asserted.

The state machine advances from the MRQ_NORM state to a state referred to as MRQ_END if the system board S deasserts the MAKx* signal in response to the bus master deasserting the MREQ* signal, signified by the condition:

MREQ*·MAK*

The state machine progresses from the MRQ_END state to the IDLE state on the next BCLK signal cycle.

The state machine advances from the EISA_MSTR state directly to the MRQ_END state if the bus master 36 deasserts its MREQ* request and the system board S responds by deasserting the MAKx* signal before the state machine can advance to the MRQ_NORM state, signified by the condition:

MREQ*·MAK*

The state machine advances from the EISA_MSTR state to a state referred to as MRQ_PRE when the system board S negates the MAKx* signal to indicate to the bus master 36 that another device has requested the bus, signified by the condition:

MREQ·MAK*

The state machine remains in the MRQ_PRE state while the MREQ* signal remains asserted. The state machine advances from the MRQ_PRE state to the MRQ_END state when the bus master 36 acknowledges the preemption and deasserts its bus request, signified by the condition:

MREQ*·MAK*

In the EISA_MSTR, MRQ_NORM, MRQ_PRE, and MRQ_END states, the MSTRACT* signal is asserted and the ISAMSTR* signal is negated.

Referring now to FIG. 20, the state machine advances from its IDLE state to a state referred to as DRQ5_MSTR when the condition:

DRQ5·DAK5 is true. The state machine enters the DRQ5_MSTR state when the bus master 36 requests DMA service on DMA channel 5 and receives a DMA acknowledge from the system board S. In this state, the MSTRACT* signal and the ISAMSTR* signal are asserted, signifying that the bus master 36 is active and is an ISA bus master. The state machine remains in this state while the condition:

DRQ5·DAK5 is true.

The state machine advances from the DRQ5_MSTR state to a state referred to as DRQ5_NORM when the bus master 36 removes its request, signified by the condition:

DRQ5*·DAK5

The state machine remains in the DRQ5_NORM state while the DAK5* signal remains asserted or if the bus master reasserts the DRQ5 signal to request DMA access, signified by the condition:

DRQ5+DAK5

The state machine returns from the DRQ5_NORM state to the IDLE state if the system board S deasserts the DAK5* signal in response to the bus master deasserting the DRQ5 signal, signified by the condition:

DAK5*

The state machine advances from the DRQ5_MSTR state to a state referred to as DRQ5_PRE if the system board S negates the DAK5* signal, which indicates to the bus master 36 that the system board S has preempted the DMA process. This progression is signified by the condition:

DRQ5·DAK5*

The state machine remains in the DRQ5_PRE state while the DRQ5 signal remains asserted or if the system board S subsequently reasserts the DAK5* signal, signified by the condition:

DRQ5+DAK5

The state machine advances from the DRQ5_PRE state to a state referred to as DRQ5_END when the bus master 36 deasserts its DMA request in response to the preemption, signified by the condition:

DRQ5*·DAK5*

The state machine returns to its IDLE state on the next BCLK signal cycle. In the DRQ5_MSTR, DRQ5_NORM, DRQ5_PRE, and DRQ5_END states, the MSTRACT* and ISAMSTR* signals are asserted.

Referring now to FIG. 21, the state machine progresses through its third path when the bus master 36 requests channel 6 of the DMA subsystem on the system board S. The progression of the state machine through the third path is identical to that of the second path described above in FIG. 20 when the bus master 36 is using DMA channel 5 except that references are to DRQ6 and DAK6*, so the details of its implementation have been omitted for simplicity.

The BE/SA control logic 222 controls the setup and hold timing of the BE*<3:0> signals or the SA<1:0> and SBHE* signals generated by an EISA or ISA bus master, respectively, in order to verify the operation of EISA/ISA bus translation logic on the system board S. Because both the setup and hold timing of these signals are important, simply delaying these signals from the bus master 36 using the in line delay circuit (FIG. 14) is not sufficient for testing purposes. If the bus master 36 is an EISA bus master and is communicating with an ISA slave, the system board S must translate the BE*<3:0> signals from the bus master 36 to the SA<1:0> and SBHE* signals for the ISA slave. If the bus master 36 is an ISA bus master and is communicating with an EISA slave, the system board S must translate the SA<1:0> and SBHE* signals from the ISA bus master 36 to the BE*<3:0> signals for the EISA slave.

Referring again to FIG. 18, the BE/SA control logic 222 is implemented in a PAL referred to as the BE/SA Delay Enable Control PAL 310 and two delay elements 312 and 314. The PAL 310 tracks the bus master cycles and allows a user to selectively delay the setup and hold timing of these signals, thereby testing the signal conversions performed by the system board S. During data translation cycles, an EISA bus master floats the BE<3:0>* signals to allow the system board S to assert them. Therefore, the BE/SA Delay Enable Control PAL 310 tests the disabling (floating) of the BE<3:0>* signal during data translation cycles when the bus master 36 is an EISA bus master.

The control registers block circuit 214 on the BMTAD 34 includes a 16 bit user programmable register which controls the delay added to the respective BE*<3:0> or SA<1:0> and SBHE* signals generated by the bus master 36. Because this type of control register is well known to those skilled in the art, details of its implementation have been omitted for the purpose of clarity. The register generates signals referred to as BESAS<15:0>. The BESAS<15:10> and BESA-S<9:4> signals control the amount of delay added to the leading edge and trailing edge, respectively, of the generated signals. The BESAS<1:0> signals control which edges of these signals, if any, are delayed. When the BESAS<1:0> signals have value 0, then the conditioning for the respective signals is disabled. When the BESAS<1:0> signals have value 1, a delay is added to the leading edge, but not the trailing edge, of these signals. When the BESAS<1:0> signals have a value of 2, a delay is added to the trailing edge, but not the leading edge. When the BESAS<1:0> signals have a value of 3, then both the leading and trailing edges of the respective signals are delayed. Bits 2 and 3 of the Control Register are not used according to the present invention. Therefore, operation of the BE/SA Control Register can be summarized as follows:

THE BE/SA CONTROL REGISTER:

| BIT | MNEMONIC | FUNCTION |
| --- | --- | --- |
| 0–1 | CONTROL | 00-Enable BE/SA normally. |
|  |  | 01-Delay enabling of BE/SA. |
|  |  | 10-Delay disabling of BE/SA. |
|  |  | 11-Delay enable and disabling of BE/SA. |
| 2–3 | SPARE |  |
| 4–9 | Leading edge delay value. | |
| A–F | Trailing edge delay value. | |

The PAL 310 receives as inputs, the ISARWDC*, RESET, TSTART*, MSTRACT*, ISAMSTR*, MSBURST*, BESAS<1>, and BESAS<0> signals. The PAL 310 also receives signals referred to as DELBESA1, DELBESA0, and CVRT*. The BCLK signal is connected to the input of an inverter 298 whose output is the NBCLK signal. The NBCLK signal is connected to clock input of the PAL 310. The PAL 310 generates output signals referred to as ESAEN*, EBEN*, BESA0, and BESA1. The PAL 310 also generates three state signals referred to as STATE<2:0>. The BESA0 signal is connected to the input of the delay element 312 whose output is the DELBESA0 signal. The BESAS<15:10> signals are connected to the delay select inputs of the delay element 312. The BESA1 signal is connected to the input of the delay element 314 whose output is the DELBESA1 signal. The BESAS<9:4> signals are connected to the delay select inputs of the delay element 314.

The same delay elements used to delay the enabling of the SA<1:0> signals and the SBHE* signal are used to delay the BE*<3:0> signals. The BMTAD 34 determines which type of bus master 36 has control of the bus and controls the appropriate signals, tri-stating the other signals. Therefore, only one set of delay elements 312 and 314 and one control register are required.

The EBEN* signal is connected to the EMSB* enable input of a buffer 316. The BE*<3:0> signals, are connected to the inputs of the buffer 316. The corresponding outputs of the buffer 316 generate signals referred to as PRIBE*<3:0>, which are the byte enable signals provided to the system board S. When the EMSB* input receives a logic low value, the signals input to the buffer 316 are enabled to the corresponding outputs. Therefore, when the EBEN* signal is asserted low, the BE*<3:0> signals are enabled through the buffer 316 to the system board S as the PRIBE<3:0>* signals.

The ESAEN* signal is connected to the direction input of a transceiver 318. The SA<1:0> signals, and the SBHE* signal are connected to inputs of the transceiver 318, respectively. The A inputs of the transceiver 318 receive signals referred to as PRISA<1:0>, and PRISBHE*, respectively, which are coupled to the system board S. The inverted enable input of the transceiver 318 is tied to a logic low value. Therefore, when the ESAEN* signal is asserted low, the SA<1:0> and SBHE* signals are enabled through the transceiver 318 to the system board S as the PRISA<1:0> and PRISBHE* signals, respectively.

Figure 22:
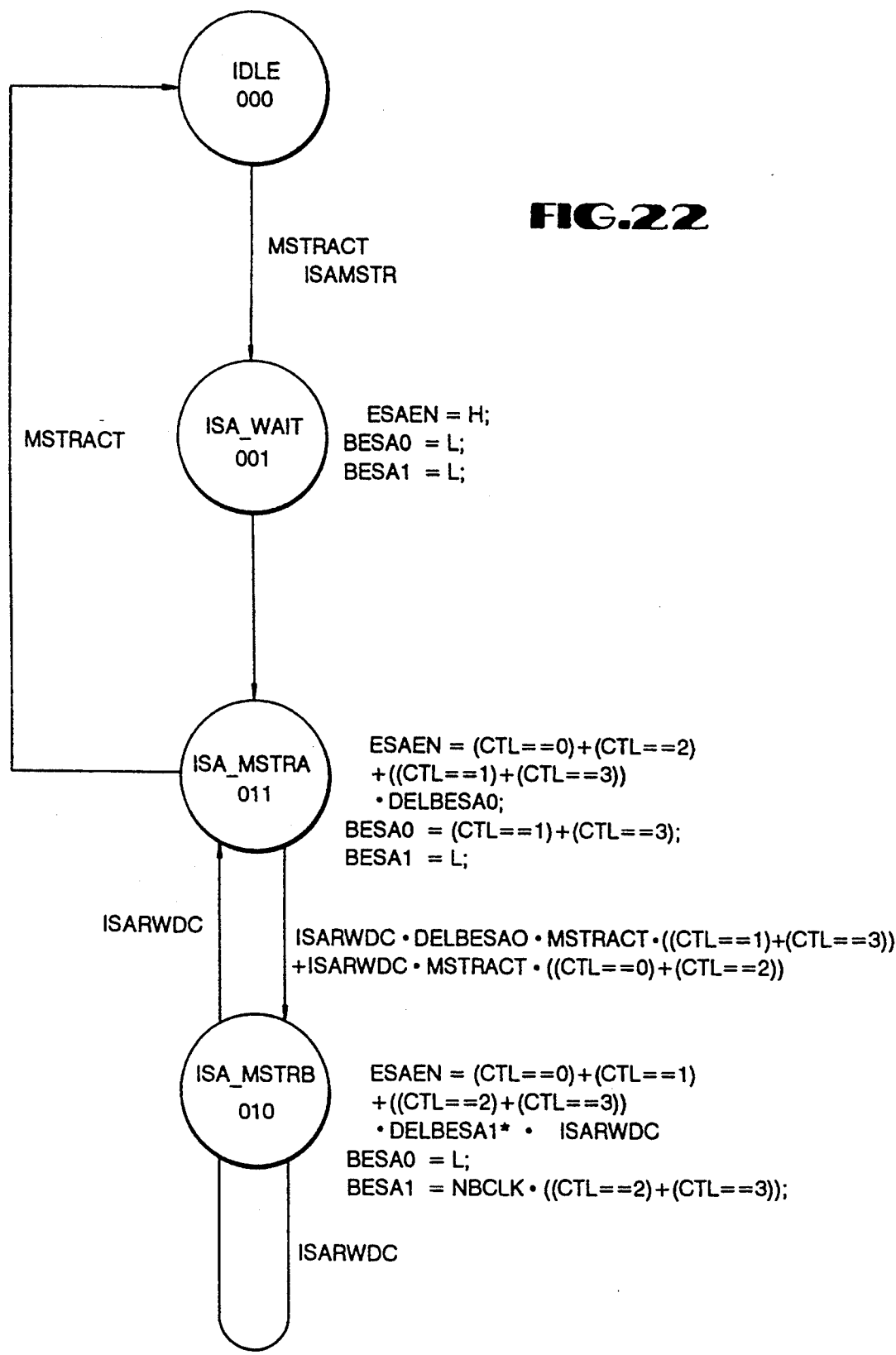
FIGS. 22 and 23 are state diagrams illustrating ISA and EISA paths of the BE/SA Enable Control state machine generated by the BE/SA control PAL of FIG. 18.
Figure 23:
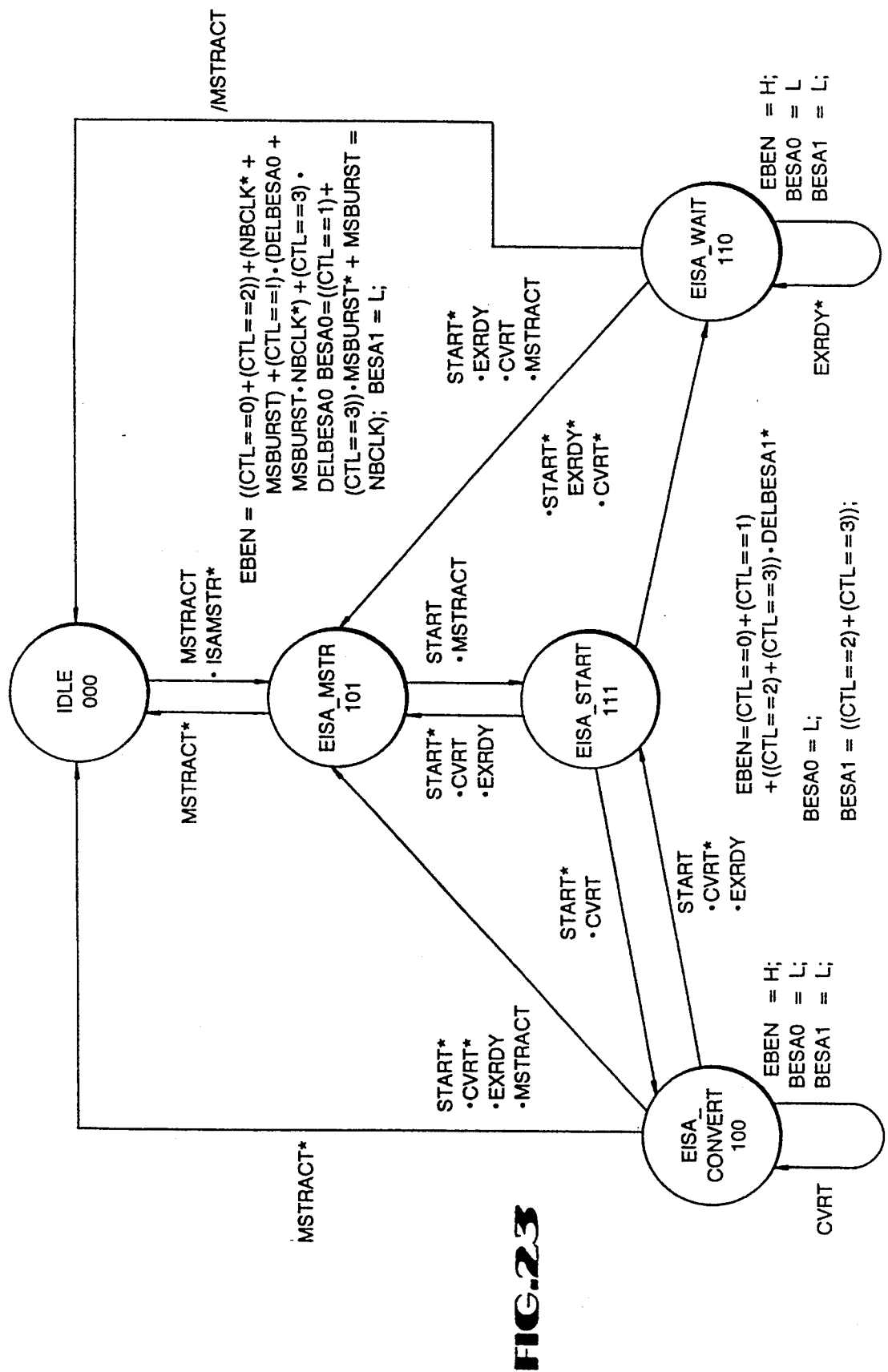

Referring now to FIGS. 22 and 23, state diagrams which illustrate the operation of the BE/SA Control PAL 310 with regard to ISA and EISA bus masters, respectively, is shown. The state machine is synchronous to the rising edge of the NBCLK signal. The state machine includes two primary paths depending on whether the bus master 36 is an ISA or EISA bus master. In the state equations and transition conditions that follow, the BESAS<1:0> signals are represented by a value referred to as CTL.

Referring now to FIG. 22, if the bus master 36 is an ISA bus master, the state machine controls the enabling of the SA<1:0> and SBHE* signals. The state machine begins in a state referred to as IDLE. When the MSTRACT* and ISAMSTR* signals are asserted, signifying that the ISA bus master 36 is active, the state machine enters the ISA_WAIT state. In this state, the ESAEN* signal is negated high and the BESA0 and BESA1 signals are negated low. On the next BCLK signal cycle, the state machine advances to the ISA_MSTRA state. In the ISA_MSTRA state, the equation for the BESA0 signal is:

BESA0=(CLT==1)+(CLT==3)

The BESA0 signal is asserted in the ISA_MSTRA state to trigger the delay element 312 if the leading edge delay feature is enabled. The BESA1 signal is negated low in this state.

The equation for the ESAEN* signal is:

ESAEN=(CTL==0)+(CTL==2)+((CTL==1)+(CTL==3))·DELBESA0

If the leading edge delay feature is not enabled, signified by the BESAS<1:0> signals having either values 0 or 2, then the ESAEN* signal is asserted low, enabling the PRISA<1:0> and PRISBHE* signals to the system board S. If the leading edge delay feature is enabled, signified by the BESAS<1:0> signals having either values 1 or 3, then the ESAEN* signal is asserted when the DELBESA0 signal is asserted, which occurs when the BESA0 signal has propagated through the delay element 312. In this manner, the delay element 312 delays the enabling, and thereby the leading edges, of the SA<1:0> and SBHE* signals.

The state machine advances from the ISA_MSTRA state to a state referred to as ISA_MSTRB when the condition:

ISARWDC , DELBESA0 · MSTRACT · ((CTL == 1) + (CTL == 3))
+ ISARWDC · MSTRACT · ((CTL == 0) + (CTL == 2)

is true. The state machine advances to the ISA_MSTRB state when the bus master 36 asserts one of the ISA command signals. If the leading edge delay feature is enabled, the state machine waits for the DEL-BESA0 signal to be asserted before advancing to the ISA_MSTRB state. The state machine remains in the ISA_MSTRB state while the ISARWDC* signal is asserted.

The equation for the BESA1 signal in the ISA_MSTRB state is:

BESA1=NBCLK·((CTL==2)+(CTL==3))

The BESA1 signal is asserted in this state to trigger the delay element 314 when the trailing edge delay feature is enabled. The BESA1 signal is asserted when the BCLK signal is low, which allows the delay value to be independent of the actual duration of the ISA command signal. The BESA0 signal is negated low in this state.

The equation for the ESAEN* signal in the ISA_MSTRB state is:

ESAEN = (CTL == 0) + (CTL == 1) +
((CTL == 2) + (CTL == 3)) · DELBESA1* · ISARWDC

Therefore, if the trailing edge delay feature is enabled, signified by the BESAS<1:0> signals having either value 2 or 3, the ESAEN* signal remains asserted until the DELBESA1 signal is asserted or the ISARWDC* signal is negated. In this instance, the delay element 314 is timing out the appropriate amount of delay to establish the hold timing of the signals. If the trailing edge delay feature is disabled, the ESAEN* signal remains asserted until the ISA command signal ISARWDC* is negated (synchronous with NBCLK), which causes the state machine to return to the ISA_MSTRA state.

The state machine returns to the ISA_MSTRA state when the ISARWDC* signal is negated, and the cycle described above repeats itself. The state machine remains in the ISA_MSTRA state until either the bus master 36 asserts an ISA command signal, causing the state machine to return to the ISA_MSTRB state, or the bus master 36 is no longer active, which causes the state machine to return to the IDLE state.

Therefore, on the first transfer in a cycle, the state machine begins in the IDLE state, and the signal delay is enabled from the assertion of the MSTRACT* signal. On subsequent cycles, the state machine begins from the ISA_MSTRA state, and the delay is enabled upon an asserted ISA command signal. The enabling of the delay is synchronous with the rising edge of the NBCLK signal, even though the delay is asynchronous. This allows 5 ns of resolution for the delay value.

Referring now to FIG. 23, if the bus master 36 is an EISA bus master, the state machine follows a different path and controls the enabling of the BE*<3:0> signals. The state machine begins in the IDLE state and advances to a state referred to as EISA_MSTR when the EISA bus master 36 is active, signified by the condition:

MSTRACT·ISAMSTR*

The equation for the BESA0 signal in this state is:

BESA0=((CTL==1)+(CTL==3))·(MSBURST*+MSBURST·NBCLK)

The BESA0 signal is asserted if the leading edge delay feature is enabled either on non-Burst cycles or on Burst cycles when the BCLK signal is low. The BESA1 signal is a logic low value in this state.

The equation for the EBEN* signal in this state is:

```
EBEN = ((CTL == 0) + (CTL == 2)) ·
       (NBCLK* + MSBURST)
       + (CTL == 1) · (DELBESA0 + MSBURST ·
       NBCLK*) + (CTL == 3) · DELBESA0
```

Therefore, if the leading edge delay feature is disabled, signified by the BESAS<1:0> signals having value 0 or 2, then the EBEN* signal is asserted, except during the ½ BCLK period each cycle when the BCLK signal is low. If the signal delay feature for the leading edge of these signals is enabled, signified by the BESAS<1:0> signals having value 1, then the EBEN* signal is asserted when the BESA0 signal has propagated through the delay element, signified by the DELBESA0 signal going high. If only the leading edge, but not the trailing edge, delay feature is enabled, then the EBEN* signal is also enabled on Burst cycles when the BCLK signal is high. The asserted EBEN* signal enables the BE*<3:0> signals through the buffer 316 to the system board S.

The state machine advances from the EISA_MSTR state to a state referred to as EISA_START when the START* signal is asserted, signified by the condition:

START·MSTRACT being true. In this state, the BESA0 signal is a logic low value. The BESA1 signal is asserted if the trailing edge delay feature is enabled, signified by the equation:

BESA1=((CTL==2)+(CTL==3))

The equation for the EBEN* signal in this state is:

EBEN=(CTL==0)+(CTL==1)+((CTL==2)+CTL==3))·DELBESA1*

The EBEN* signal remains asserted in this state if the trailing edge delay feature is disabled. If the trailing edge delay feature is enabled, the EBEN* signal remains asserted until the DELBESA1 signal is asserted. In this manner, the delay element 314 controls the hold time of the BE*<3:0> signals.

The state machine remains in the EISA_START state until the START* signal is negated. Upon the negation of the START* signal, the state machine may take one of three possible paths. If the CVRT* signal is negated, signifying that system board data conversions are not required, and the EXRDY signal is asserted, signifying that the accessed slave has not requested wait state timing, the state machine returns to the EISA_MSTR state, signified by the condition:

START*·CVRT·EXRDY

If the CVRT* signal is asserted, signifying that system board data conversions are necessary, then the state machine enters the EISA_CONVERT state, signified by the condition:

START*·CVRT

In the EISA_CONVERT state, the EBEN* signal is negated high and the BESA0 and BESA1 signals are logic low values. In this state, the system board S is performing necessary data conversions and may also be translating the BE<3:0>* signals into the corresponding SA<1:0> and SBHE* signals if the EISA bus master 36 is talking to an ISA slave. The BE<3:0>* signals are disabled in this state to allow the system board S to assert the proper BE<3:0>* signals to enable an accessed EISA slave to receive or transmit the data on the correct channels. In the EISA_CONVERT state, the state machine is waiting for the system board S to complete its data and signal conversions. A separate state is needed in the EISA bus master path of the state machine for these conversions because of the speed of the EISA signals used by the EISA bus master 36. EISA signals are faster then their corresponding ISA signals, and therefore the ISA bus master path of the state machine does not require a separate state for data conversions because the ISA signals are slow enough such that the system board S can perform the necessary conversions without interposing any delay. Also, the EBC may be required to conduct one to three additional bus cycles to complete the transfer. The state machine remains in the EISA_CONVERT state while the CVRT* signal is asserted.

The state machine returns to the EISA_MSTR state when the condition:

START*·CVRT*·EXRDY·MSTRACT is true. The state machine returns to the EISA_MSTR state when the system board S has completed the necessary data and/or signal conversions, the bus master is still active, wait state timing has not been requested, and the START* signal is negated, signifying that the bus master 36 has not begun another cycle. The state machine returns to the EISA_START state when the condition:

START·CVRT*·EXRDY is true. This progression occurs when the data and/or signal conversion is complete, wait state timing has not been requested, and the bus master 36 has begun another cycle, signified by the START* signal being asserted. The state machine returns to the IDLE state if the bus master is no longer active.

When the state machine is in the EISA_START state, if the CVRT* signal is negated and the EXRDY signal is low, signifying that the slave being accessed is requesting wait state timing, then the state machine advances to the EISA_WAIT state, signified by the condition:

START*·EXRDY*·CVRT*

In this state, the EBEN* signal is negated high, and the PRIBE*<3:0> signals are disabled. The BESA0 and BESA1 signals are both low in this state. The state machine remains in the EISA_WAIT state while the EXRDY signal is negated low. When the EXRDY signal goes high, the state machine returns to the EISA_MSTR state, signified by the condition:

START*·EXRDY·CVRT·MSTRACT

In the EISA_MSTR state, the state machine returns to the IDLE state if the bus master is inactive. The state machine advances from the EISA_MSTR state to the EISA_START state upon the assertion of the START* signal and the beginning of a new cycle, signified by the condition:

START·MSTRACT

With the BE/SA delay feature enabled, the BE/SA delay logic on the BMTAD 34 adds 42 ns of inherent delay from the falling edge of the BCLK signal, at the beginning of the cycle (prior to the assertion of the START* signal), to the BE*<3:0> signals being valid. The BMTAD 34 also adds the same 42 ns of inherent delay from the falling edge of the BCLK signal, (during CMD*) at the end of the cycle.

As previously discussed, the EISA control signal M-IO is used to differentiate between memory and I/O cycles, and the EISA control signal W-R is used to differentiate between write and read cycles. When an EISA bus master is communicating with an EISA slave, the system board S simply passes these signals through to the slave. When an EISA bus master is communicating with an ISA slave, however, the system board S must convert the M-IO and W-R signals to the appropriate ISA command signal MRDC*, MWTC*, IORC* or IOWC*. In order for the system board S to execute the conversion, these signals must be valid by a specified time. Therefore, the BMTAD 34 includes logic which allows a user to condition these signals for testing purposes when the bus master 36 is an EISA bus master and is communicating with an ISA slave.

The EISA bus master output signals W-R and M-IO require special conditioning logic because, while other bus master output signals are "two-state" signals, meaning that they are either asserted or negated, the W-R and M-IO signals have three distinct logic levels. The W-R and M-IO signals may be either high (write and memory), low (read and I/O) or tri-stated (high impedance) by the bus master 36. Therefore, simply delaying these signals is inadequate because they may not change state during a cycle. For example, if the bus master 36 was consistently executing memory write cycles, then the W-R and M-IO signals would both remain high during the entire cycle, and delaying these signals would not accomplish the desired effect. Therefore, the W-R and M-IO signals are delayed or conditioned according to the present invention by inverting the respective signal output from the bus master 36 until the programmed delay period is completed, at which time the signal is returned to its correct state or polarity.

The control register block circuit 214 on the BMTAD 34 includes a user programmable, 8-bit register (not shown) referred to as the W-R/M-IO control register. Because this type of control register is well known to those skilled in the art, details of its implementation have been omitted for the purpose of clarity. Bits 0 and 1 of the W-R/M-IO Control Register select whether the W-R and M-IO signals are passed through unconditioned or whether the W-R signal or the M-IO signal is delayed. When bits 0 and 1 have value 0, then the W-R and M-IO signals are passed through unconditioned. When bits 0 and 1 have value 1, then the W-R signal is delayed. When bits 0 and 1 have value 2, then the M-IO signal is delayed. Therefore, only one of either the W-R or M-IO signal can be delayed at any one time according to the preferred embodiment. The amount of delay added to the respective signal depends on the value held in bits 2 through 7 of the register. The operation of the W-R, M-IO Control Register can be summarized as follows:

THE W-R/M-IO CONTROL REGISTER:

| BIT | MNEMONIC | FUNCTION |
| --- | --- | --- |
| 0-1 | CONTROL | 00-Pass Through W-R and M-IO<br>01-Delay W-R "valid"<br>10-Delay M-IO "valid"<br>11-Spare |
| 2-7 | DELAY VALUE | Amount of Delay (15–330 ns.) |

The WR/M-IO Control Register generates signals referred to as WRMIOS<7:0> which correspond to the values held in bits 7 through 0, respectively, of the register.

Referring again to FIG. 18, the data and signal conditioning logic 220 includes a PAL referred to as the WR/MIO Delay Control PAL 320 which generates the W-R and M-IO signals provided to the system board S according to the present invention. The PAL 320 receives input signals SLBURST*, W-R, M-IO, EX16*, EX32*, MASTER16*, MSTRACT*, WRMIOS<1:0>, and a signal referred to as DELWRMIO. The PAL 320 also receives the STATE<2:0> signals generated by the BE/SA Control Pal 310, which determine the current state of the BE/SA Control state machine (FIGS. 22 and 23). The PAL 320 generates output signals referred to as WRMIO, PRIWR, PRIMIO, LMSTR16*, DWNMSTR*, and the CVRT* signal. The WRMIO signal is connected to the input of a delay element 322 whose output is the DELWRMIO signal. The WRMIOS<7:2> signals are connected to the delay select inputs of the delay element 322.

The PAL 320 tracks the bus master cycles by monitoring the state of the BE/SA state machine (FIGS. 20 and 21), and utilizes these state values to aid in generating its respective output signals. In the following PAL equations, the following representation is made:

CTL=[WRMIOS<1>, WRMIOS<0>].

The equation for the LMSTR16* signal is:

LMSTR16
:=MASTER16·EISA__MSTR+LMSTR16·M-STRACT

The LMSTR16* signal is a latched version of the MASTER16* signal that is asserted when the BE/SA Enable Control state machine is in the EISA__MSTR state and the MASTER16* signal is asserted. The LMSTR16* signal remains asserted until the bus master active control signal MSTRACT* is negated high.

The equation for the DWNMSTR* signal is:

```
DWNMSTR := MASTER16 · SLBURST · EX32* · LMSTR16*
           · EISA__START
           + DWNMSTR · SLBURST · LMSTR16* · EISA__WAIT
           + DWNMSTR · MSTRACT · (EISA__MSTR +
           EISA__CONVERT)
```

The DWNMSTR* signal is asserted low when the bus master 36 is a 32 bit EISA bus master and is downshifting to a 16 bit size in order to perform Burst cycles with a 16 EISA bit slave. The first minterm in the above equation decodes the condition where the MASTER16* signal is asserted and the latched version of the MASTER16* signal is negated, signifying that the bus master 36 is a 32 bit EISA bus master, the accessed slave has responded that it is a 16 bit slave and can support Burst cycles, and the bus master has asserted the MASTER16* signal in the EISA_START state of the BE/SA Enable Control state machine. The DWNMSTR* signal remains asserted during these Burst cycles if the BE/SA state machine enters the EISA_WAIT state, meaning that the accessed slave has requested wait state timing. The DWNMSTR* signal also remains asserted if the BE/SA state machine enters either the EISA_CONVERT or the EISA_MSTR states and the MSTRACT* signal remains asserted.

The equation for the CVRT* signal is:

$$\begin{aligned}CVRT := &\ EISA\_CONVERT \cdot (LMSTR16^* \cdot EX32^* + \\ &\ LMSTR16 \cdot EX32^* \cdot EX16^*) \\ +&\ EISA\_START \cdot ((LMSTR16^* \cdot EX32^* + \\ &\ LMSTR16 \cdot EX32^* \cdot EX16^*) \cdot \\ &\ (MASTER16 \cdot SLBURST \cdot EX32^* \cdot LMSTR16^*)^*)\end{aligned}$$

The CVRT* signal is asserted low to indicate that the system board S is performing data width conversions. The CVRT* signal is asserted when the BE/SA state machine is in the EISA_START state and either the bus master 36 is 32 bits wide and the slave is not 32 bits wide, or the bus master is 16 bits wide and the slave is 8 bits wide. The CVRT* signal is not asserted on downshift cycles. The CVRT* signal remains asserted while the BE/SA state machine enters the EISA_CONVERT state and the conditions for the assertion of the CVRT* signal remain true.

The equation for the WRMIO signal is:

$$WRMIO = EISA\_MSTR \cdot ((CTL == 1) + (CTL == 2))$$

The WRMIO signal is asserted high to trigger operation of the delay element 322 when the BE/SA state machine is in the EISA_MSTR state and either the W-R or M-IO signal delay feature is enabled.

The PRIWR and PRIMIO are the W-R and M-IO signals that are provided to the system board S. The equation for the PRIMIO signal is:

$$\begin{aligned}PRIMIO = &\ M\text{-}IO \cdot ((CTL == 0) + (CTL == 1) + \\ &\ (CTL == 3)) \\ +&\ M\text{-}IO \cdot (EISA\_START + EISA\_CONVERT \\ &\ + EISA\_WAIT) \\ +&\ (M\text{-}IO^* \cdot DELWRMIO^* + M\text{-}IO \cdot DELWRMIO) \cdot \\ &\ (CTL == 2) \cdot EISA\_MSTR\end{aligned}$$

The PRIMIO signal follows the M-IO signal if the M-IO signal is not being conditioned or if the BE/SA state machine (FIG. 21) is in either of the EISA_START, EISA_CONVERT, or EISA_WAIT states. The PRIMIO signal is the opposite of the M-IO signal when the BE/SA state machine is in the EISA_MSTR state, the M-IO signal delay feature is enabled, and the DELWRMIO signal is negated, signifying that the delay element 322 is inserting the appropriate amount of delay. The PRIMIO signal changes state and follows the M-IO signal when the DELWRMIO signal is asserted, signifying that the delay element 322 has inserted the appropriate amount of delay. The equation for the PRIWR signal is:

$$\begin{aligned}PRIWR = &\ W\text{-}R \cdot ((CTL == 0) + (CTL == 2) + \\ &\ (CTL == 3)) \\ +&\ W\text{-}R \quad (EISA\_START + EISA\_CONVERT + \\ &\ EISA\_WAIT) \\ +&\ (W\text{-}R^* \cdot DELWRMIO^* + W\text{-}R \cdot DELWRMIO) \cdot \\ &\ (CTL == 1) \cdot EISA\_MSTR\end{aligned}$$

The PRIWR signal follows the W-R signal if the W-R signal is not being conditioned or if the BE/SA state machine (FIG. 23) is in either of the EISA_START, EISA_CONVERT, or EISA_WAIT states. The PRIWR signal is the opposite of the W-R signal when the BE/SA state machine is in the EISA_MSTR state, the W-R signal delay feature is enabled, and the DELWRMIO signal is negated, signifying that the delay element 322 is inserting the appropriate amount of delay. The PRIWR signal changes state and follows the W-R signal when the DELWRMIO signal is asserted, signifying that the delay element 322 has inserted the appropriate amount of delay.

Therefore, if either of the W-R or M-IO signals output from the bus master 36 is to be conditioned, the PAL 320 inverts the signal provided to the system board S during the length of the programmed delay, and then restores the signal to its proper orientation when the delay has expired. This guarantees that the respective signal is in the wrong state until the desired delay period has expired.

The PAL 320 generates internal enable conditions for the PRIMIO and PRIWR signals referred to as PRIMIO.OE and PRIWR.OE, respectively. The equations for the PRIMIO.OE and PRIWR.OE signals are:

$$PRIMIO.OE = STATE<2> \cdot MSTRACT$$

$$PRIWR.OE = STATE<2> \cdot MSTRACT$$

The PRIWR and PRIMIO signals are enabled when the EISA path of the BE/SA state machine (FIG. 23) is in any of the EISA_MSTR, EISA_START, EISA_CONVERT, and EISA_WAIT states and the bus master 36 is in control of the bus, signified by the MSTRACT* signal being asserted.

The BCLK signal is connected to the input of the BCLK delay element 215 on the BMTAD 34. Signals referred to as DATADS<9:4> are connected to the delay select inputs of the delay element. The output of the delay element is a signal referred to as DELBCLK. As previously mentioned, the DELBCLK signal is used to delay the write data valid window during Burst transfers, as is explained further below.

The control register block circuit 214 on the BMTAD 34 includes a user programmable register referred to as the Write Data Valid Control Register (not shown), which controls the delay of the enabling of the data valid window. The Write Data Valid Control Register is a 16-bit register which generates signals referred to as the DATADS<15:0> signals. Bits 0 and 1 control the enabling of write data from the bus master 36 to the system board S. When the DATADS<1:0> signals have value 0, then write data is enabled normally. When the DATADS<1:0> signals have value 1, then the enabling of write data is controlled by the BMTAD 34. The values 2 and 3 for the DATADS<1:0> signals are not used according to the preferred embodiment. Bits 2 and 3 of the control register are also not used according to the preferred embodiment. Bits 4 through 9 of the register control the amount of delay added to the BCLK signal, which is used to delay write data during Burst cycles. Bits 10 through 15 of the register control the write data enable delay value. Therefore, the operation of the Data Valid Control Register can be summarized as follows:

| BIT | FUNCTION | |
|-----|----------|---|
| 0-1 | VALUE | 00-Enable WRITE DATA normally. |
|     |       | 01-Control the enabling of data |
|     |       | 10-Spare. |
|     |       | 11-Spare. |
| 2-3 | SPARE | - |
| 4-9 | BCLK delay (for Burst Cycles). | |
| A-F | Data Enable delay value. | |

Referring again to FIG. 18, the data enable conditioning block circuit 230 is comprised of a PAL referred to as the Data Enable Delay/Control PAL 340 and a delay element 342. The Data Enable Delay/Control PAL 340 allows the write data valid setup time to be controlled, thereby testing the limits of the system board S. Depending on the cycle type, the data output from the bus master 36 must be valid within a specified period after the BCLK signal falling edge, during the assertion of the START* signal (setup time) at the beginning of a cycle. The data must remain valid for a specified period after a BCLK signal cycle falling edge, after the negation of the CMD* signal (hold time) at the end of the cycle. During data translation cycles, the write data must be floated within a specified time period from the falling edge of the BCLK signal, while the CMD* signal is asserted, to allow the system board S to execute data copying.

The PAL 340 includes input signals CVRT*, ISARWDC*, MSTRACT*, ISAMSTR*, DATADIR, RESET* LMSBST*, CMD*, TSTART*, DATADS<1:0> and a signal referred to as DELDEN*. The NBCLK signal is connected to the clock input of the PAL 340. The PAL 340 generates output signals referred to as DATAEN* and DEN*. The DATAEN* signal is a data enable signal that is used to enable data between the bus master 36 to the system board S. The DEN signal is connected to the input of the delay element 342 whose output is the DELDEN signal. The DATADS<15:10> signals are connected to the delay select inputs of the delay element 342. The DEN* signal approximates the normal write data valid window of the bus master 36.

Figure 24:
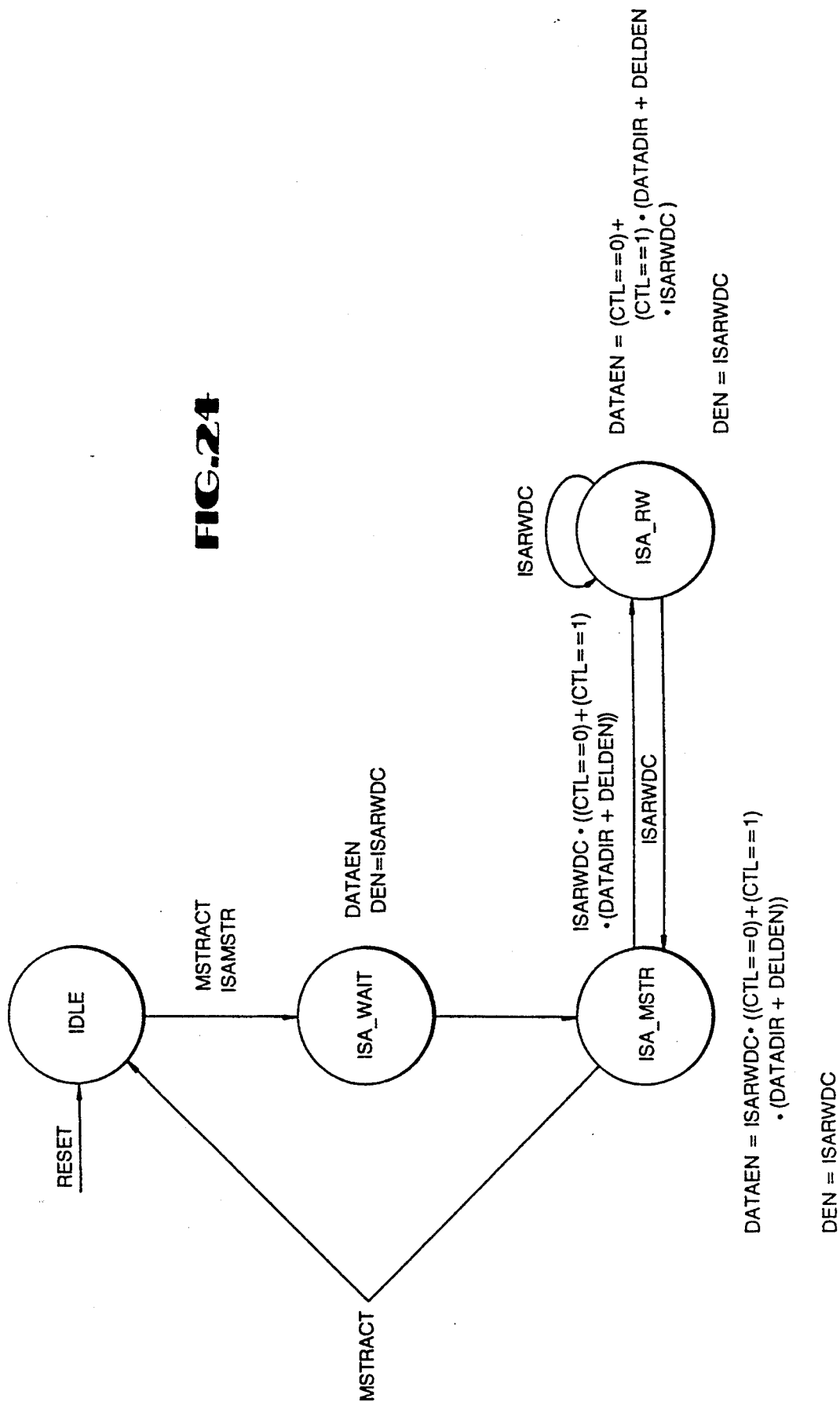
FIGS. 24 and 25 are state diagrams illustrating ISA and EISA paths of the Data Enable Conditioning state machine generated by the Data Enable Control PAL of FIG. 18.
Figure 25:
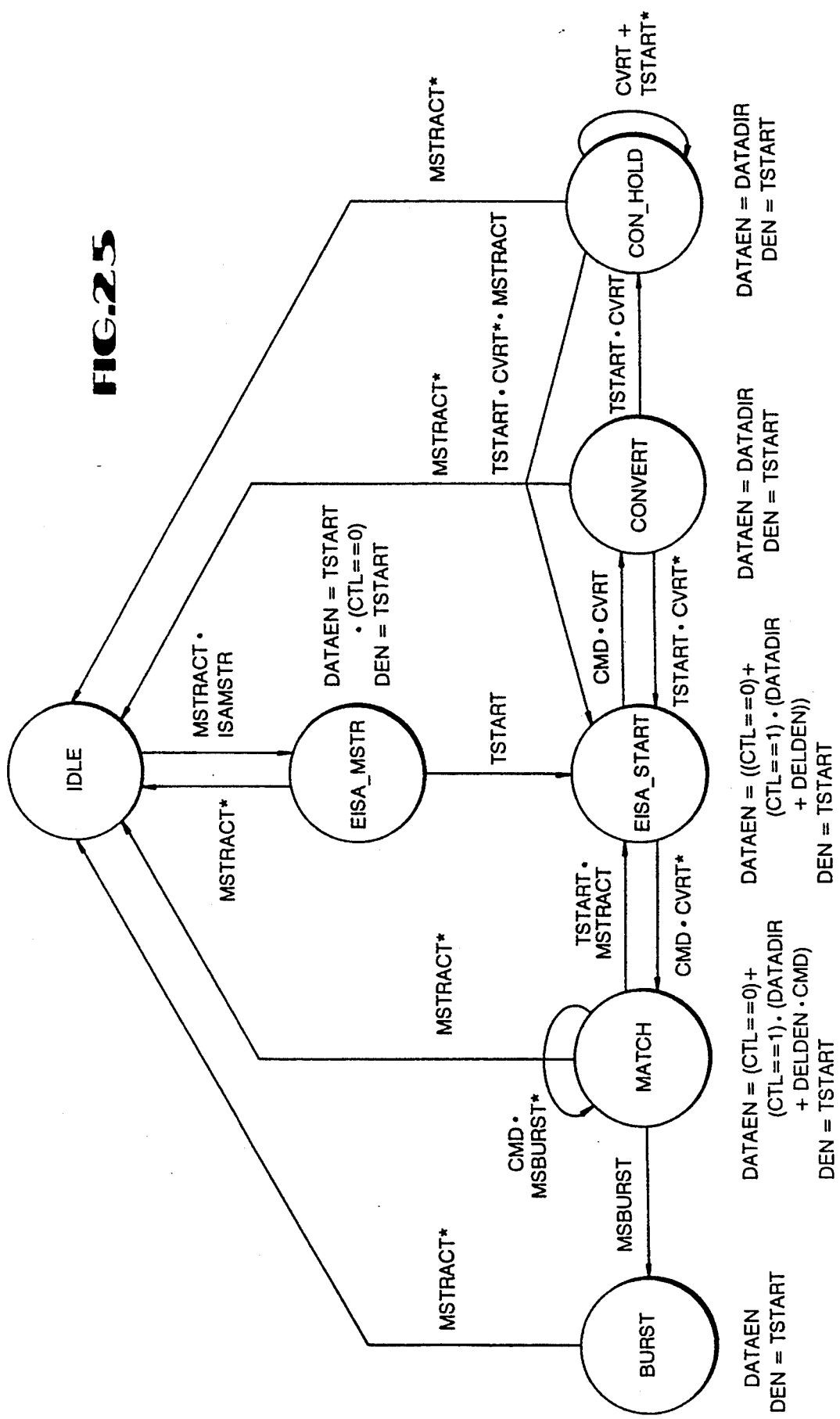

Referring now to FIGS. 24 and 25, a state diagram illustrating the operation of the Data Delay Enable/Control PAL 340 is shown. The state machine is synchronous to the rising edge of the NBCLK signal. The flow of the state machine is divided into two logical paths, depending on whether the bus master 36 is an ISA bus master (FIG. 24) or an EISA bus master (FIG. 25). In the following description, the DATADS<1:0> signals are referred to as the CTL signals for clarity.

Referring now to FIG. 24, the ISA portion of the state machine controls the enabling of data when the bus master 36 is an ISA bus master. For ISA bus masters, the DEN* signal mirrors the ISARWDC* signal. The state machine begins in a state referred to as IDLE. The state machine advances from its IDLE state to a state referred to as ISA_WAIT when the ISA bus master 36 is active. The ISA_WAIT state is a dummy state which allows the required one BCLK signal period to pass between the bus master 36 taking control of the bus to the beginning of a data transfer. This dummy state is placed here to allow the timing of the first cycle in an ISA transfer to be the same as subsequent transfers. The DATAEN* signal is negated high in this state. The state machine stays in this state for one BCLK signal cycle, after which it advances to a state referred to as ISA_MSTR.

In the ISA_MSTR state, the equation for the DATAEN* signal is:

DATAEN·
=ISARWDC·((CTL==0)+(CTL==1)·
(DATADIR+DELDEN))

If the data delay feature is disabled, the DATAEN* signal is asserted when the bus master 36 asserts one of the ISA command signals. If the data delay feature is enabled, the DATAEN* signal is asserted during bus master read cycles or when the DELDEN* signal goes low, which signifies an end to the data enable delay provided by the delay element 342. The state machine progresses to a state referred to as ISA_RW when the following condition is true:

ISARWDC·((CTL==0)+(CTL==1)·
(DATADIR+DELDEN))

The state machine returns from the ISA_MSTR state to the IDLE state if the bus master 36 is no longer active.

The state machine remains in the ISA_RW state while the ISA command signal is asserted. If the data delay feature is disabled, the DATAEN* signal is asserted during the time that the state machine is in this state, which is the time that the ISARWDC* signal is asserted. If the data delay feature is enabled, the DATAEN* signal remains asserted if the cycle is a read cycle or if the delay provided by the delay element has expired and the ISARWDC* signal is asserted. The equation for the DATAEN* signal in this state is:

DATAEN=(CTL==0)+(CTL==1)·
(DATADIR+DELDEN·ISARWDC)

The state machine returns to the ISA_MSTR state when the respective ISA command signal is negated, signified by the ISARWDC* signal being negated. In the ISA_MSTR state, the state machine returns to the ISA_RW state if the bus master 36 begins another cycle or returns to the IDLE state if the bus master 36 is no longer active.

Referring now to FIG. 25, the EISA portion of the state machine is shown. The state machine enters the EISA_MSTR state when the EISA bus master 36 is active, signified by the MSTRACT* signal being asserted and the ISAMSTR* signal being negated. The equation for the DATAEN* signal in this state is:

DATAEN=TSTART·(CTL==0)

The DATAEN* signal is asserted in this state when the TSTART* signal is asserted if the delay feature is not enabled, signified by the DATADS<1:0> signals having value 0. The DEN* signal follows the TSTART* signal in all of the states in the EISA portion of the state machine. When the TSTART* signal is asserted, the state machine advances to a state referred to as EISA_START. The equation for the DATAEN* signal in the EISA_START state is:

DATAEN=((CTL==0)+(CTL==1)·
(DATADIR+DELDEN))

The DATAEN* signal is asserted in this state if the delay feature is disabled. If the delay feature is enabled, then the DATAEN* signal is asserted during read cycles or on write cycles when the DELDEN* signal goes low. In every state except the IDLE state, the DATAEN* signal is asserted on bus master read transfers, which is when the DATADIR signal is a logic high value.

The state machine remains in the EISA_START state while the CMD* signal is negated. When the CMD* signal is asserted, the state machine enters a state referred to as MATCH if the CVRT* signal is negated and enters a state referred to as CONVERT if data and/or signal conversion is required, signified by the CVRT* signal being asserted. In either the MATCH state or the CONVERT state, if the MSTRACT* signal is negated, the state machine returns to the IDLE state.

The MATCH state signifies that the EISA bus master 36 and the slave being accessed have the same data size. The equation for the DATAEN* signal in this state is:

DATAEN=(CTL==0)+(CTL==1)·
(DATADIR+DELDEN·CMD)

The DATAEN* signal remains asserted in this state if the delay feature is disabled. If the delay feature is enabled, the DATAEN* signal is asserted on read cycles or when the DELDEN* signal goes low.

The state machine remains in the MATCH state while the CMD* signal is asserted during non-Burst cycles, signified by the condition:

CMD·MSBURST*

The state machine can take any of three different paths from the MATCH state. If the bus master 36 is no longer active, then the state machine returns to the IDLE state. If the TSTART* signal is asserted, the state machine returns to the EISA_START state, signified by the condition:

TSTART·MSTRACT

If the MSBURST* signal is asserted, signifying that Burst cycles are to be performed, the state machine enters a state referred to as the BURST state. The state machine progresses from the MATCH state to the BURST state during the second transfer of a Burst cycle. In the BURST state, the DATAEN* signal is asserted to enable data onto the bus. If the data delay feature is enabled for write transfers, the data valid window for Burst cycles is controlled by a PAL referred to as the Channel Enable Control PAL 350, in order to minimize the propagation delay of the data. The Channel Enable Control PAL 350 determines which of the byte lanes are enabled for the transfer. It utilizes the delayed BCLK signal to control the data valid window, as is described further below. When the bus master 36 is no longer active, the state machine returns to its IDLE state.

The state machine advances from the EISA_START state to a state referred to as CONVERT if the CVRT* signal is asserted. In the CONVERT state, the system board S is performing necessary data and/or signal translations. If the accessed slave is an ISA slave, the system board S converts the BE<3:0>* signals into the corresponding SA<1:0> and SBHE* signals. If the data sizes of the bus master 36 and the slave are different, the system board S performs data translations in this state. If the cycle being performed is a bus master write cycle, the PAL 340 disables write data to the system board S to allow data translation to occur, signified by the equation:

DATAEN=DATADIR

When the TSTART* signal is asserted, and the data and/or signal conversions are completed, the state machine returns to the EISA_START state, signified by the condition:

TSTART·CVRT* and the next cycle begins. A return from the CONVERT state to the EISA_START state signifies that, due to the data transfer size, data translation was not actually required, even though a size mismatch existed between the slave and the bus master 36. This occurs when the transfer size of the data being written by the bus master 36 is equal to the data size of the accessed slave.

The state machine advances from the CONVERT state to a state referred to as CON_HOLD if the CVRT* signal is still asserted when the TSTART* signal is asserted. This progression is signified by the condition:

TSTART·CVRT

In the CON_HOLD state, the BMTAD 34 is waiting for the system board S to complete its data translation. The DATAEN* signal is negated on a write cycle in this state, thereby disabling data to the system board S. The state machine remains in the CON_HOLD state while data translation is occurring, signified by the condition:

CVRT+TSTART*

When the data translation is complete, the state machine returns to the EISA_START state when the TSTART* signal is asserted, signified by the condition:

TSTART·CVRT*·MSTRACT being true. The state machine returns to the IDLE state from the CON_HOLD state if the bus master becomes inactive, signified by the MSTRACT* signal being negated.

Referring again to FIG. 18, the data channel enable block circuit 232 comprises a PAL referred to as the Channel Enable Control PAL 350. The Channel Enable Control PAL 350 duplicates the operation of the bus master 36 in determining which data channels or bytes should be enabled on bus master write/read transfers. The PAL 350 determines this from the BE<3:0>* signals and from whether the bus master 36 is an ISA or EISA bus master. The BMTAD 34 must only enable the proper channels because in some instances the system board S performs data copying on data channels that are not enabled so that, for example, a 32 bit slave can receive 32 bit transfers from a 16 bit bus master. The PAL 350 also controls the delay of the write data valid period on bus master Burst write cycles. The PAL 350 performs this function instead of the Data Enable Control PAL in order to shorten the delay path of the data on Burst transfers because these transfers have tight timing requirements.

The PAL 350 receives input signals LMSBST*, LMSTR16*, DWNMSTR*, DATADIR, DATAEN*, ISAMSTR*, MSTRACT*, SBHE*, SA<0>, LBE<3:0>*, DATADS<0>, and DELBCLK. The BCLK signal is connected to the clock input of the PAL 350. The outputs of the PAL 350 comprise four data enable signals referred to as DEN<3:0>*. The DEN<3:0>* signals are connected to the active low enable inputs of four transceivers represented by the transceiver circuit 360, which controls the enabling of the respective bytes of data between the system board S and the bus master 36. The data signals received from the system board S are referred to as the BD<31:0> signals, and the data signals from the slave are referred to as the D<31:0> signals.

In generating the DEN<3:0>* signals, the PAL 350 generates the following condition:

BURST = LMSBST·DATADS<0>·DATADIR*

The BURST condition is asserted on Burst write cycles when the write data window is being controlled. When the BURST condition is true, the write data valid window is controlled by the DELBCLK signal. Data is only enabled during the ½ BCLK signal period that the DELBCLK signal is low. The equation for the DEN<0>* signal is:

```
DEN<0> = MSTRACT · DATAEN · (BURST* + BURST ·
         DELBCLK) ·
         ((ISAMSTR · SA<0>*)
         + ISAMSTR* · MASTER16* · DWNMSTR*
         ((BEN == 0) + (BEN == 8) + (BEN == Ch) +
         (BEN == Eh))
         + ISAMSTR* · MASTER16 · DWNMSTR* ·
         ((BEN == 3) + (BEN == Bh) + (BEN == Ch) +
         (BEN == Eh))
         + ISAMSTR* · MASTER16* · DWNMSTR* ·
         ((BEN == 8) + (BEN == Bh) + (BEN == Ch) +
         (BEN == Eh)))
```

The DEN<0>* signal is asserted low when the bus master is an ISA bus master and the SA<0> address signal is low. The DEN<0>* signal is also asserted when the bus master 36 is a 32 bit EISA bus master and the BE<0>* signal is asserted, or if the bus master 36 is a 16 bit EISA bus master and either the BE<0>* signal or the BE<2>* signal is asserted, or if the bus master 36 is a 32 bit EISA bus master and is downshifting to a 16 bit data transfer size, and either of the BE<0>* or BE<2>* signals are asserted.

The equation for the DEN<1>* signal is:

```
DEN<1> = MSTRACT · DATAEN · (BURST* + BURST ·
         DELBCLK) ·
         (((ISAMSTR · SBHE)
         + ISAMSTR* · MASTER16* · DWNMSTR* ·
         ((BEN == 0) + (BEN == 1) + (BEN == 8) +
         (BEN == 9) + (BEN == Ch) + (BEN == Dh))
         + ISAMSTR* · MASTER16 · DWNMSTR* ·
         ((BEN == 3) + (BEN == 7) + (BEN == Ch) +
         (BEN == Dh))
         + ISAMSTR* · MASTER16* · DWNMSTR ·
         ((BEN == 0) + (BEN == 1) + (BEN == 3) +
         (BEN == 7) + (BEN == 8) + (BEN == 9) +
         (BEN == Ch) + (BEN == Dh)))
```

The DEN<1>* signal is asserted low when the bus master 36 is an ISA bus master and the SBHE* signal is negated. The DEN<1>* signal is also asserted when the bus master 36 is a 32 bit EISA bus master and the BE<1>* signal is asserted, or if the bus master 36 is a 16 bit EISA bus master and either the BE<1>* signal or the BE*<3>* signal is asserted, or if the bus master 36 is a 32 bit EISA bus master and is downshifting to a 16 bit data transfer size, and either of the BE<1>* or BE<3>* signals are asserted.

The equation for the DEN<2>* signal is:

```
DEN<2> = MSTRACT · DATAEN · (BURST* + BURST ·
         DELBCLK) · ISAMSTR* · MASTER16* · DWNMSTR* ·
         ((BEN == 0) + (BEN == 1) + (BEN == 3) +
         (BEN == 7) + (BEN == 8) + (BEN == 9) +
         (BEN == Bh))
```

The DEN<2>* signal is asserted low when the bus master 36 is a 32 bit EISA bus master and either of the BE<2>* or BE<3>* signals is asserted. The DEN<2>* signal is asserted when only the BE<3>* signal is asserted because a 32 bit bus master will generally drive both of the high bytes of the data bus on write cycles even if it only places valid data on one of the high bytes.

The equation for the DEN<3>* signal is:

```
DEN<3>  = MSTRACT · DATAEN · (BURST* + BURST ·
          DELBCLK) · ISAMSTR* · MASTER16* · DWNMSTR*
          ((BEN == 0) + (BEN == 1) + (BEN == 3) +
          (BEN == 7) + (BEN == 8) + (BEN == 9) +
          (BEN == Bh))
```

The DEN<3>* signal is asserted under the same conditions that the DEN<2>* signal is asserted.

Referring now to FIG. 26, the transceiver circuit 360 comprises four transceivers 390, 392, 394, and 396. The BD<31:24>, BD<23:16>, BD<15:8>, and BD<7:0> signals are connected to the A inputs of the transceivers 390, 392,394, and 396, respectively. The D<31:24>, D<23:16>, D<15:8> and D<7:0> signals are connected to the B inputs of the transceivers 390, 392, 394 and 396, respectively. The DATADIR signal is connected to the directional inputs of each of the transceivers 390, 392, 394, and 396. The DEN<3>*, DEN<2>*, DEN<1>*, and DEN<0>* signals are connected to the enable inputs of reach of the transceivers 390, 392, 394, and 396. Therefore, when the respective DEN<3:0>* signals are asserted low, the appropriate bytes of data are enabled through the transceivers 390, 392, 394, and 396, the direction being dependent on the status of the DATADIR signal.

Figure 27:
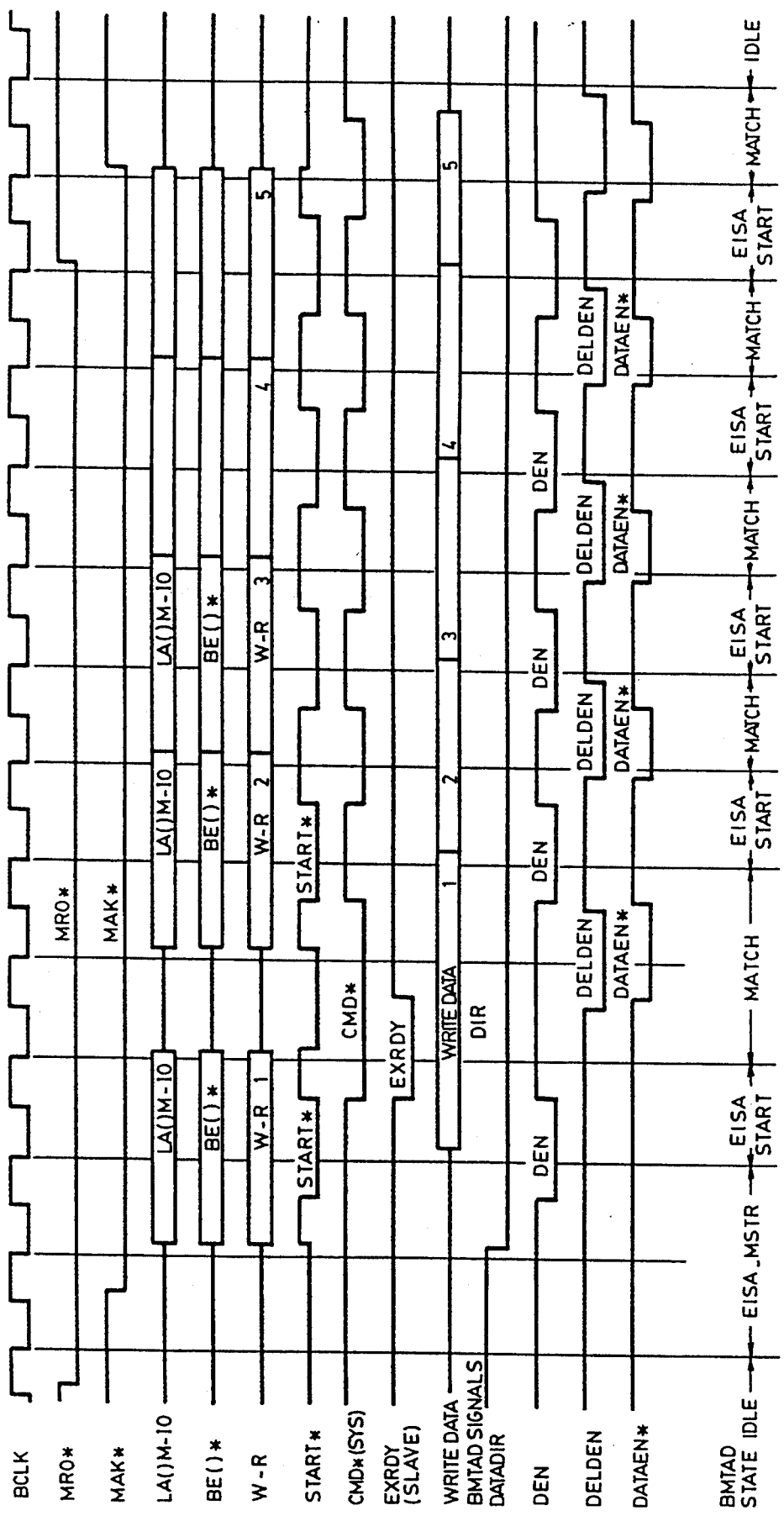
Figure 28:
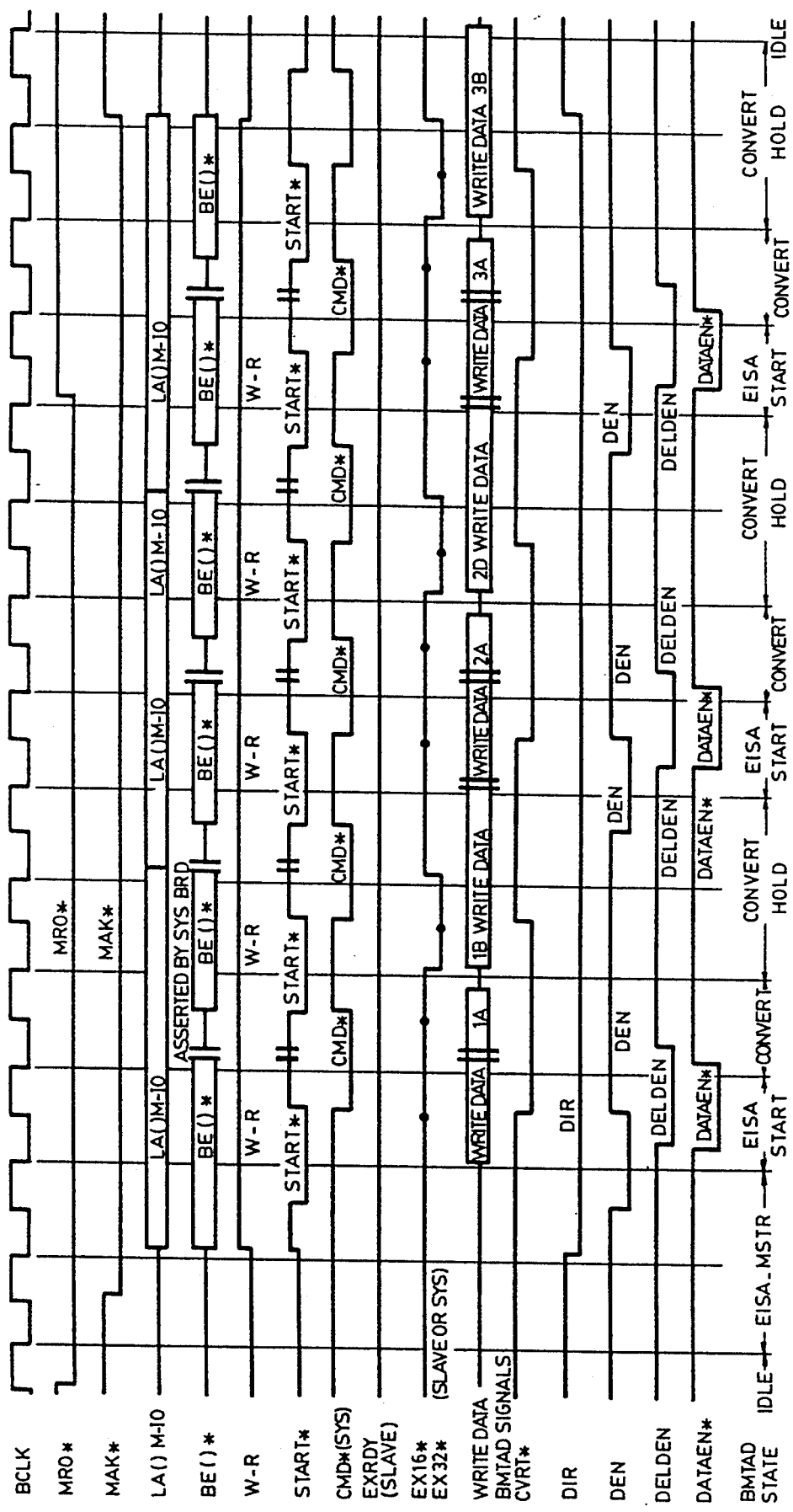

Referring now to FIGS. 27, 28 and 29, timing diagrams which illustrate EISA bus master Standard write cycles, EISA bus master write cycles with data translation, and EISA bus master Burst write cycles are shown.

Therefore, the BMTAD 34 allows a user to control the write data valid window of a bus master card 36 coupled to the BMTAD 34. If a user wishes to control the write data valid window, the controlling software must be aware of the type of bus master card 36 situated on the BMTAD 34 and also the type of cycle that the bus master card 36 executes because different cycle types require different windows. Therefore, the DATADS<15:0> control register must be programmed to ensure that the write data valid window is properly configured to allow the window to be large enough and also to be located in the correct position of the cycle. For EISA cycles, the BMTAD 34 includes a 67 ns inherent delay for write data from the rising edge of the BCLK signal (prior to START*). For ISA cycles, the setup and hold times of the write data are specified from the assertion and negation of the respective ISA Command signal (IOWC* or MWTC*) which are, by definition, asynchronous to the BCLK signal.

Therefore, the present invention includes two extension cards which comprise signal conditioning logic circuitry. The SLTAD 30 allows a user to selectively advance or delay respective signals from the slave expansion card 32 to the system board S. The SLTAD 30 also allows a user to condition the read data valid window for data provided from the slave 32 to the system board S. The BMTAD 34 allows a user to condition signals output from the bus master 36 to the system board S. The BMTAD 34 also allows a user to condition the write data valid window of data from the bus master 36 to the system board S. The signal conditioning apparatus according to the present invention allows a user to test the specifications and timing limits of a system board in a computer system, but may be used for any purpose where signal conditioning is desired.

The foregoing disclosure and description of the invention are illustrative and explanatory thereof, and various changes in the size, shape, materials, components, and circuit elements, as well as in the details of the illustrated circuitry and construction may be made without departing from the spirit of the invention.

We claim:

1. A signal conditioning apparatus for conditioning a signal in a computer system, the computer system including a removable expansion card having a connector and a means connected to a connector for generating the signal, the computer system also including a system board having an expansion slot for receiving the connector of the expansion card, a system bus, and means connected to the expansion slot for receiving the signal, the signal conditioning apparatus comprising:

a connector for insertion into the expansion slot of the system board;

a slot for receiving the removable expansion card, wherein the signal conditioning apparatus is for coupling between the system board and the expansion card;

delay means having an input and an output, said delay means for providing at said output a delayed version of the signal received at said input, said input being coupled to said slot for receiving the signal from the expansion card signal generating means;

means for indicating selection of the signal provided by the expansion card signal generating means or said delayed signal;

multiplexing means having signal inputs coupled to said slot to receive the signal provided by the expansion card signal generating means and to said delayed signal, control inputs coupled to said selection indication means and an output coupled to said connector for coupling said output to the system board signal receiving means to provide one of said signal inputs to said output based on the indicated selection of said selection indication means; and advance means having an input and an output, said advance means for providing at said output an advanced signal which is generated a delayed amount of time after the signal received at said input is asserted, said input being coupled to receive the second signal from the second signal generating means;

wherein said selection indication means also indicates a selection of said advanced signal;

wherein said multiplexing means includes an additional signal input to receive said advanced signal and responds to said selection indication means to provide either the signal form the expansion card signal generating means, said delayed signal, or said advanced signal to said multiplexing means output;

wherein said advance means includes:
 means for receiving said second signal from the second signal generating means;
 means for asserting a third signal when said second signal is asserted;
 leading edge delay means which receives said third signal and generates a delayed version of said third signal; and
 means having an input for receiving said delayed third signal for asserting said advanced signal when said delayed third signal is asserted.

2. The signal conditioning apparatus of claim 1, said signal conditioning means further comprising:
 a switch coupled between said multiplexing means signal input receiving the signal from said expansion card signal generating means and said multiplexing means output, said switch for receiving the signal from said expansion card signal generating means and for bypassing the multiplexer means by providing the signal from the expansion card signal generating means to said multiplexing means output when said switch is enabled; and
 wherein said multiplexing means includes means for tri-stating said multiplexing means output when said switch is enabled.

3. The signal conditioning apparatus of claim 2, wherein said delay means further includes a plurality of delay select inputs which select the length of delay added to said delayed signal; and
 the signal conditioning apparatus further comprising:
 means for generating delay select signals that are coupled to said delay select inputs of said delay means.

4. The signal conditioning apparatus of claim 3, wherein said selection indication means and said delay select signal generating means comprise user programmable registers.

5. The signal conditioning apparatus of claim 1, wherein said advance means includes:
 means having an input for receiving said delayed third signal for asserting a fourth signal when said delayed third signal is asserted;
 trailing edge delay means which receives said fourth signal and generates a delayed version of said fourth signal; and
 means having an input for receiving said delayed fourth signal for negating said advanced signal when said delayed fourth signal is asserted.

6. The signal conditioning apparatus of claim 5, wherein said advance means leading edge and trailing edge delay means include a plurality of delay select inputs which receive signals that select the length of delay added to said third and fourth signals; and
 said advance means further comprising:
 means for generating delay select signals which are coupled to said delay select inputs of said leading edge and trailing edge delay means.

7. The signal conditioning apparatus of claim 6, wherein said delay select signal generating means comprise user programmable registers.

8. A signal conditioning apparatus for conditioning a signal in a computer system, the computer system including a removable expansion card having a connector and a means connected to the connector for generating the signal, the computer system also including a system board having an expansion slot for receiving the connector of the expansion card, a system bus, and a means connected to the expansion slot for receiving the signal, the signal conditioning apparatus comprising:
 a connector for insertion into the expansion slot of the system board;
 a slot for receiving the removable expansion card, wherein the signal conditioning apparatus is for coupling between the system board and the expansion card;
 means for coupling to the signal generating means and the signal receiving means for predicting when the signal is to be asserted and generating a signal indicative thereof; and
 means coupled to said predicting means for receiving said indicative signal and generating a substitute signal for coupling to the receiving means;
 wherein the signal generating means and the signal receiving means each generate a plurality of control signals;
 wherein the signal conditioning apparatus predicting means is for receiving one or more of said control signals from the signal generating means and the signal receiving means and using said control signals to determine when the substitute signal is to be asserted;
 wherein said substitute signal generating means comprises:
  means coupled to said predicting means for asserting a first signal when said predicting means indicating signal is asserted;
  a leading edge delay means which receives said first signal and generates a delayed version of said first signal;
  means for asserting said substitute signal when said delayed first signal is asserted.

9. The signal conditioning apparatus of claim 8, wherein said substitute signal generating means comprises:
 means for asserting a second signal when said substitute signal is asserted;
 a trailing edge delay means which receives said second signal and generates a delayed version of said second signal; and
 means for negating said substitute signal when said delayed second signal is asserted.

10. The signal conditioning apparatus of claim 9, wherein the signal conditioning apparatus leading edge and trailing edge delay means include a plurality of delay select inputs which select the length of delay added to said first and second delayed signals;
 the signal conditioning apparatus further comprising:
 a user programmable register which generates delay select signals that are coupled to said delay select inputs of said leading edge and trailing edge delay means.

* * * * *

UNITED STATES PATENT AND TRADEMARK OFFICE
CERTIFICATE OF CORRECTION

PATENT NO.   :   5,448,699
DATED        :   SEPT. 5, 1995
INVENTOR(S)  :   GOSS ET AL.

It is certified that error appears in the above-identified patent and that said Letters Patent is hereby corrected as shown below:

In col. 58, line 65, please replace "form" with --from--.

Signed and Sealed this

Fifth Day of December, 1995

Attest:

BRUCE LEHMAN

*Attesting Officer*     *Commissioner of Patents and Trademarks*